United States Patent [19]
Kaburagi et al.

[11] Patent Number: 5,680,230
[45] Date of Patent: Oct. 21, 1997

[54] IMAGE PROCESSING METHOD AND APPARATUS THEREOF

[75] Inventors: Hiroshi Kaburagi, Yokohama; Hiroyuki Ichikawa, Kawasaki; Hideaki Shimizu, Yokohama; Masao Watanabe; Hiroyuki Yaguchi, both of Kawasaki; Yoshinori Abe, Tama; Yasuhiro Takiyama, Kawasaki, all of Japan

[73] Assignee: Canon Kabushiki Kaisha, Tokyo, Japan

[21] Appl. No.: 301,595

[22] Filed: Sep. 7, 1994

[30] Foreign Application Priority Data

| Sep. 9, 1993 | [JP] | Japan | 5-224306 |
| Sep. 14, 1993 | [JP] | Japan | 5-252591 |
| Oct. 29, 1993 | [JP] | Japan | 5-272108 |
| Jul. 13, 1994 | [JP] | Japan | 6-161105 |

[51] Int. Cl.$^6$ ................................ H04N 1/40
[52] U.S. Cl. .......................... 358/520; 358/518
[58] Field of Search .................... 358/518, 520, 358/500; 347/115; 399/3, 223

[56] References Cited

U.S. PATENT DOCUMENTS

| 4,761,669 | 8/1988 | Langdon | 355/362 R |
| 4,764,777 | 8/1988 | Saito et al. | 347/67 |
| 4,903,048 | 2/1990 | Harrington | 347/115 |
| 5,237,517 | 8/1993 | Harrington et al. | 364/526 |

*Primary Examiner*—Peter S. Wong
*Assistant Examiner*—Derek J. Jardieu
*Attorney, Agent, or Firm*—Fitzpatrick, Cella, Harper & Scinto

[57] ABSTRACT

The present invention is intended to provide an image processing apparatus capable of two-color output representation in high accuracy even with a full-colored original.

A color original is entered by an input means for prescan, a density distribution with respect to a hue is obtained for each electric signal of color image information, and a characteristic point of the color original image is obtained from the result of the density distribution. The two-color separation means separates a full-colored original to two colors free from the same color representation according to the information of the characteristic point obtained.

25 Claims, 42 Drawing Sheets

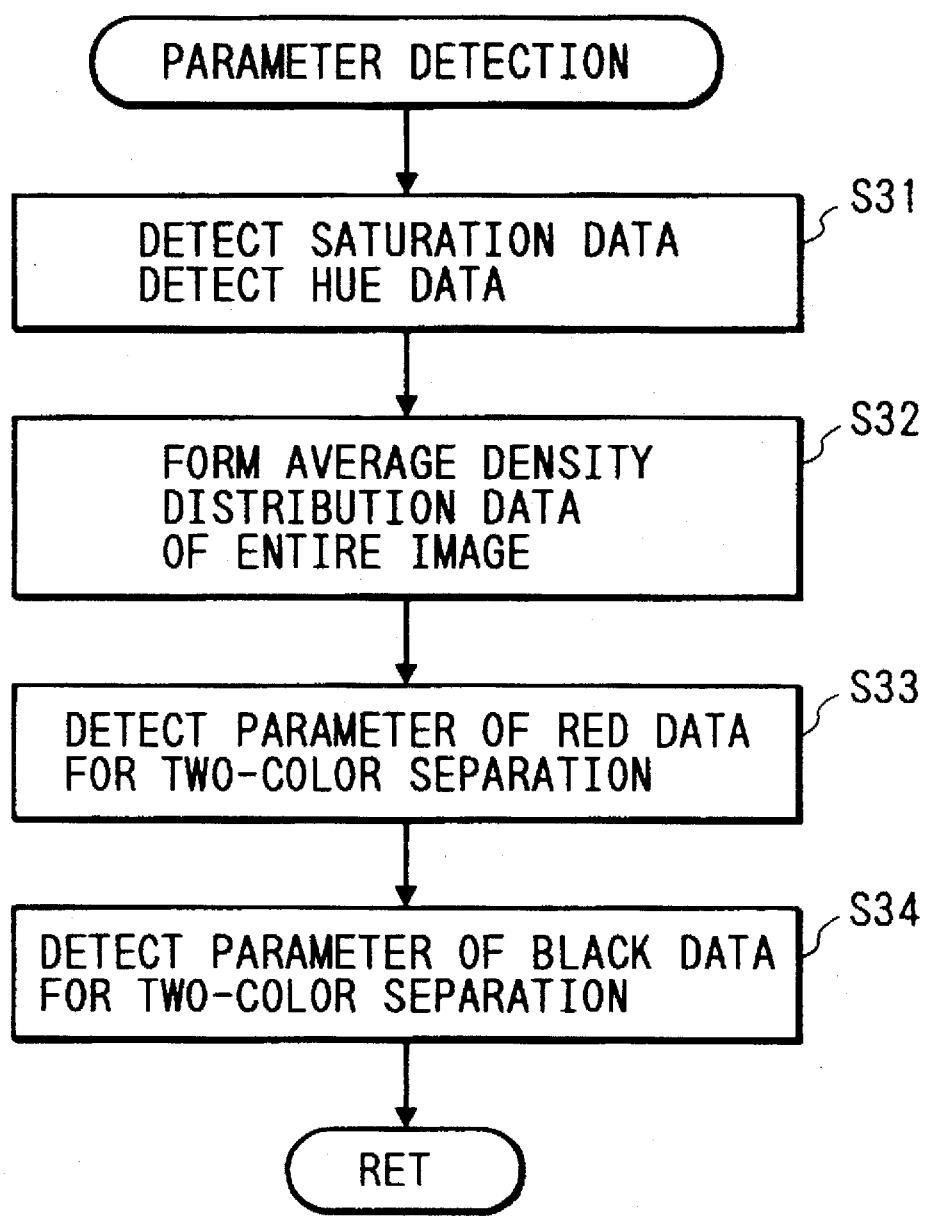

FIG. 17A  FIG. 17B
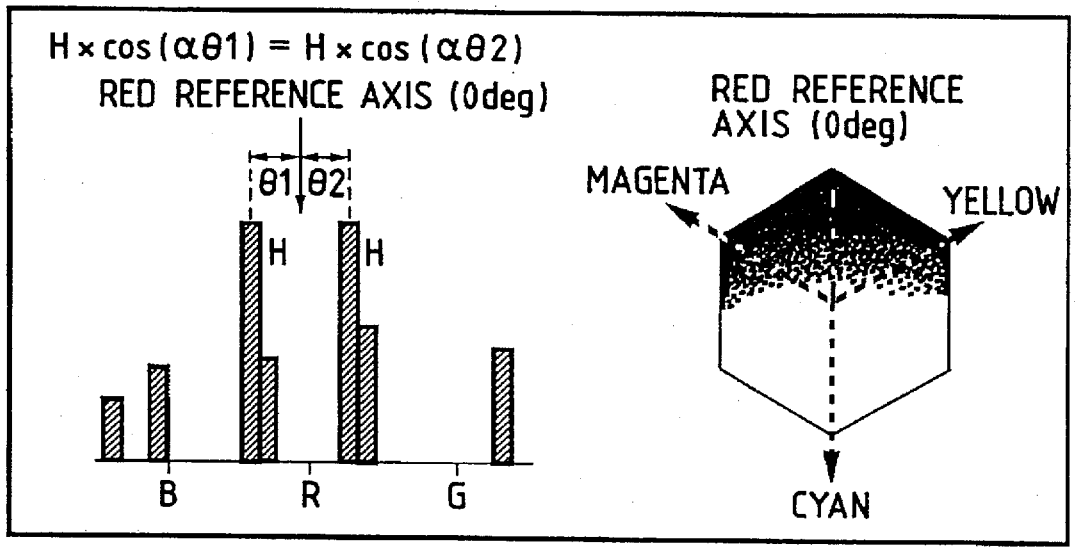
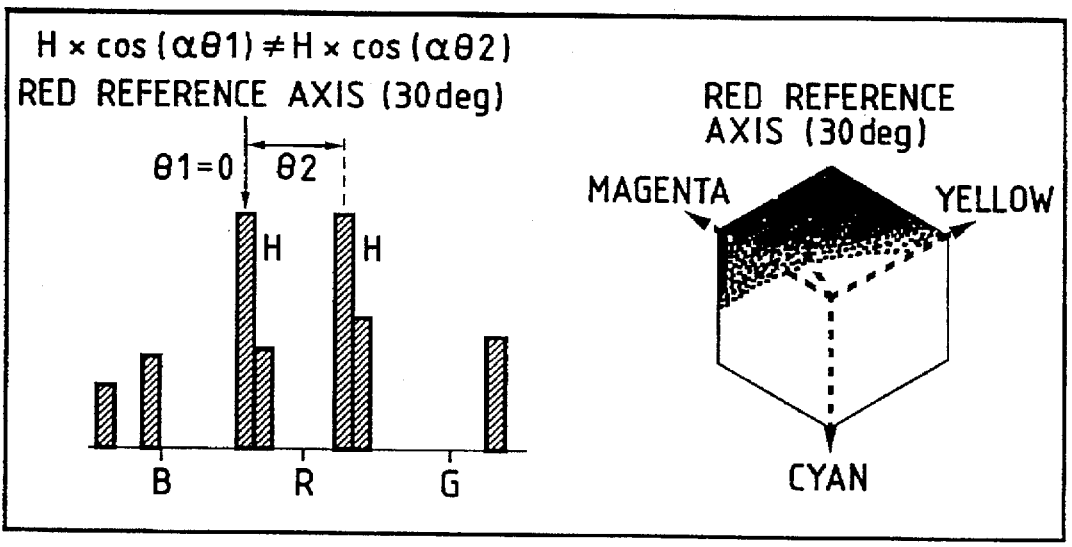
FIG. 17C  FIG. 17D

X : PATTERN INTERVAL
Y : PATTERN DENSITY
Z : PATTERN AREA

FIG. 44

| LUMINANCE LEVEL | (X, Y, Z) |
|---|---|
| FFH | (3, 1, 1) |
| F0H | (3, 1, 0) |
| E0H | (3, 0, 1) |
| | (3, 0, 0) |
| | (2, 1, 1) |
| | (2, 1, 0) |
| | (2, 0, 1) |
| | (2, 0, 0) |
| | (1, 1, 1) |
| | (1, 1, 0) |
| | (1, 0, 1) |
| | (1, 0, 0) |
| | (0, 1, 1) |
| 20H | (0, 1, 0) |
| 10H | (0, 0, 1) |
| 00H | (0, 0, 0) |

FIG. 46
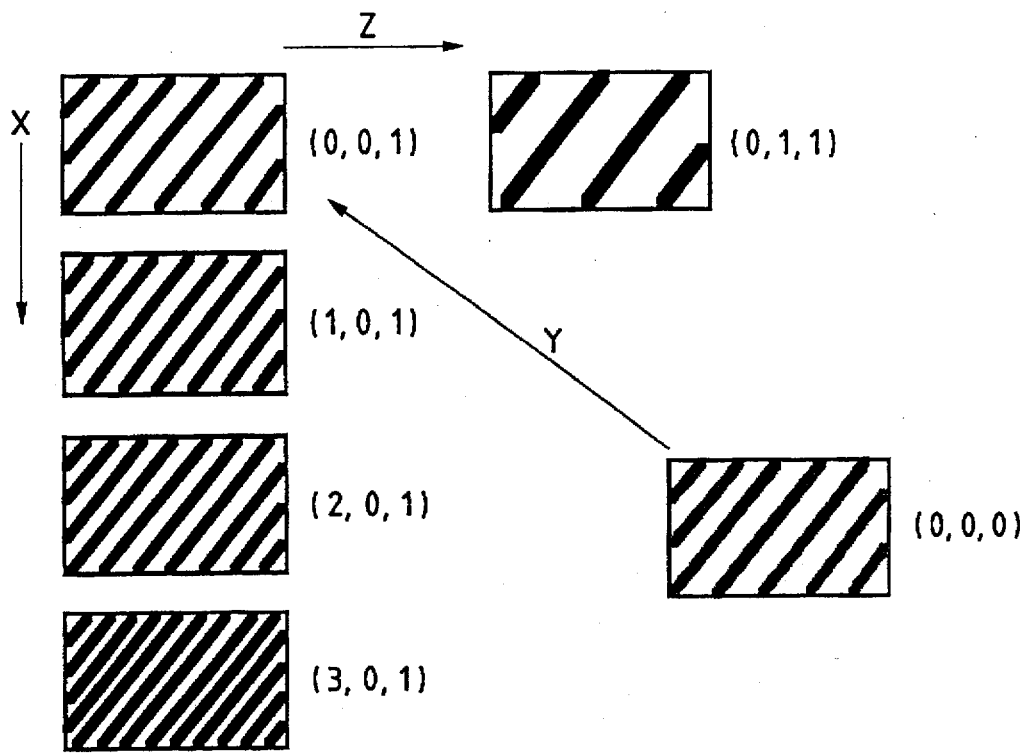
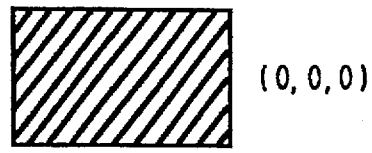
FIG. 47A
FIG. 47B
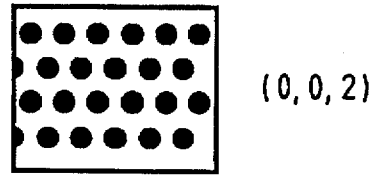
FIG. 47C
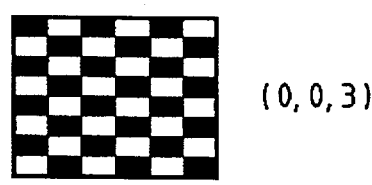
FIG. 47D

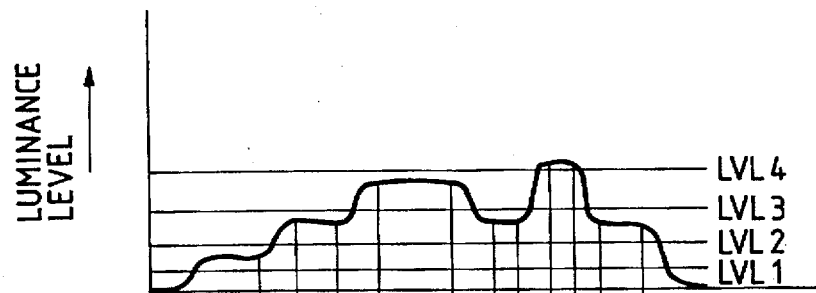
FIG. 48A
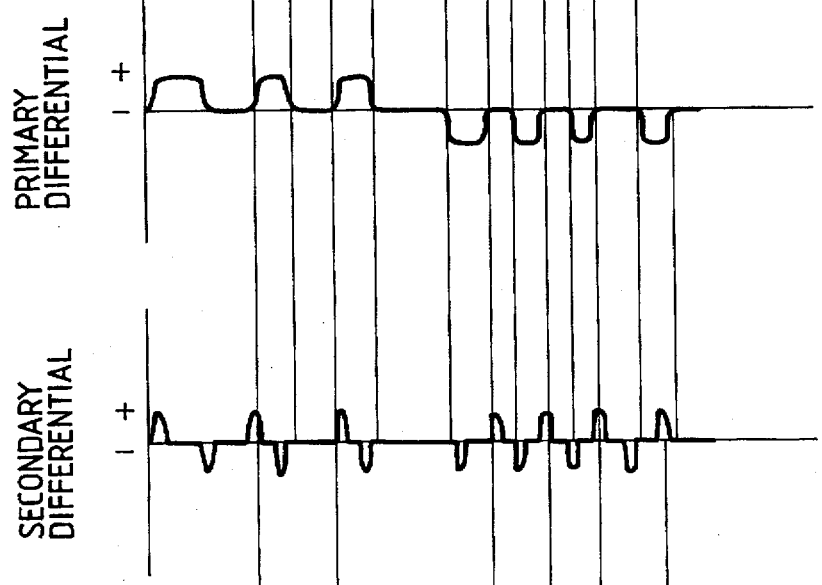
FIG. 48B
FIG. 48C
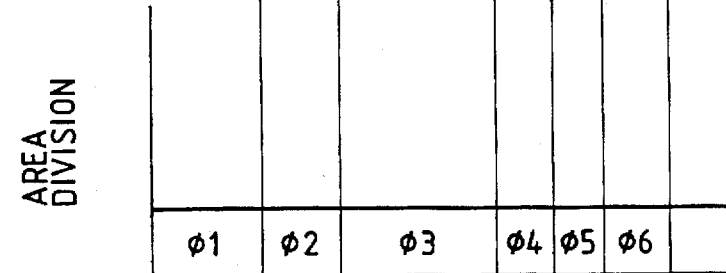
FIG. 48D

IMAGE PROCESSING METHOD AND APPARATUS THEREOF

BACKGROUND OF THE INVENTION

1. Field of the Invention

The present invention relates to an image processing method for color separation processing of input image data and an apparatus thereof.

2. Related Background Art

As an image formation apparatus such as a digital copying machine, there has been proposed an image formation apparatus which reads a color original by photoelectric conversion devices such as color CCDs or the like, identifies respective appropriate areas from color information of the original, and forms an image with the identified areas in different colors (for example, red and black).

In addition, there has been proposed an image formation apparatus which separates, for example, a red component and a black component from color image signals which have been read and reproduces a color original image in two different colors so that the red component of the color image is formed in red and the black component in black.

However, the above-described method provides the gradation effect only in a black color and uses binary representation for a red color. Therefore, this method has been unsuitable for reproduction of full-color originals since the method is only adapted to reproduce an image in which only applicable colors of the original are reproduced even though an effect of the method can be expected in that red characters contained in a monochrome original can be reproduced in red.

For reproducing an input color image in two colors, this method has been disadvantageous in that, if a dot non-mixing method (in which a plurality of toner colors are not superposed in one dot) is used, the densities of color components which have not been applied are not maintained on the image and therefore the density of the whole image cannot be maintained.

SUMMARY OF THE INVENTION

An object of the present invention is to provide an image processing method and an apparatus thereof which is capable of solving the above problems.

An another object of the present invention is to separate colors of image data entered as shown.

A further another object of the present invention is to prevent a production of areas which become the same color when color separation.

A further another object of the present invention is to prevent a decrease of a density which may be caused in re-reproduction.

A further another object of the present invention is to carry out desired color separation in accordance with an application of a user.

To attain the objects of the present invention, a preferred embodiment of the present invention discloses an image processing method for entering color image data and color-separating the entered color image data into a plurality of colors, characterized in that hue data is detected from the entered color image data and density data is generated according to the detected hue data.

Other objects and features of the present invention will be obvious from the embodiments and drawings in the following sheets.

BRIEF DESCRIPTION OF THE DRAWINGS

FIG. 15 is another sub flow chart showing the operation of the two-color separation unit;

FIGS. 17A to 17D are respectively a diagram showing an example of the average density distribution of colors used in a whole original;

FIG. 44 is a diagram showing a three-dimensional parameter of the input brightness level;

FIG. 46 is a diagram showing the state of the image when the pattern is changed by the three-dimensional parameter;

FIGS. 47A to 47D are respectively a pattern when the type of pattern is a one-dimensional parameter; and FIGS. 48A to 48D are respectively a diagram showing a step for determining an area for synthesizing the pattern.

DETAILED DESCRIPTION OF THE PREFERRED EMBODIMENTS

[FIRST EMBODIMENT]

A first embodiment according to the present invention is described in detail referring to the accompanying drawings.

[Configuration of the Copying Machine]

Figure 1:
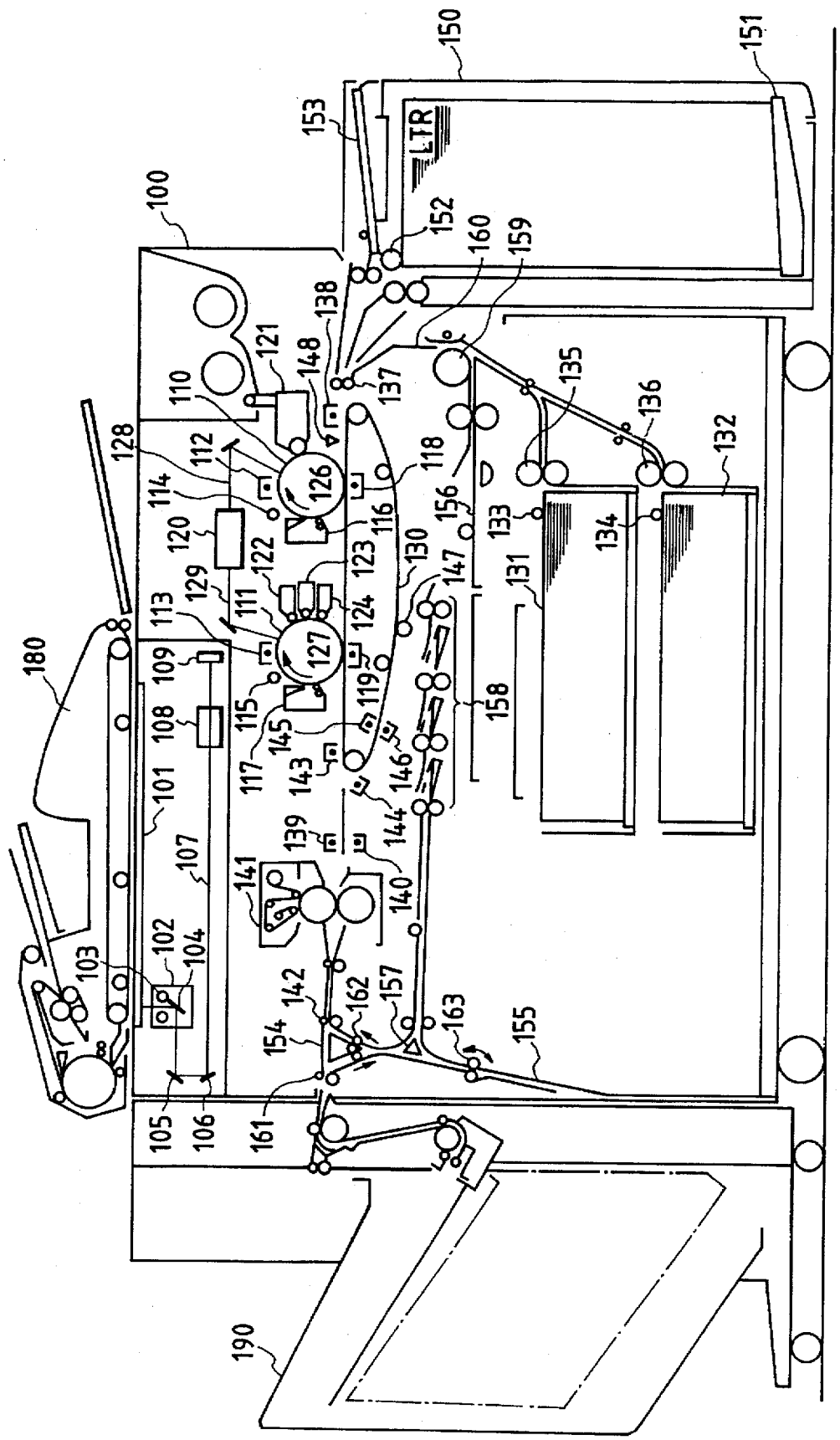
FIG. 1 is a sectional view of a configuration of an image formation apparatus of an embodiment according to the present invention.

FIG. 1 is a sectional view of a configuration of an image formation apparatus of an embodiment according to the present invention. In FIG. 1, 100 is a main unit of a copying machine, 180 is a circulatory automatic original feeder (hereafter referred to as the "RDF") which automatically feeds the original, and 190 is a sorter. These RDF 180 and the sorter 190 can be combined as required for use with the main unit.

The operation of the image formation apparatus of this embodiment is described below.

In FIG. 1, 101 is an original placing glass plate on which the original is placed, 102 is a scanner comprising an original illumination lamp 103 and a scan mirror 104 whereby the scanner is moved along both ways in a specified direction by a motor, not shown, and a reflected light from the original is transmitted to pass the lens 108 through scan mirrors 104 to 106 and reaches the CCD image sensor to form an image.

107 is an exposure control unit comprising a laser and a polygon scanner whereby a laser beam 128, 129 modulated according the image signals which have been converted into electric signals by the image sensor 109 and have undergone the specified image processing described later is irradiated onto photoreceptor drums 110 and 111.

A primary charging unit 112, a black developing unit 121, a transfer charging unit 118, a cleaner 116 and a pre-exposure lamp 114 are provided around the photoreceptor drum 110. A primary charging unit 113, a red developing unit 122, a blue developing unit 123, a green developing unit 124, a transfer charging unit 119, a cleaner 117 and a pre-exposure lamp 115 are provided around the photoreceptor drum 111 whereby one of developing units 122 to 124 is arranged close to the photoreceptor 111 by a developing unit changeover device, not shown, and other remaining developing units are arranged retracted. A black image forming unit 126 is formed by the photoreceptor drum 110 and others and a color image forming unit is formed by the photoreceptor drum 111 and others.

In the black image forming unit 126, the photoreceptor drum 110 is rotated in a direction shown with an arrow in the diagram by a motor, not shown, and a laser beam 128 from the exposure control unit 120 is irradiated onto the photoreceptor drum 110 after the photoreceptor drum 110 has been charged to a required potential by the primary charging unit 112, thereby forming a static latent image. The static latent image formed on the photoreceptor drum 110 is developed by the black developing unit 121 and visualized as a toner image.

On the other hand, a transfer paper supplied from an upper station cassette 131 or a lower station cassette 132 by pickup rollers 133, 134 is sent to the main unit by paper feed rollers 135, 136, further sent to a transfer belt by a resist roller 137, whereby an image is visualized and a toner image is transferred onto the transfer paper by the transfer charging unit 118. After the transfer operation, the photoreceptor drum is cleaned by the cleaner 116 to remove off remaining toner and a residual charge is erased by the pre-exposure lamp.

Similarly, a toner image visualized by a color developing unit for developing a desired color such as, for example, red other than black formed by the black image forming unit 126 is transferred onto the transfer paper in the color image forming unit 127.

The transfer paper on which the image has been transferred is separated from the transfer belt 130 and the toner image is recharged by the charging units 139 and 140 before fixing, sent to the fixing unit 141 and fixed by pressurizing and heating, and ejected out of the main unit 100 by the election roller 142.

In other words, an image forming unit corresponding to black and other colors than black is provided.

A suction charging unit 138 sucks a transfer paper sent from the resist roller onto the transfer belt 130 and a transfer belt roller 139 is used to rotate the transfer belt 130 and suck by charging the transfer paper to the transfer belt in combination with the suction charging unit 138.

A discharging/charging unit 143 facilitates separation of the transfer paper from the transfer belt 130, an exfoliation charging unit 144 prevents image disturbance due to exfoliation discharging caused when the transfer paper is separated from the transfer belt 130, fixing charging units 139, 140 supplement the toner suction force of the transfer paper after separation and prevent disturbance of the image, transfer belt discharging/charging units 145 and 146 discharge the transfer belt 130 and electrostatically initialize the transfer belt 130, and a belt cleaner 147 removes stains and contamination of the transfer belt 130.

A paper sensor 148 detects a tip end of a transfer member supplied onto the transfer belt 130 and a signal thereof is used as a sync. signal in a paper feed direction (sub scanning direction).

The main unit 100 is provided with a deck 150 capable of storing, for example, 4000 sheets of transfer papers. A lifter 151 of the deck 150 moves up in accordance with the quantity of transfer papers so that the transfer paper is always kept in contact with the paper feed roller 152. Moreover, a multi-manual paper feeder 153 capable of storing 100 sheets of transfer papers is provided.

In addition, in FIG. 1, a paper ejection flapper 154 changes over the path at the both-side recording side or a multiple recording side and an ejection side (sorter). A transfer paper fed out from the ejection roller 142 is changed over by the paper ejection flapper 154 to the both-side recording side or the multiple recording side. A lower transfer path 158 turn over the transfer paper fed out from the ejection roller 142 through a reversing path 155 and guides it to a paper re-feed tray 156.

A multiple flapper 157 changes over the path for both-side recording and multiple recording and the transfer paper is guided directly to the lower transfer path 158 by turning down the multiple flapper 157 to the left side without through the reversing path 155. A paper feed roller 159 feeds the transfer paper to the photoreceptor drum 126 through the path 160. An ejection roller 161 is arranged nearby the paper ejection flapper 154 and ejects the transfer paper, which is changed over to the ejection side by this paper ejection flapper 154, out of the machine.

For both-side recording (both-side copying) and multiple recording (multiple copying), the paper ejection flapper 154 is lifted up, such that the copied transfer paper is turned over and then held in the paper re-feed tray 156 through the paths 155 and 158. In the both-side recording the multiple flapper 157 is turned down to the right side, while in the multiple recording the flapper 157 is turned down to the left side. In a subsequent back-side recording or the multiple recording, the transfer paper held in the paper re-feed tray 156 is guided from the bottom thereof one by one to the resist roller 137 of the main body by a feed roller 159 via the path 160.

For transferring the transfer paper and ejecting it from the main body, the paper ejection flapper 154 is lifted up, and the flapper 157 is turned down to the right side, a copied transfer paper is sent to the transfer path 155 side and transferred to the second feed roller by a reversing roller 163 after the rear end of the transfer paper has passed through a first feed roller 162. Subsequently, the copied transfer paper is turned over by the ejection roller 161 and ejected out of the machine.

[Outline of Processing]

Figure 2:
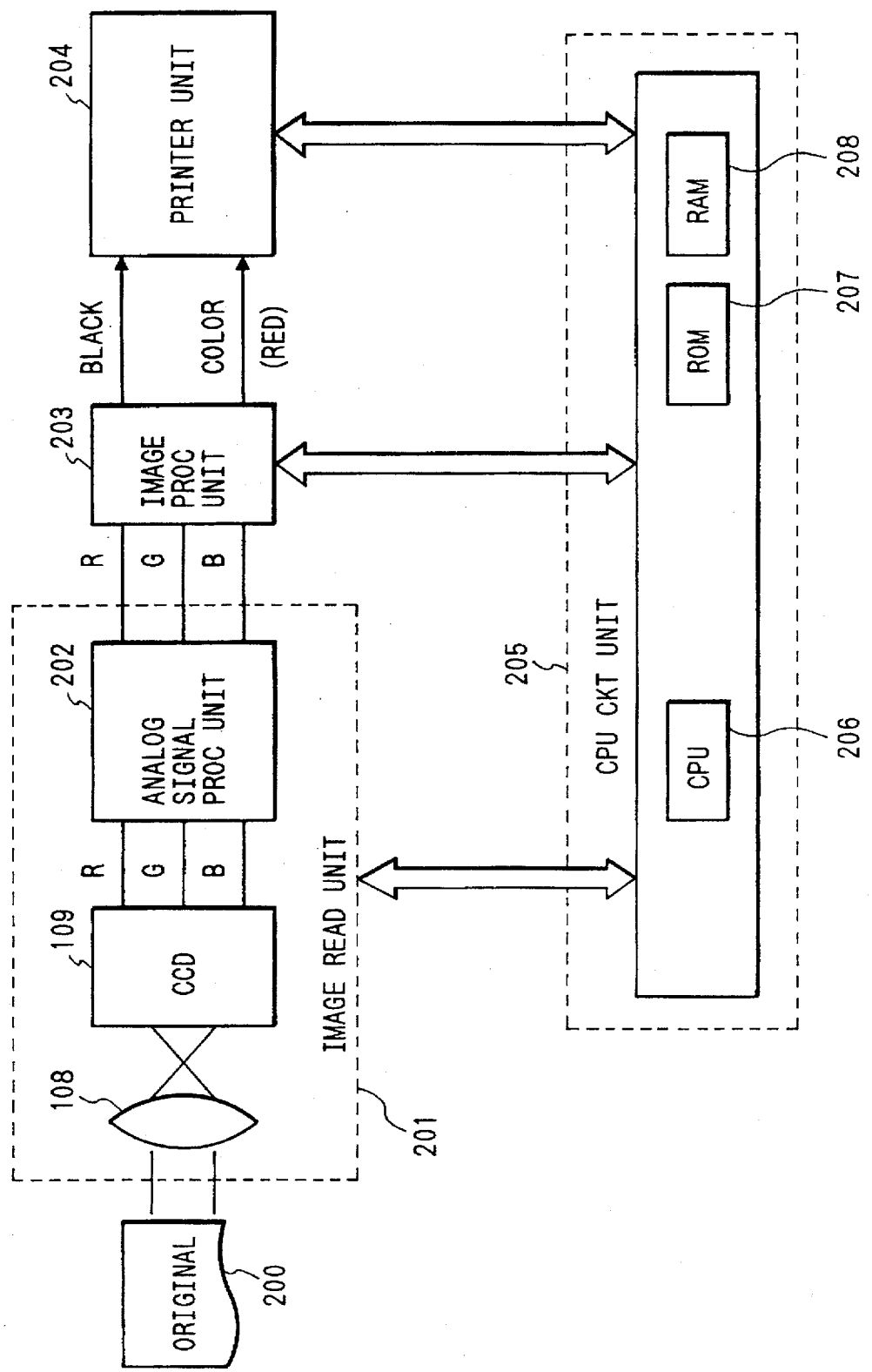
FIG. 2 is a block diagram of an electric circuit of the image formation apparatus shown in FIG. 1.

FIG. 2 shows a block diagram of the electric circuit of the image formation apparatus shown in FIG. 1.

The image read unit 201 comprises a CCD sensor 109, an analog signal processing unit 202 and others, and an image of an original 200 is focused on the CCD sensor 109 through the image lens 108. The focused image of the original is converted into analog electric signals of R (red), G (green) and B (blue). The converted image information is entered into the analog signal processing unit 202 and converted from analog to digital (A/D conversion) R, G and B colors have been respectively corrected with respect to sample & hold and dark level and digitized. Digitized full color signals are entered into the image processing unit 203.

In the image processing unit 203, those corrective processing such as shading correction, color correction, γ correction which are required for the read system, smoothing, edge emphasis and other processing and operation are carried out and the processed data is outputted to the printer unit 204.

The printer unit 204 is provided with a mechanical unit illustrated in the sectional configuration view in FIG. 1 and this mechanical unit comprises an exposure control unit 120 comprising a laser shown in FIG. 1, image forming units 126 and 127 and a transfer control unit for the transfer paper whereby an image is recorded on the transfer paper according to the entered image signal.

A CPU circuit unit 205 comprises a CPU 206, a ROM 207 and a RAM 208 and controls the image read unit 201, the image processing unit 203 and the printer unit 204, thereby totally controlling the sequence of the apparatus.

[Outline of the Data Processing Unit]

Figure 3:
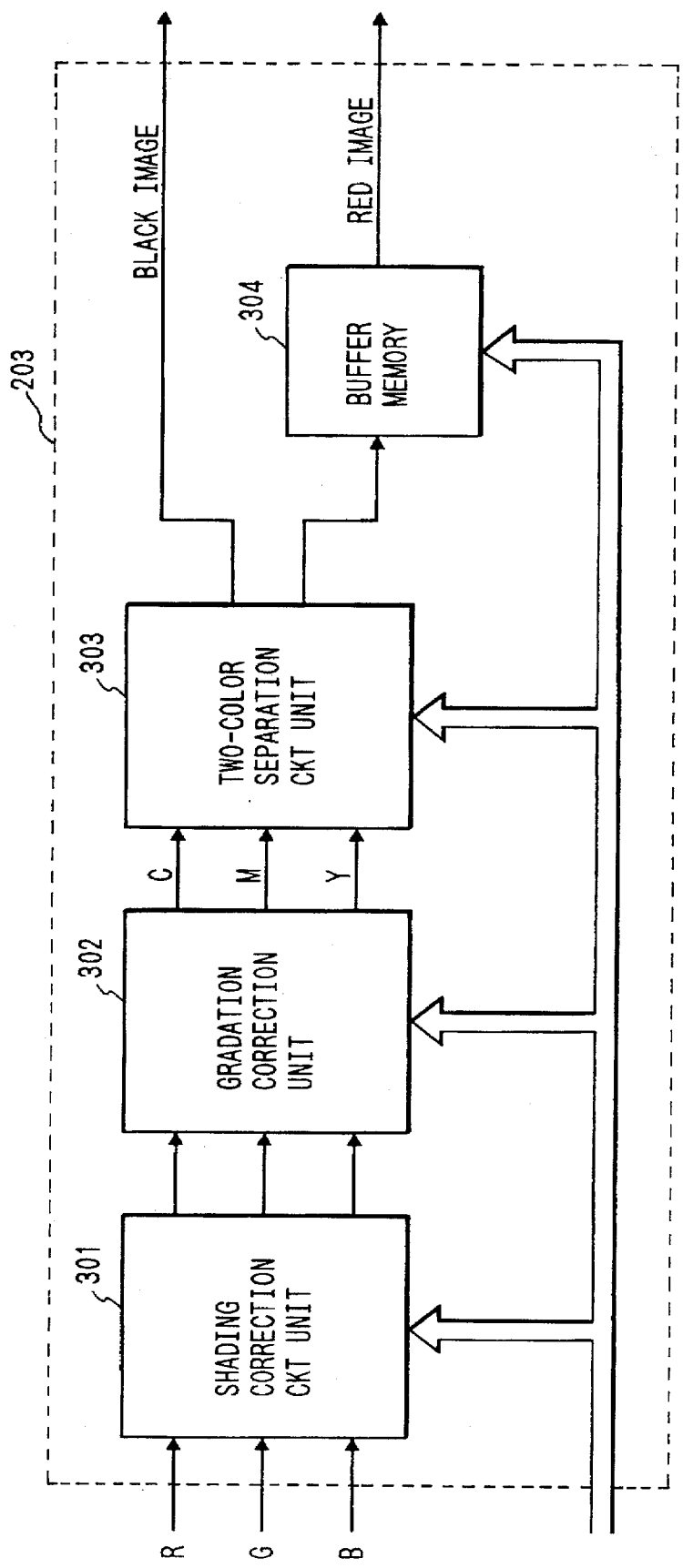
FIG. 3 is a detailed block diagram of the image processing apparatus shown in FIG. 2.

The image processing unit 203 which is the main unit of the present embodiment is described below. FIG. 3 is a block diagram showing the detailed configuration of the image processing unit 203.

A digital image signal from the analog signal processing unit 202 shown in FIG. 2 is entered into the shading correction unit 301. The shading correction unit 301 corrects variations of the sensor which reads the original and light distribution characteristics of the original illuminating lamp. The image signal hereupon corrected and calculated is entered into a gradation correction unit 302 to be converted from a luminance signal to a density signal and the density image data is generated. The image signal converted to the density signal is entered into a two-color separation circuit unit 303 which is a particular configuration of the present embodiment and red and black image data which are the toner colors for the printer unit are generated from C (cyan), M (magenta) and Y (yellow) which are the density signals.

[Configuration of the Data Processing Unit]

Figure 4:
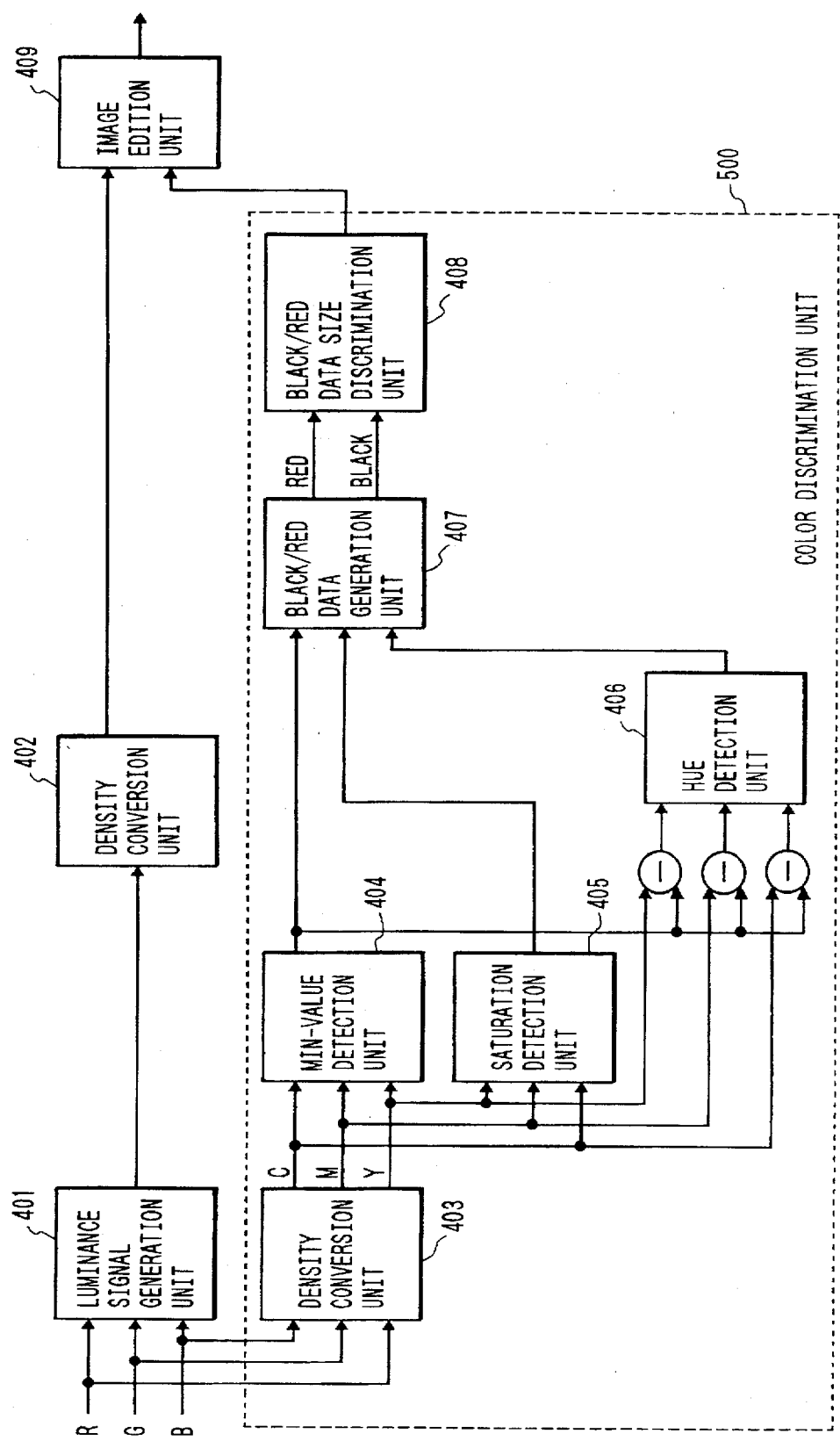
FIG. 4 is a detailed configuration of an image density data generating circuit and a two-color separating part of the embodiment.

The details of the image density data generation circuit and the two-color separation unit 303 are described referring to FIG. 4.

a) Image Density Data Generation Circuit

A luminance signal generation unit 401 generates image data which are color-synthesized in the full range of wavelength, that is, monochrome luminance image data, from R, G and B input color image data which are read by the CCD image sensor.

Luminance image data is calculated from a formula (w/b=αR+βG+γB) and generated.

A density conversion unit 402 converts the luminance image data obtained from a luminance signal generation unit 401. This is a processing which enables to maintain the density data also in copying a density similar to the density of input color image data in two colors.

b) Two-color separation unit

Color discrimination means 500 carries out two-color separation processing to generate two-color data in addition to the above-described image density data generation processing. The density conversion unit 403 converts input color image data of luminance data R, G and B read by the CCD image sensor to the density data C, M and Y as the density conversion unit 402.

A minimum value detection unit 404 detects the minimum values (C, M, Y) from the density data of C, M and Y processed in the density conversion unit 403 and generates non-saturation information Min (C, M, Y) from this information.

Further, a saturation detection unit 405 detects the maximum values (C, M, Y) from the density data of C, M and Y processed in the density conversion unit 403 and generates saturation information Max (C, M, Y) from this information.

Figure 5:
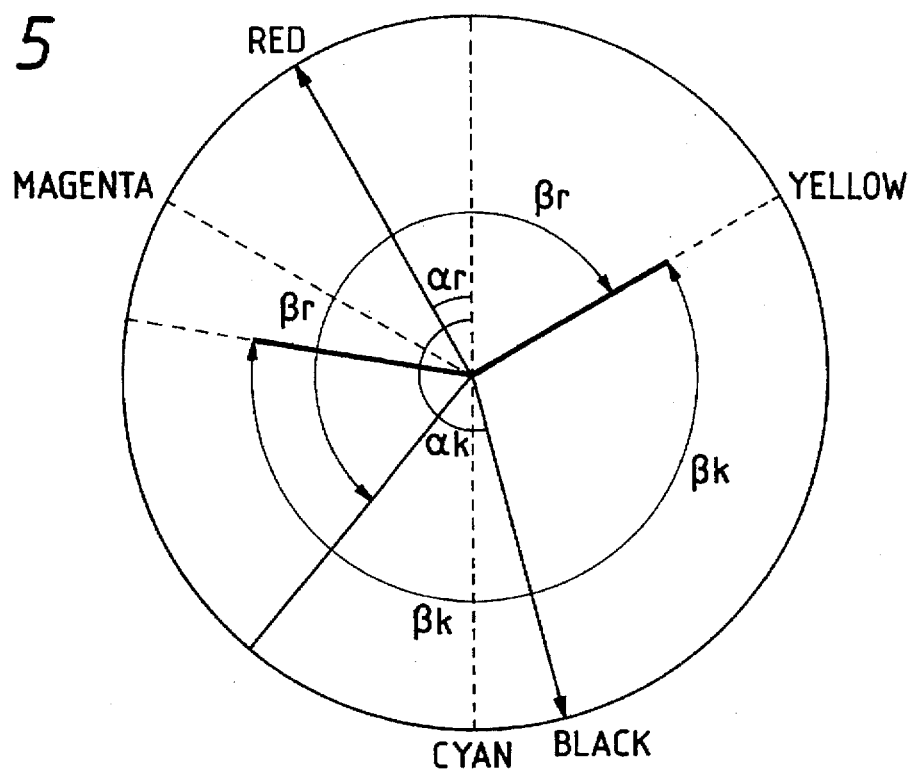
FIG. 5 is a diagram illustrating a hue space in this embodiment.

In the present embodiment, the following processing is carried out for accurate color discrimination (strictly, in the present invention, a hue space shown in FIG. 5 is used for convenience though it differs from general hues).

Since the data of R, G and B is respectively 8-bit data, 512 colors can be represented and the data will reach a great deal of volume. In the present embodiment, therefore, three-dimensional data is converted to two-dimensional data by subtracting the components (non-saturation components) generated by the minimum value detection unit 404 from the density data generated from the density conversion unit 403 in the hue detection unit 406 and hue information (angle from the reference axis) is generated. In other words, two-dimensional data is positioned on a space (0° to 360°) shown in FIG. 5, the hue information (angle) is easily and geometrically generated, and color discrimination is carried out in accordance with the generated hue information.

Accordingly, color discrimination can be carried out based on the reference axes (the RED axis for discriminating a red image and the BLACK axis for discriminating a black image) corresponding to respective colors.

A black/red data generation unit 407 generates two-color data by combining those data obtained from the minimum value detection unit 404, the saturation detection unit 405 and the hue detection unit 406. The black/red generation unit carries out the processing by which the density information is gradually reduced as the data is shifted only by a certain angle (βr) around the red axis, which is limited to a certain angle (αr), in the hue direction by using the space shown in FIG. 5.

In addition, a saturation density is extracted according to Min (C, M, Y) obtained by the minimum value detection unit 404 and Max (C, M, Y) obtained by the saturation detection unit 405, thereby carrying out a processing to vary the density information in accordance with the saturation.

The density information is generated by the above two kinds of processing in accordance with the hue and the vividness or the brightness, that is, the saturation.

The density information of black color data is generated by a processing to gradually reduce the density information as the data is shifted only by a certain angle (βk) around the black axis, which is limited to a certain angle (αk), in the hue direction and a processing to add the minimum value data of (C, M, Y).

In the present embodiment, though the density data is generated according to the hue data and the saturation data, the density data may be generated according to one of the hue data and the saturation data without being limited to the above.

The image formation apparatus for use in the present embodiment is adapted to carry out non-mixed color copying and cannot therefore simultaneously copy two colors. For this reason, a black/red data size discrimination unit 408 compares the density information of black and red data generated from the black/red data generation unit 407 to discriminate the size of the density data and determines which of black and red data should be outputted.

Through these processing, an image edition unit 409 outputs black data or red data in a density obtained by the density conversion unit 402 to the printer unit.

One of red data and black data is discriminated by the black/red discrimination unit 408 in accordance with the density information generated by the black/red data generation unit 406 and a red or black image is formed with the density information generated by the density conversion unit 402 in accordance with the results of determination.

Accordingly, even in non-mixed color copying as in the present embodiment, an image may be formed with the density information faithful to the original.

In other words, a decrease of the density of respective colors which occurs in generation of the density information of red and black colors in the color discrimination means 500 can be prevented from affecting image formation.

In the present embodiment, red data is delayed by a specified time in the buffer memory 304 shown in FIG. 3. This delay is intended to correct a physical positional deviation of the photoreceptors which are exposed to red and black images since the image formation apparatus has the image formation units corresponding to respective colors. Red color data is delayed by a specified time in this buffer memory 304 and outputted to the printer unit 204.

Figure 6:
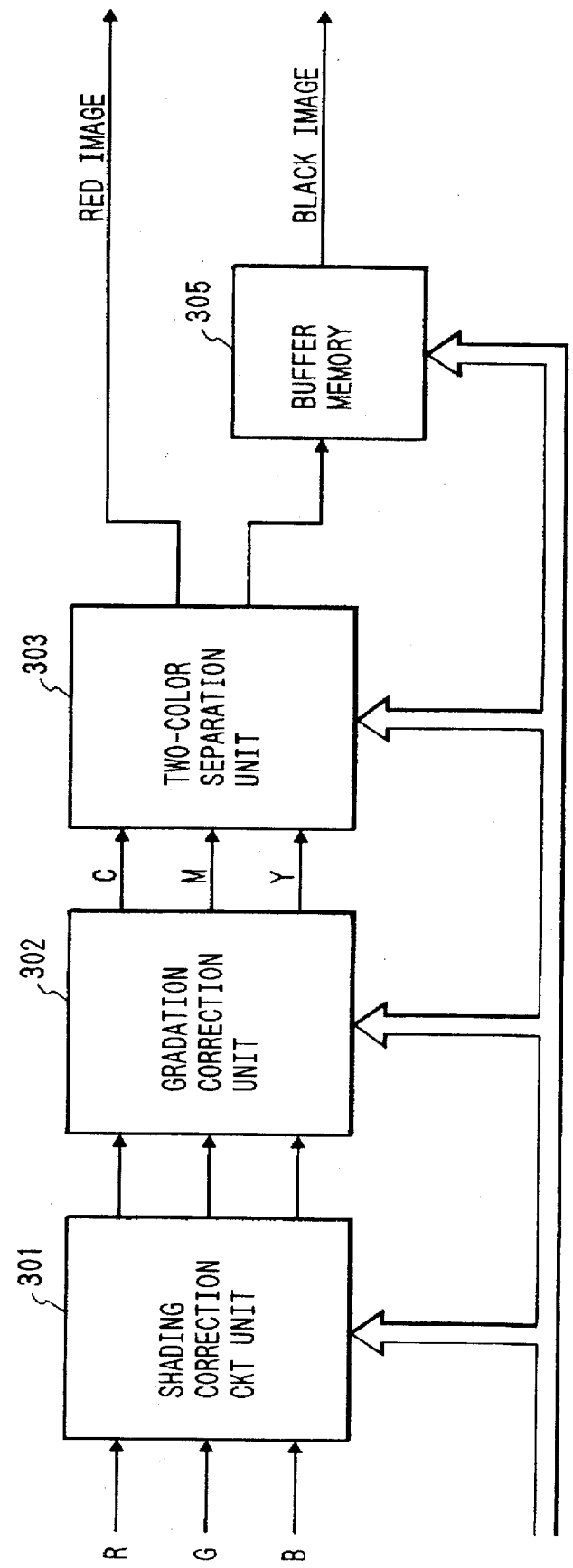
FIG. 6 is an example of a schematic block diagram of an image processing unit 203.

However, the present invention is not limited to the procedure in which a black image is first formed and subsequently a red image is formed as described above and may adopt an image formation sequence that the red image is first formed and the black image is subsequently formed by delaying the black image in the buffer memory 306 as shown in FIG. 6.

As described above, the present embodiment enables copying with gradation of a plurality of colors and without drop colors while maintaining a density of a full-color image even when the dot non-color mixed technique (a technique which prevents a plurality of toner colors from being superposed in one dot) is applied, by separately generating the density of an input color image and the data based on two-color separation.

Moreover, in two-color separation of black and red, a two-color output image can be obtained as the user desires by setting the parameters of the black/red data generation unit. A scale of the circuit can be reduced and an economical processing apparatus can be provided by commonly using image signals including a plurality of color components, as compared with the system having independent image signal circuits.

As described above, the present embodiment enables copying with gradation of a plurality of colors and without drop colors while maintaining a density of a full-color image even when the dot non-color mixed technique (a technique which prevents a plurality of toner colors from being superposed in one dot) is applied when outputting input color image information.

Moreover, in two-color separation of black and red, a two-color output image can be obtained as the user desires by setting the parameters of the black/red data generation unit.

A scale of the circuit can be reduced and an economical processing apparatus can be provided by commonly using image signals including a plurality of color components, as compared with the apparatus having independent image signal circuits.

[Second Embodiment]

The image formation apparatus in the first embodiment is such that a color original is read by a photoelectric conversion device such as a color CCD, areas are discriminated from color information on the original, and images of discriminated areas are formed in different colors (for example, red and black).

Specifically, this image formation apparatus is such that, for example, red and black components are separated from read color image signals and an image of the red component is formed in red and the images of other components are formed in black, thereby reproducing a color original in two different colors.

However, the image formation apparatus according to the first embodiment includes a point to be improved as described below. In the image formation apparatus for discriminating areas and forming images in different colors, there is a point to be improved that, though an effect can be expected in the point that red characters partly included in a monochrome original can be reproduced in red, some areas are reproduced in the same color if an image of a full-colored original is formed in two colors (two-color output representation).

An image formation apparatus according to a second embodiment is improved in the above point, the apparatus is capable of reproducing even a full-colored original in two-color output representation with high accuracy and clearly representing colored portions of the image without using color discrimination sensors.

The image formation apparatus according to the second embodiment is described, referring to the drawings.

Since the configuration of the copying machine, the outline of processing and the outline of the data processing unit regarding the image formation apparatus according to the second embodiment are as substantially same as in the image formation apparatus described in the first embodiment, the relevant descriptions are omitted.

Figure 7:
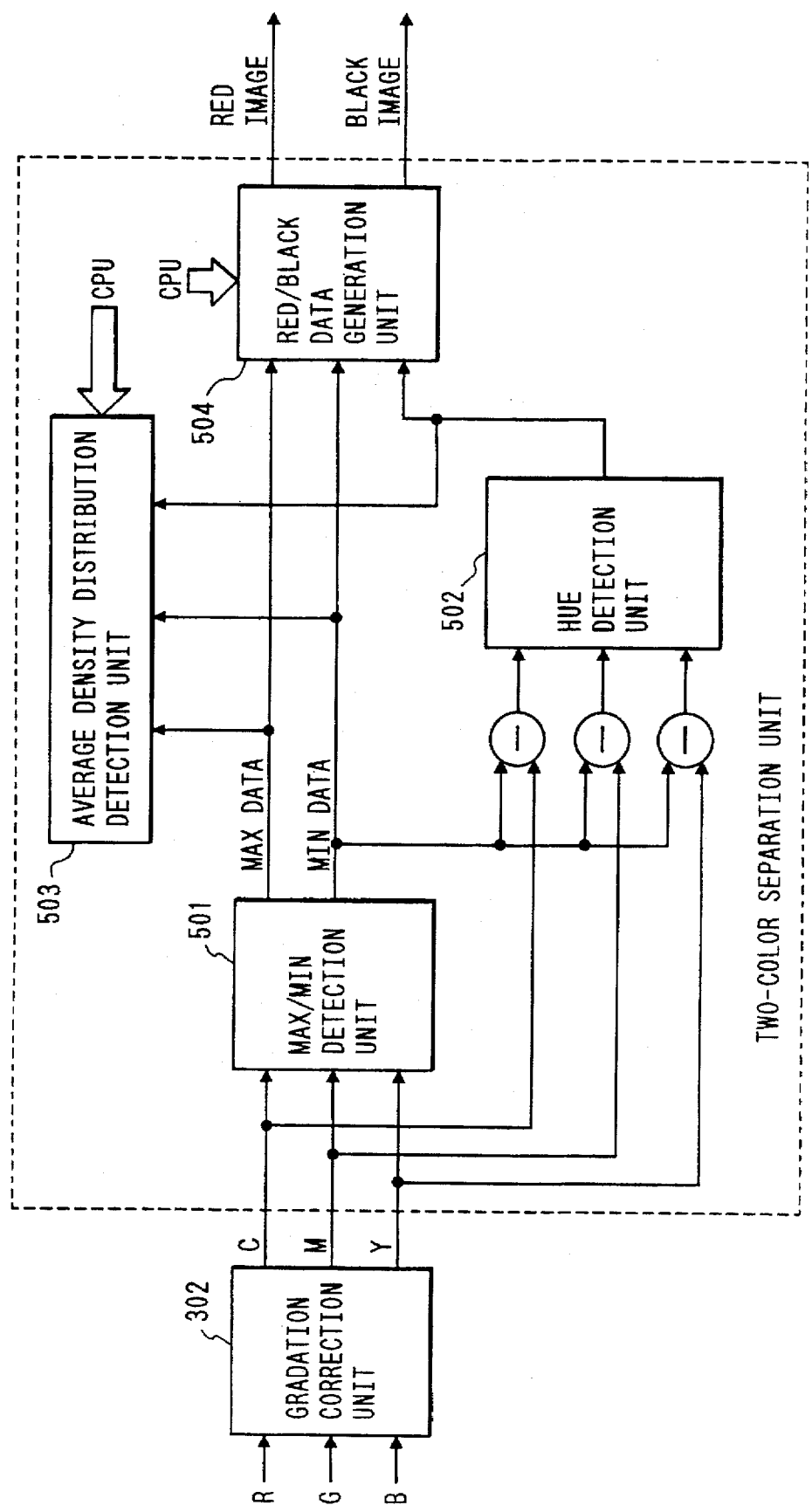
FIG. 7 is a schematic block diagram of a two-color separation unit 303.

A two-color separation unit 303 which is the point of the present embodiment is described in detail, referring to FIG. 7.

In this embodiment, prescanning is carried out before copying the original to check the density distribution (color distribution) of the whole image. This enables to represent a full-color discriminated original in different densities even when it is outputted in two colors.

First a method for obtaining the density distribution (color distribution) described above is described.

The density data of digital image signals to be outputted from the gradation correction unit 302 shown in FIG. 3 is entered into a max/min detection unit 501 shown in FIG. 7 and the maximum and minimum values in respective density data (C, M, Y) are detected. These max. value (C, M, Y) and min. value (C, M, Y) are entered into an average density distribution detection unit 503 and a black/red data generation unit 504. In addition, the saturation data is generated by subtracting Min (C, M, Y) data from Max (C, M, Y) data when the max and min values are entered into the average density distribution detection unit 503.

Color conversion from three-color saturation components to two-color saturation components, that is, from three-dimensional data to two-dimensional data, is carried out by subtracting the density data from the gradation correction unit 302 and the Min data from the max/min detection unit 501 in the hue detection unit 502. This conversion is carried out to convert three-dimensional data of cyan, magenta and yellow to two-dimensional data since color spaces can be represented in the saturation, lightness and hue as known from the Munsell's color cube and the like. Min (cyan, magenta, yellow) values are subtracted from cyan, magenta and yellow data by making use the fact that min (cyan, magenta, yellow) values which are the minimum values of cyan, magenta and yellow are non-saturation components, and the remaining information is used as the saturation components. Hence conversion to two-dimensional input color spaces is attained in a simple configuration.

Figure 8:
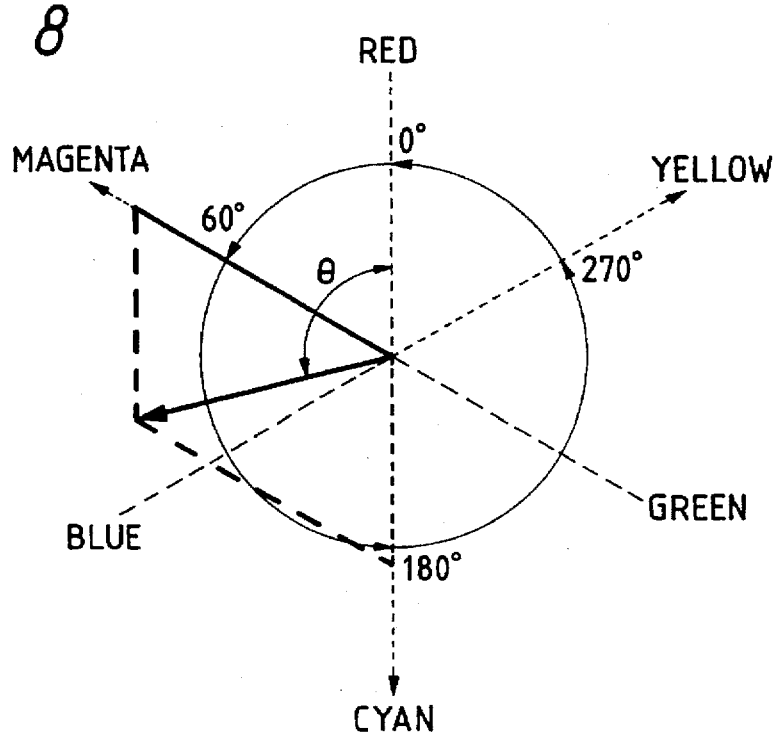
FIG. 8 is a diagram showing a color space used in a first embodiment.

A plane thus converted is arranged on a circumference of 0° to 360° as shown in FIG. 8 and an angle (see FIG. 8) between the position of two saturation components which are vector-synthesized and the reference axis may be obtained through the lookup table (ROM). This result obtained is outputted from the hue detection unit 502.

The angle (hue) data obtained from the hue detection unit 502 through the above process and the data obtained from the max/min detection unit 501 are entered into the average density detection unit 503 to obtain the density distribution (color distribution) to be used in the whole image.

Figure 9:
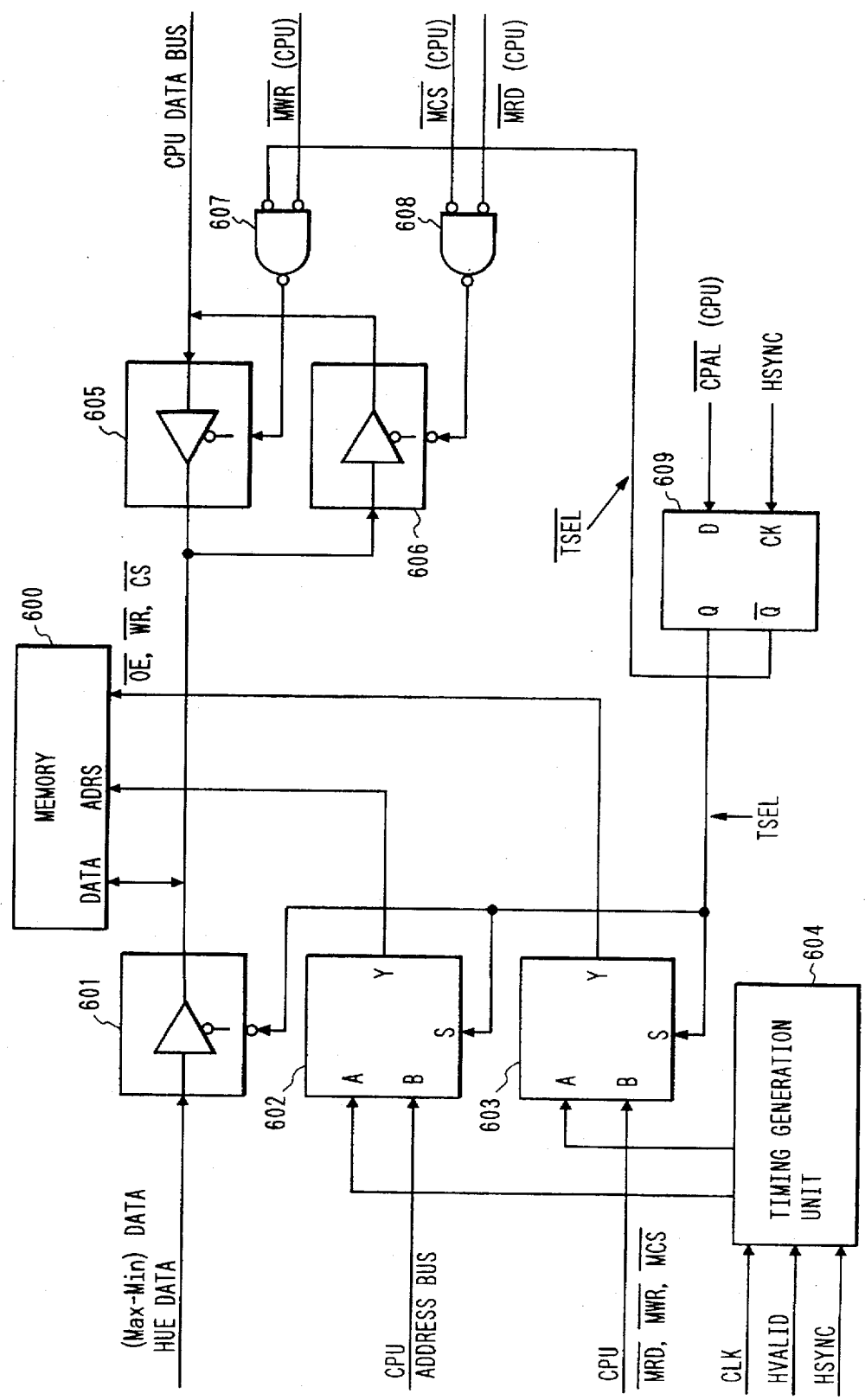
FIG. 9 is a diagram showing an average density distribution detection unit.

FIG. 9 is a block diagram showing the details of the average density detection unit 503 shown in FIG. 7. The average density detection unit 503 supports detection of the average density of the input image by the CPU.

The average density detection unit as a whole is controlled with the signals from the timing generation unit and the CPU based on the sync. signals of HSYNC, HVALID and CLK. A memory 600 is a writable memory such as a RAM which has a capacity capable of storing image information as much as one line which is read by the image read unit 201. A buffer 601 capable of controlling the output transmits Max-Min data which is the saturation data and the angle data which is the hue data from the hue detection unit 502 according to the data from the max/min detection unit 401 when the TSEL signal has the low level. Data selectors 602 and 603 are respectively able to select the control signals (address, /OE, /WR, /MCS) of a timing generation unit 604 and the control signals (address, bus, /MRD, /MWR, /MCS) of the CPU and supply the selected control signal to the memory 600.

The timing generation unit 604 generates a control signal from a sync. signal such as CLK, HVALID and HSYNC.

An output of a buffer 605 capable of controlling the output is controlled with a $\overline{\text{TSEL}}$ signal and a $\overline{\text{MWR}}$ signal which has been entered into a negative logic input NAND gate 607. The data from the CPU data bus is written when the NAND gate 607 has the "L" level. An output of a buffer 606 capable of controlling the output is also controlled with a /MCS signal and a /MRD signal which has been entered into a negative logic input NAND gate 608. When the NAND gate 608 is set at the "L" level, the buffer 606 sends the data read from the memory 600 to the CPU data bus.

A D type flip-flop 609 synchronizes a control signal CPAL from the CPU with the sync. signal HSYNC for one line and generates a TSEL signal.

Figure 10:
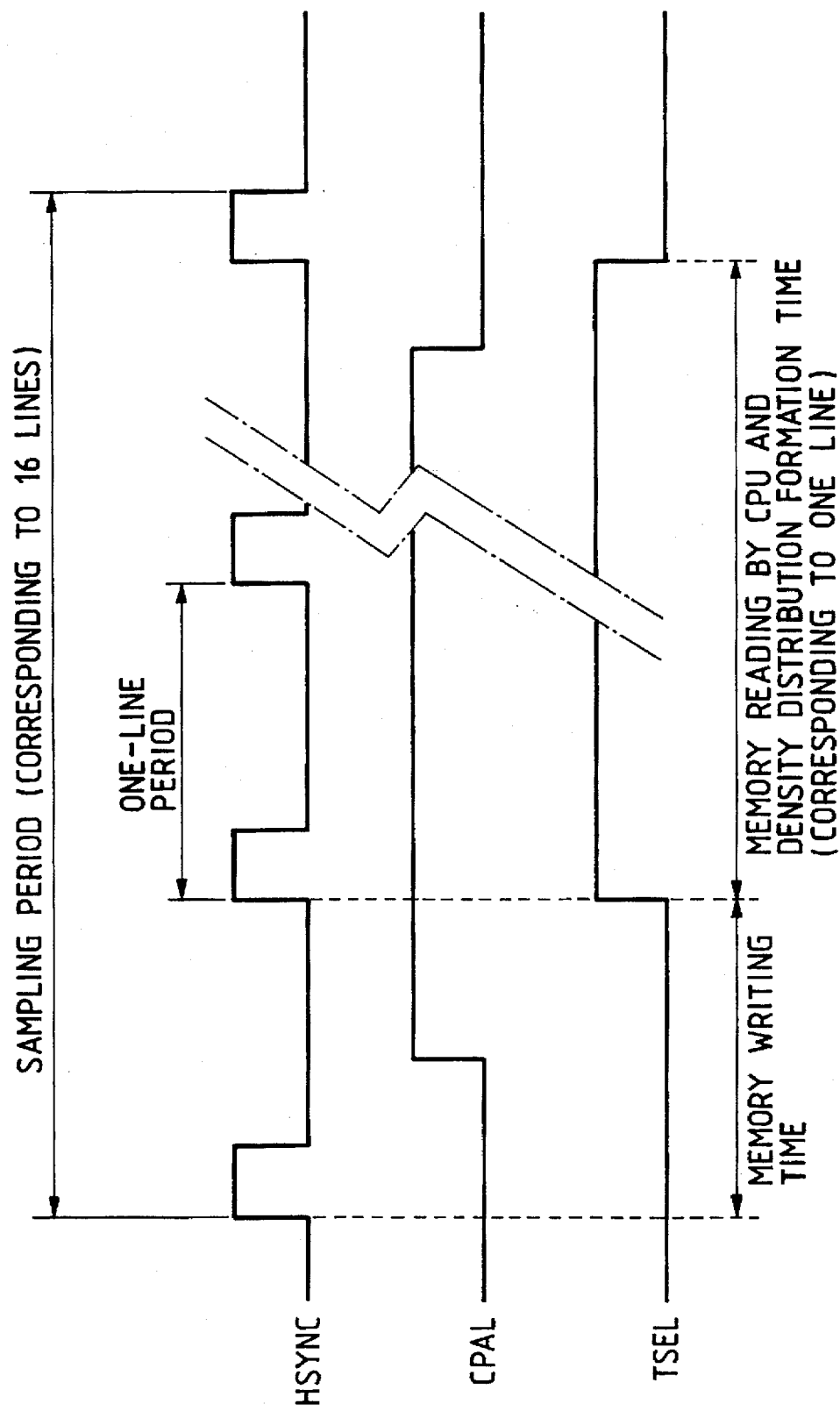
FIG. 10 is a diagram showing an operating condition in forming a density distribution.
Figure 11:
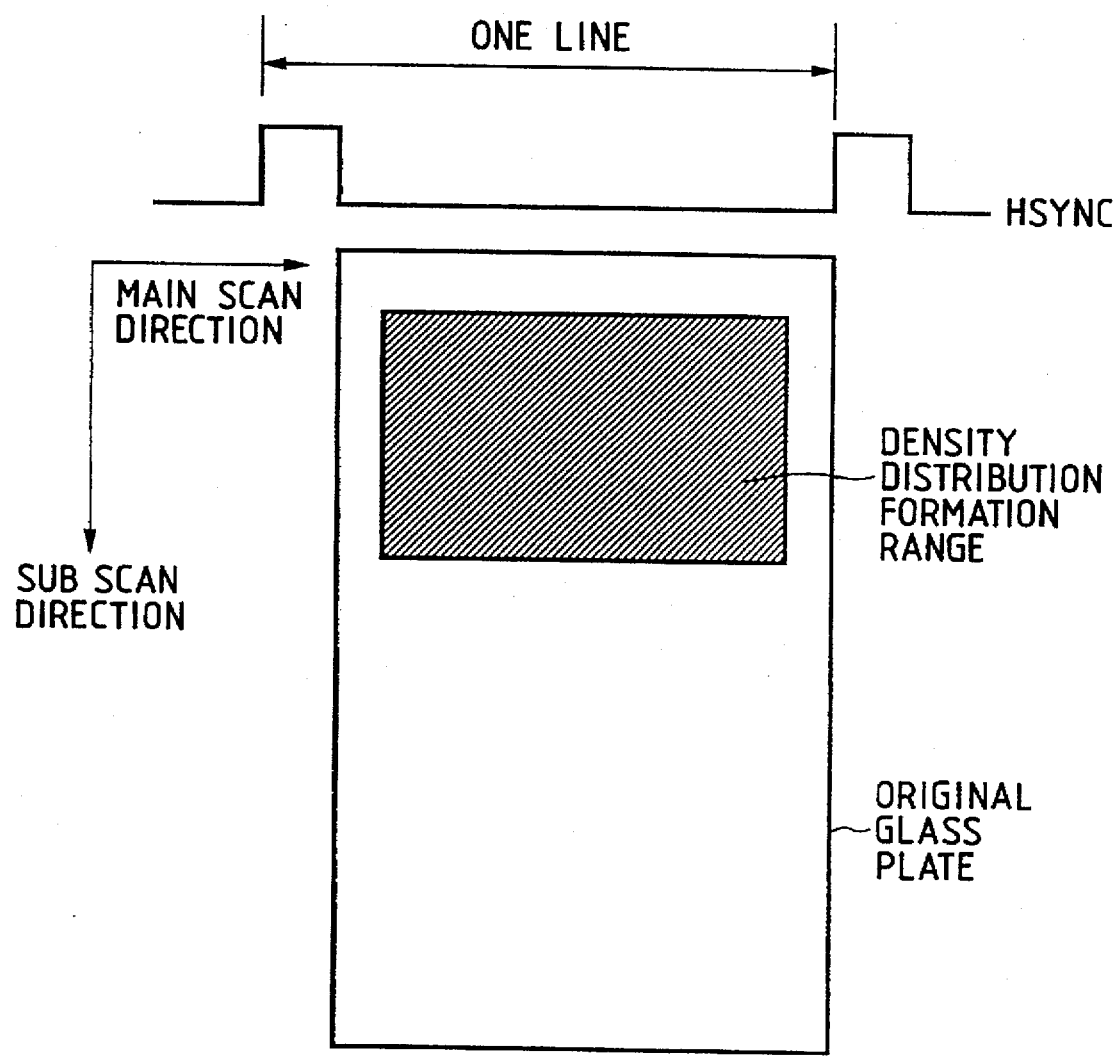
FIG. 11 is a diagram showing a density distribution formation range.

The TSEL signal and the operating condition of the average density distribution detection unit 503 are shown in FIG. 10. The TSEL signal is generated as being synchronized with control signals CPAL and HSYNC from the CPU.

The saturation data based on the data from the Max/Min detection unit 501 and the hue data from the hue detection unit 502 are written in the memory during a period when the TSEL signal has the "L" level and the contents of the memory are read by the CPU during the period when the TSEL signal has the "H" level. In this read operation, the data for one line (see FIG. 10) is added to the RAM in the CPU as the density distribution (color distribution).

Figure 12:
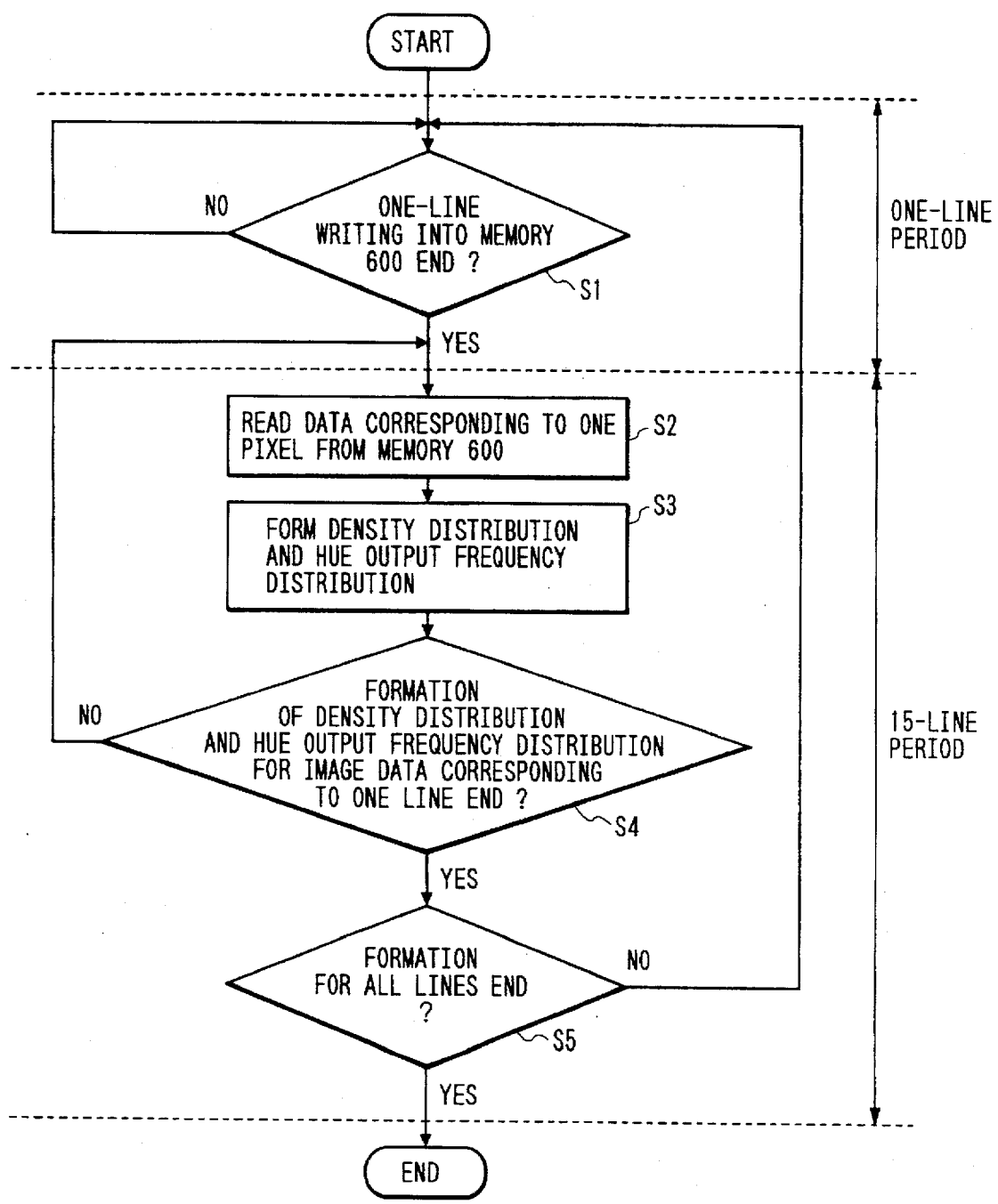
FIG. 12 is a flow chart showing the operation for forming the density distribution and the hue output frequency distribution by the CPU.

Processing in the CPU for generating the density distribution and the hue output frequency distribution is described in detail, referring to the flow chart shown in FIG. 12.

It is determined whether or not the write operation of the image data for one line in the memory 600 has been finished (step S1).

The above processing is cyclically repeated until the write is finished (step S1).

If it is determined in step S1 that the write is finished, data for one pixel is read out from the memory 600 (step S2).

The density distribution and the hue output frequency distribution are generated and updated in sequence according to the data read (step S3).

It is determined whether or not the density distribution and the hue output frequency distribution are generated based on all image data for one line stored in the memory 600 (step S4).

The processing from step S2 to step S4 is repeated until the density distribution and the hue output frequency distribution are generated according to all image data for one line.

If it is determined in step S4 that the generation of the density distribution and the hue output frequency distribution has been finished, it is determined that the generation of the density distribution and the hue output frequency distribution has been finished for all lines of the image (step S5).

The processing from step S1 to step S5 is repeated until the above generation is finished for all lines.

If it is determined that the generation of the density distribution and the hue output frequency distribution has been finished for all lines, the processing regarding the generation of the density distribution and the hue output frequency distribution is finished.

In the processing by the CPU, a time for a one-line cycle is required for the processing in step S1 and a time for a 15-line cycle is required for the processing in step S5.

Accordingly, in this embodiment, one of 16 lines is used; in other words, the density distribution and the hue output frequency distribution are generated by thinning pixel data.

As described above, the CPU requests to add respective hue distributions (color distributions) and the output frequency distribution of respective hues (angular data of the output from the hue detection unit 502) by using the average density distribution detection unit 503 shown in FIG. 7. Moreover, the CPU obtains an average density distribution (color distribution) used for the overall image by dividing the added value of the overall image by the output frequency.

Figure 13:
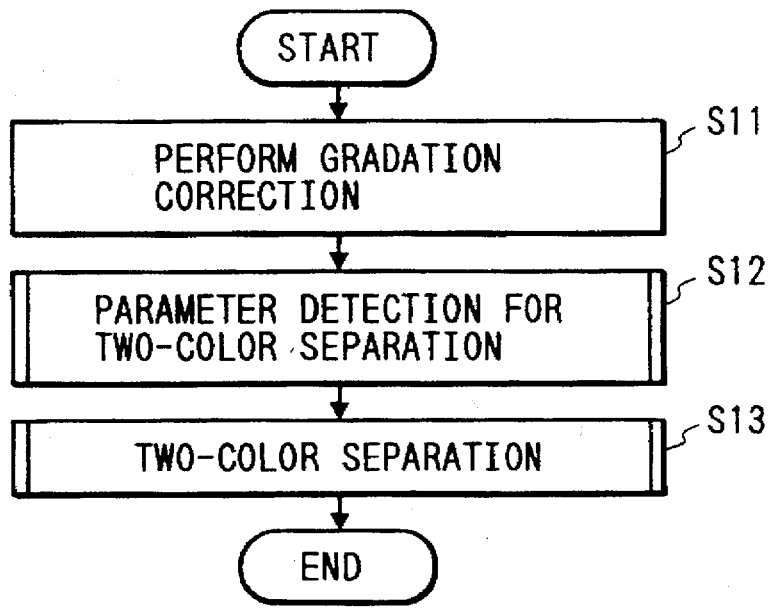
FIG. 13 is a main flow chart showing the operation of the two-color separation unit.
Figure 14:
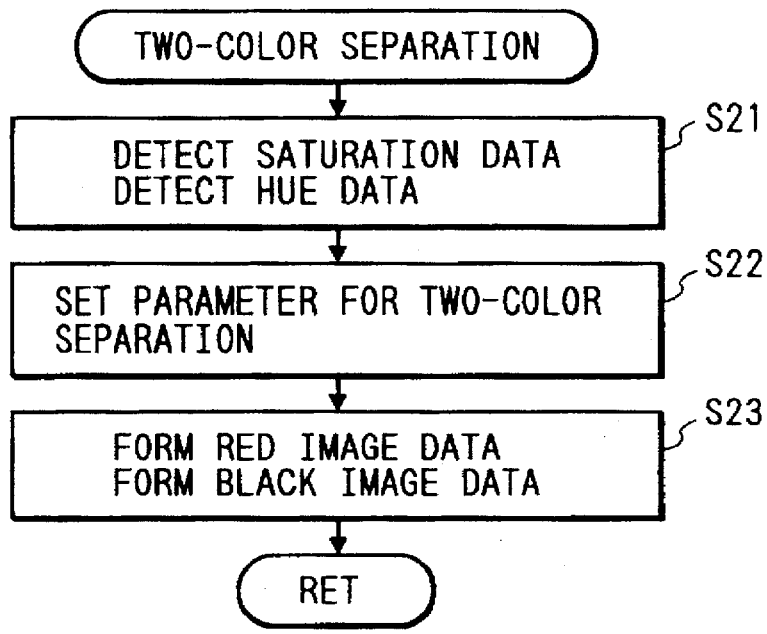
FIG. 14 is a sub flow chart showing the operation of the two-color separation unit.

The flow of two-color separation processing in the present invention is described in detail, referring to the flow charts shown in FIGS. 13, 14 and 15.

In FIG. 13, in this method, the CPU obtains a color distribution (average density distribution) by using the average density detection unit 503 described above after the luminance signal 13 of the original read by prescan operation has been converted to the density data in the gradation correction unit 302 (step S11), and detects the parameters with respect to the reference axis (an axis from the center of the color space to the saturation direction) corresponding to the color distribution of the original and the range of spreading in the hue direction of two colors by using the method described later, from the characteristic point of the color distribution (step S12). Subsequently, the result is written in the black/red data generation unit in the two-color separation unit 303 and two-color separation in response to the original is carried out (step S13).

For convenience in description of this method, a two-color data generation method (step S13) which will be finally carried out is first described and the parameter setting method (step S12) by which, if a discriminated full-color original is represented in two colors, the image is not reproduced in the same color is subsequently described.

(1) Two-color data generation method (FIG. 14)

Two-color saturation components are generated and the hue data is detected by subtracting the Min data of the max/min detection unit 501 from the output density data (cyan, magenta, yellow) of the gradation correction unit 302 shown in FIG. 6 (FIG. 7). The saturation data is detected by subtracting the Min data from the Max data of the density data (cyan, magenta, yellow) (step S21).

Figure 16A:
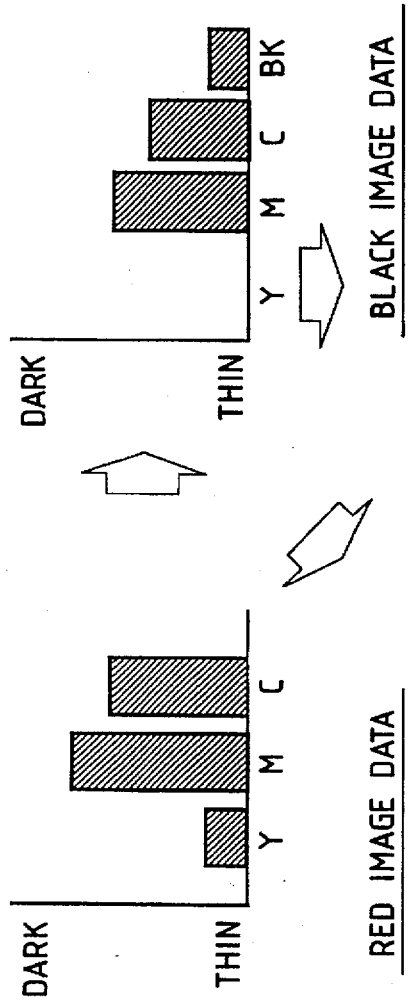
FIGS. 16A to 16C are respectively a diagram showing a two-color data forming method.

An example of generation of the above two-color saturation components is shown in FIG. 16A.

In this example, yellow represents the minimum value (non-saturation component) and therefore the density data of yellow becomes the black data (Bk) and the value of yellow data from the density data is 0. The Min data is substituted for the black data by utilizing that the minimum value of the density data is the non-saturation component.

A parameter for carrying out two-color separation detected in step S12 is set (step S22).

Two-color saturation components obtained are assigned to respective axes (see FIG. 8) on the color space based on the preset parameters to generate red and black data (step S23). The red data generation method is first described.

Figure 16C:
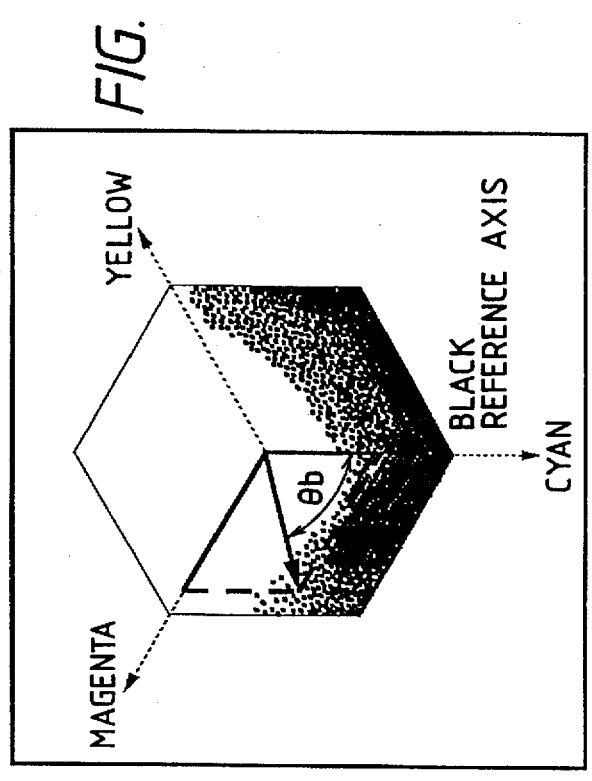
Figure 16B:
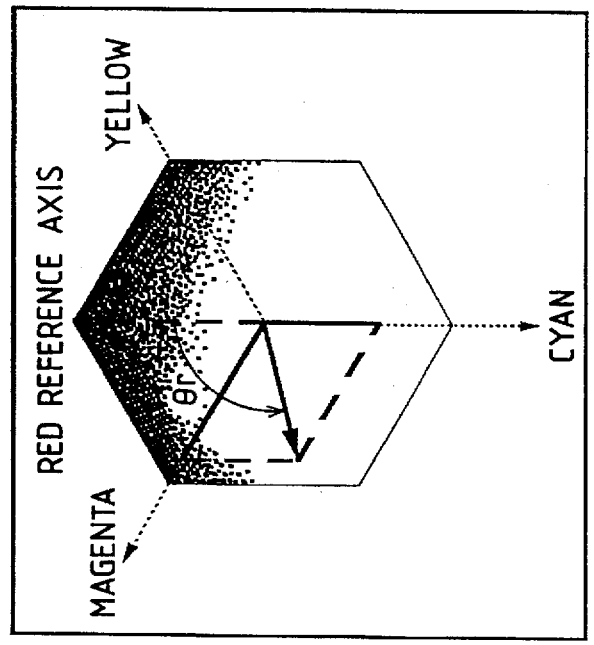

Red image data (density of red) is obtained as an angular function of angle θr between a resultant vector obtained by assigning two-color saturation components to respective axes on the color space and the RED reference axis as shown in FIG. 16B. In other words, red becomes more dark as the vector approaches the RED reference axis. Simultaneously, red also becomes more dark since the side values become large as the vector leaves more from the center. If the red data is thus generated, the red area can be covered in a larger range of red than captured by one filter image and a natural image can be formed.

In actual image formation, if the red data is generated by the method shown in FIG. 16B and the image is formed only in black, which is not colored, that is, BK shown in FIG. 16A, a dropout color occurs at the cyan side and a natural image cannot be formed. In this method, therefore, this dropout color is eliminated by adding black to cyan which is a complementary color for red. Generation of black data is basically the same as for red data.

As shown in FIG. 16C, the density at that point is obtained as an angular function of angle θb between a resultant vector of two-color saturation components and the BLACK reference axis. Consequently, in the black data at the cyan side added to BK, black becomes more dark as the vector approaches the BLACK reference axis and the saturation value becomes larger and black becomes more dark as the vector leaves more from the center.

If the two-color data is generated by the method described above, a natural image free from dropout colors can be formed.

If a full-colored original is represented in two colors for output, some areas may appear in the same color. In the case of, for example, the red image data shown in FIG. 16B, it is easily known that magenta and yellow have the same density with the RED reference axis as a symmetrical axis. Therefore, the present invention solves a problem of such same color representation by setting the parameters (the reference axis and the range of density spreading) which prevent the same color reproduction.

(2) Parameter Setting Method (FIG. 15)

In the present invention, the average density distribution, that is, the color distribution used for the whole image is detected in prescan to set the parameter which prevents the same color representation in reproduction. In this case, sampling can be made by roughly thinning the data to the extent that the characteristics of color distribution of the whole image are not deteriorated but the following describes only an example of sampling of every 16 lines in the sub scan direction (see FIG. 10).

The saturation data and the hue data are detected based on the density data (C, M, Y) obtained by prescan as in the step S21 shown in FIG. 14 (step S31).

The density distribution data of the whole image is generated by the CPU and the average density distribution detection unit 503 (step S32).

A characteristic point of the image is extracted based on the density distribution data generated and detection of the parameters for red data (step S33) and detection of the parameters for black data (step S34) are carried out according to the density distribution data generated.

The above processing is described in detail, referring to FIGS. 17A to 17D as examples.

FIG. 17A shows an example of the average density distributions of colors used in the whole image (original) in the prescan.

In this example, seven peaks indicate that seven colors are used in the whole image (original). In FIG. 17A, it is easily known that two colors, magenta and yellow, showing the largest peak values at the right and left symmetrical positions to the reference axis are represented as the same color with the same density since these colors have the same height of peak. (FIG. 17B).

In this case, therefore, the reference axis is shifted to one of these largest peaks as shown in FIG. 17C. Consequently, the density values of these two points (magenta and yellow) can be changed. Specifically, as shown in this example (FIG. 17C), magenta can be made more dark than yellow by shifting the reference axis to the peak of magenta and a full-colored image can be represented in different densities (FIG. 17D).

A reason why the reference axis is to be shifted to the magenta side and not to the yellow side is that a more natural image can be formed by shifting the reference value to a warm color when two colors which have been represented as the same color are compared.

The above has described only the case that the red image data has the same density. The present method can convert the black image data added to cyan to a density free from the same color representation. In this case, the density of black characters does not change.

The range which should be colored in red and black, that is the range of the degrees of angle from the reference axis which should be colored in specified colors as well as the position of the reference axis for red and black data can also be obtained based on the characteristics of the image obtained as a result of prescan.

Two-color data free from the same color representation can be generated for a full-colored original in two-color separation by writing the parameters (the position (angle) of the reference axis for red and black and the range (angle) for red and black) obtained from the above results in the black/red data generation unit in the two-color separation unit 303.

Calculation shown above is carried out, and the red and black data outputted from the two-color separation circuit 303 is outputted to the printer unit.

A comparative example of the second embodiment is described below.

(1) In the above second embodiment, the average density distribution (color distribution) is checked in the prescan by sampling every other 15 lines in the sub scan direction. However, the present invention is not limited to such scanning method and the sampling interval both in main scan and sub scan may be a few millimeters as far as the characteristics of the whole image are not lost.

(2) The scanning speed can be faster to reduce the prescan time. This enables sampling of an elongate range in the sub scan direction and obtaining the color distribution (average density distribution) in a wider range than for prescan at the equivalent speed.

(3) In the above second embodiment, the parameters such as the reference axes are directly detected from the data distributions obtained in detection of the characteristic points of the average density distribution. However, the detection can be conducted after a conversion processing for averaging adjacent peak values. Smoothing in the range of, for example, 3 pixels to 5 pixels reduces errors in determination.

(4) The color distribution of the whole image can be checked by using the luminance signals (inverted density data) and not by using the density data ("0" means "light" and "255" means "dark"). Though the signal values are inverted if the color distribution is obtained by using the luminance signals, this method does not basically differ from the method using the density data.

(5) In the above first embodiment, the characteristic points are extracted after the density distribution of the image is averaged according to the output frequency. However, the present invention is not limited to this method. The density data of the whole image or the histogram of luminance signals can be simply obtained and the characteristic points can be extracted.

(6) In the above second embodiment, the range where two colors are crossed (overlapped) is fixedly determined to approximately 20 degrees (not shown) in setting the range of spreading of red and black. However, the present invention is not limited to this size of range and enables to change, as required, the range of overlapping two colors (the spreading range of red and black) in accordance with the condition of the image.

(7) In the above description, the average density distribution data is generated regardless of the colors of the original. However, such generation of data can be done in response to the colors of the original. For example, the average density distribution of warm colors and the average density distribution of cold colors can be separately obtained and the reference axes and the spreading ranges of output colors corresponding to respective distributions thereof can be obtained.

(8) In the above description, the method for setting the reference axis which is a parameter is described as a method which prevents the same color representation in two-color output of a full-colored original. The present invention is not limited to the reference axis setting method. In other words, the color distribution which extends in the right and left sides from the reference axis can be given a gradient while the reference axis is kept fixed. For example, there can be provided a difference in the color spreading ranges at the symmetrical magenta side and yellow side while red is defined as the fixed reference axis (see FIG. 8) and therefore the same color representation can be eliminated.

As described above, the second embodiment comprises an input means for entering a color original image and converting the image data into electric signals, a density distribution detection means for obtaining a density distribution with respect to a hue for each level of the electric signal to be outputted from the above input means, an original characteristic detection means for obtaining characteristic points of the above color original image from the result of the density distribution, and a two-color separation means for separating a full-colored original into two colors without the same color representation from the information of the characteristic points. Accordingly, high precision images almost free from the same color representation can be formed and a satisfactory output representation including no dropout colors can be made even when a full-colored original is reproduced in two-color output representation.

[Third Embodiment]

The second embodiment is intended to improve the point that an area where the original colors only appear as the same color in two-color output representation of a full-colored original.

On the other hand, the third embodiment is intended to improve the disadvantage of the first embodiment that deterioration of the density will occur in re-reproduction.

To make clear the above-described objects of the present invention, a black/red two-color separation method disclosed in Japanese Patent Application No. 5-244735 which is the prior application (unknown) of the present applicant is described below.

Figures 20A, 20B:
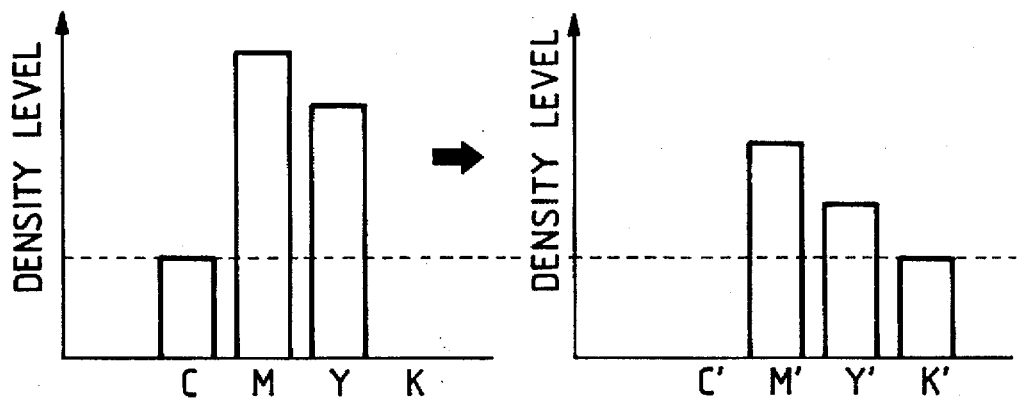
FIGS. 20A and 20B are respectively a basic conceptional diagram for forming a black image related to an embodiment of the present invention.

The minimum values, min(CMY), of the density signals, cyan (C), magenta (M) and yellow (Y), which show the original image are obtained as shown in FIG. 20A, and the value of C is calculated in FIG. 20B and C', M' and Y' are calculated as shown with the formulae (11), (12) and (13) from the C, M and Y signals.

$$C'=C-\min(CMY) \tag{11}$$

$$M'=M-\min(CMY) \tag{12}$$

$$Y'=Y-\min(CMY) \tag{13}$$

Figure 21:
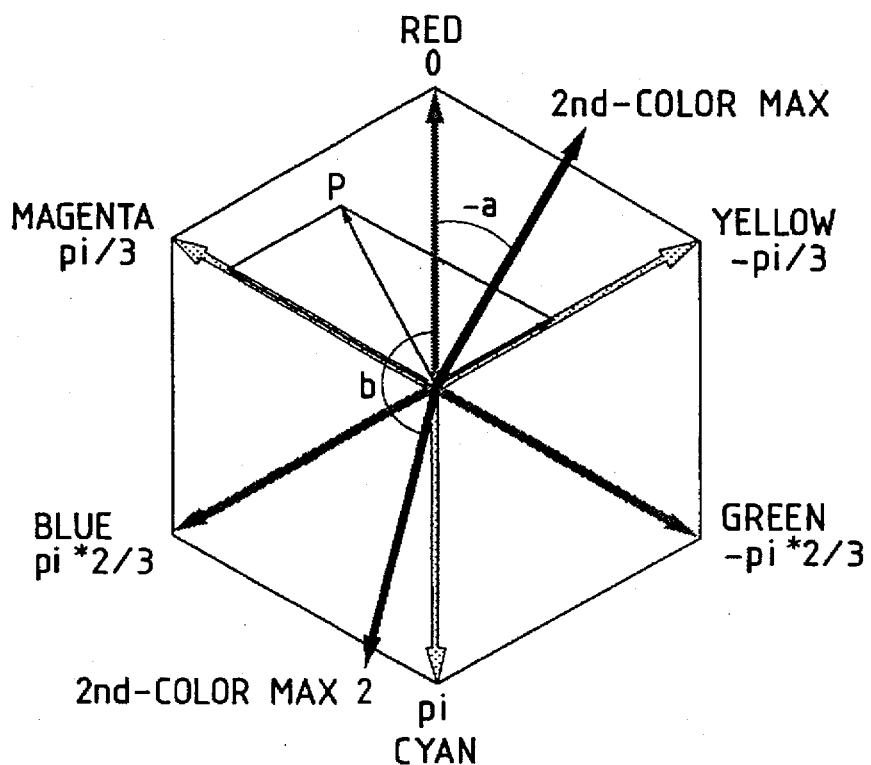
FIG. 21 is a diagram showing positions of image data in a density gradient representation.

In the above calculation, hue components are expressed as a two-dimensional space by two signals. Point P in FIG. 21 is obtained by synthesizing the vectors of these two components and detecting the data showing the density of the input pixel.

Figure 22A:
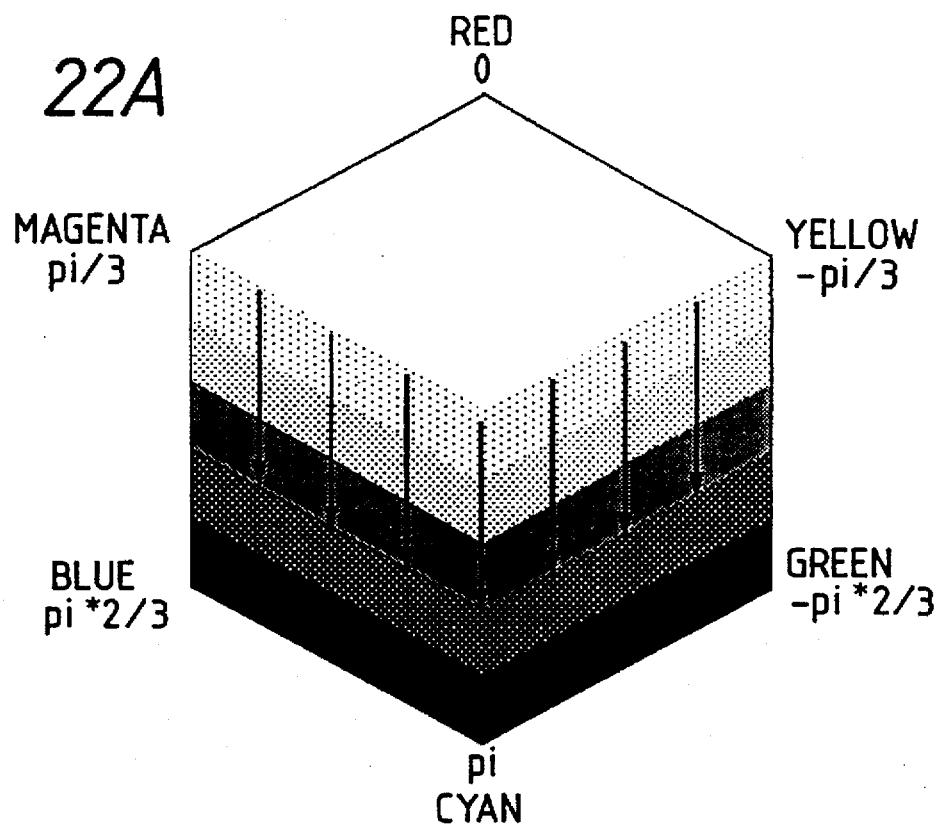
FIG. 22A is a diagram showing a density gradient of black image data according to the related art.

As shown in FIG. 22A, the axes of C, M and Y are respectively assigned for every pi/3 deg, and color discrimination and color separation are executed. In this case, an angle in this density gradient (hereafter referred to as "deg") corresponds to the hue and pi means "π" (180 degrees). The black arrow indicates the density gradient formula (11) for the C' component. In addition, the black component (K) is obtained by adding the C' component, which is symmetrical to the R component, to the above value min(CMY) as shown in the formula (14).

$$K=C'+\min(CMY) \tag{14}$$

Figure 22B:
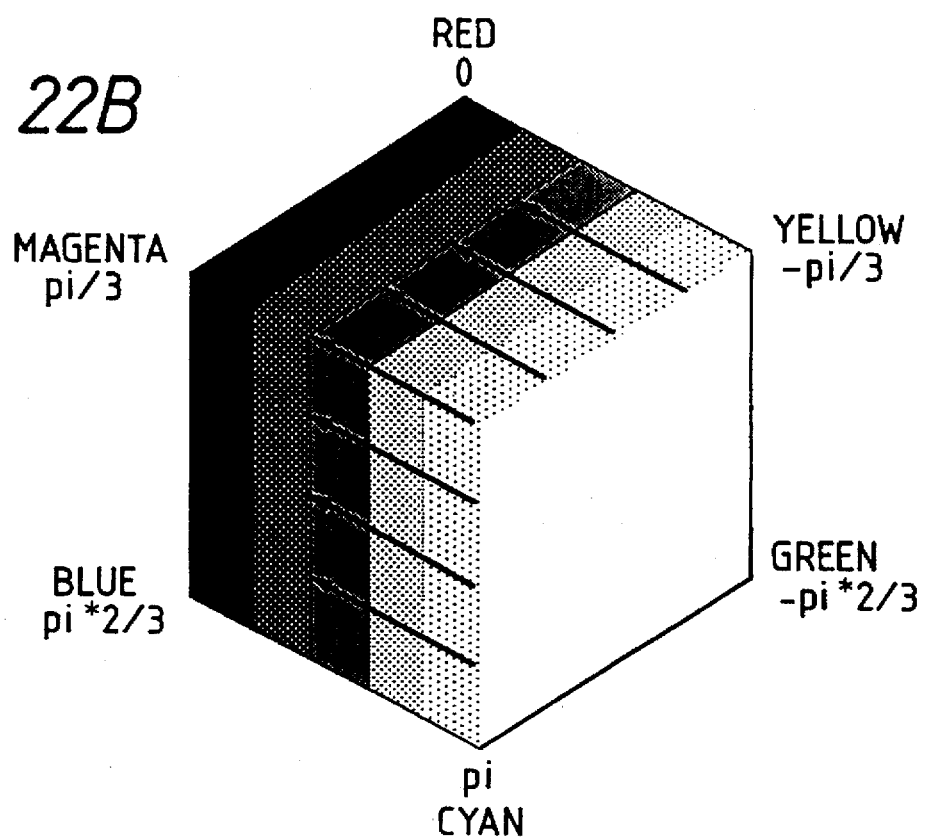
FIG. 22B is a diagram showing a density gradient of magenta image data according to the related art.
Figure 23:
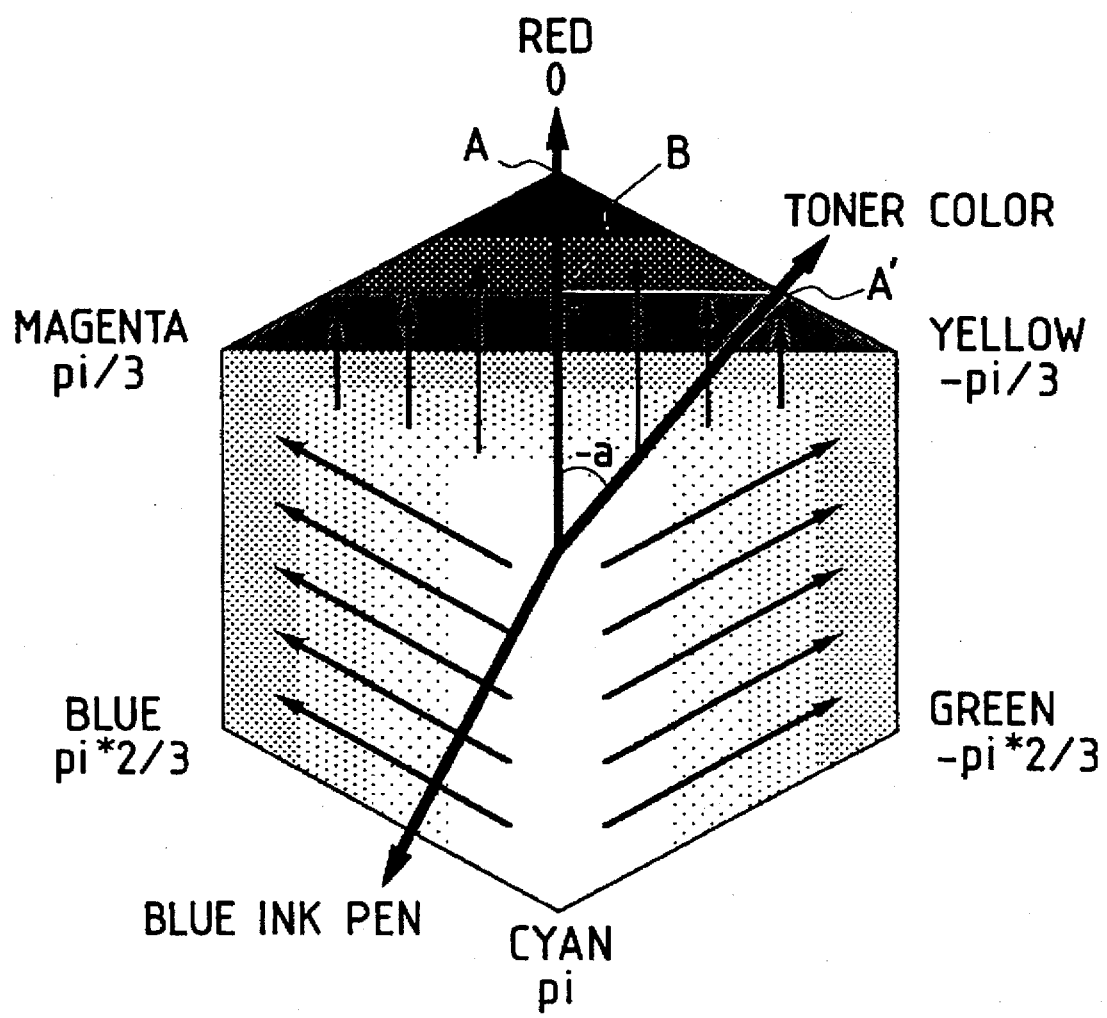
FIG. 23 is a density gradient of red image data according to the related art.

A method as shown in FIG. 23 is assumed as a red component generation method in the color separation system of the prior application as described above. In FIG. 22B, the density gradient of M' component is shown with the black arrow. A red component (R) is obtained by synthesizing the M' component and the Y' component as shown in the formula (15).

$$R=(M'+Y')/2 \tag{15}$$

The density gradient of the red component in this case is shown in FIG. 23.

The above method enables to express input image signals in two dimensions and obtain the gradation for which the hue is taken into account as a gradation which maintains the characteristics of the original.

However, there are two points to be improved.

In the above method, the density of the red component is determined according to the formula (15). In other words, the hue which is the axis of the density gradient of the red component to be read is 0 deg in the R direction as shown in FIG. 23. However, a hue of a toner color for forming the red image is the hue with −a deg axis. If the density of the red component when red of 0 deg is read is assumed A, the density of the red component to be outputted is A'. The red component of toner to be read when the outputted image is read again or in re-recopying is assumed B, the following formulae (16) and (17) can be given.

$$A=A' \tag{16}$$

$$B=\cos(-a)\times A'$$

(where, $$-pi/3 \leq a \leq pi/3) \tag{17}$$

Accordingly, B is smaller than A and it is known that the density of the red component of the original image reduces each time the black/red copying is repeated in the above-described method.

Hence, the first problem of the above-described art is that the red density of the re-recopy print obtained by copying again the image generated by this copying machine will be thinned.

The second problem is that a blue/black original will be a copy of only black.

A blue color of the blue/black original generally has a different meaning from the black image and is included in the original as emphasis, for example, as in the red image. However, there is a problem that the hue of a blue color such as a blue ink pen included in the blue/black original is present in the black image area as shown in FIG. 23 and therefore the blue image is generated in black as the black image.

The third embodiment made in view of the above points is intended to provide an image processing method and an apparatus thereof capable of reproducing the original with a satisfactory gradation without a decrease of the densities of colors of the original even when copying of the image which has been copied once is repeated.

The present invention is intended to provide an image processing method and an apparatus thereof capable of carrying out two-color copying of the second color of the original, whether a black/red original or a blue/black original, in the second developing color which is currently set by automatically discriminating a hue of input image data changing it to a most suitable hue for color separation.

The present invention is also intended to provide an image processing apparatus capable of providing an image the user desires to obtain.

An example of configuration for attaining the above objects is described in detail as a third embodiment, referring to the drawings.

[Image Signal Flow]

Figure 18:
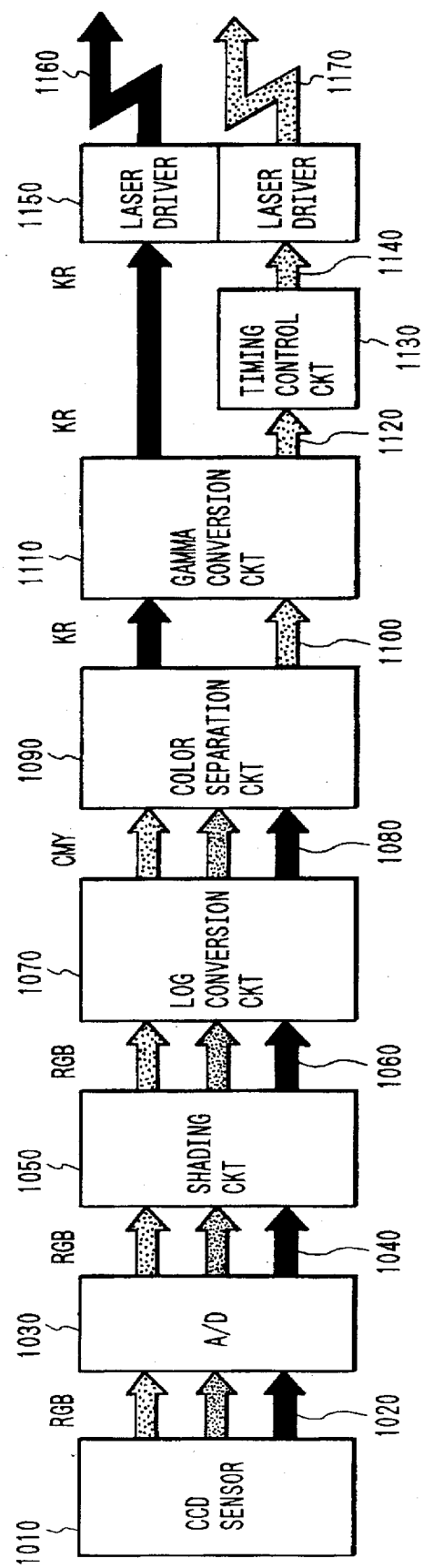
FIG. 18 is a block diagram showing an embodiment of an image processing apparatus according to the present invention.

In FIG. 18 showing a block diagram which illustrates an example of an image processing apparatus according to the present embodiment, a CCD sensor 1010 comprising three lines for red (R), green (G) and blue (B) reads an original image and generates an analog signal 1020. An A/D conversion circuit carries out analog to digital conversion of this signal and a shading correction circuit 1050 normalizes out-of-uniformity of a light source for reading the original and variations of bits of the CCD sensor 1010. Subsequently, R, G and B luminance signals 1060 are converted to the density signals of C, M and Y by a log conversion circuit 1070. In addition, a color separation circuit 1090 generates a black signal K1100 and a red signal R1100 which are black and red image data as toner colors for the printer, for example, in a black/red mode and a gamma conversion circuit 1110 corrects the density gradient in accordance with the image formation characteristics of the printer. This color separation circuit 1090 is described in detail later. The timing of a red image signal 1120 is adjusted by a timing control circuit 1130 for development later than a black image. Respective image signals are converted by a laser driver to a laser beam 1160 for black color development and a laser beam 1170 for red color development, thereby recording the image.

[Configuration of the Main System]

Figure 19:
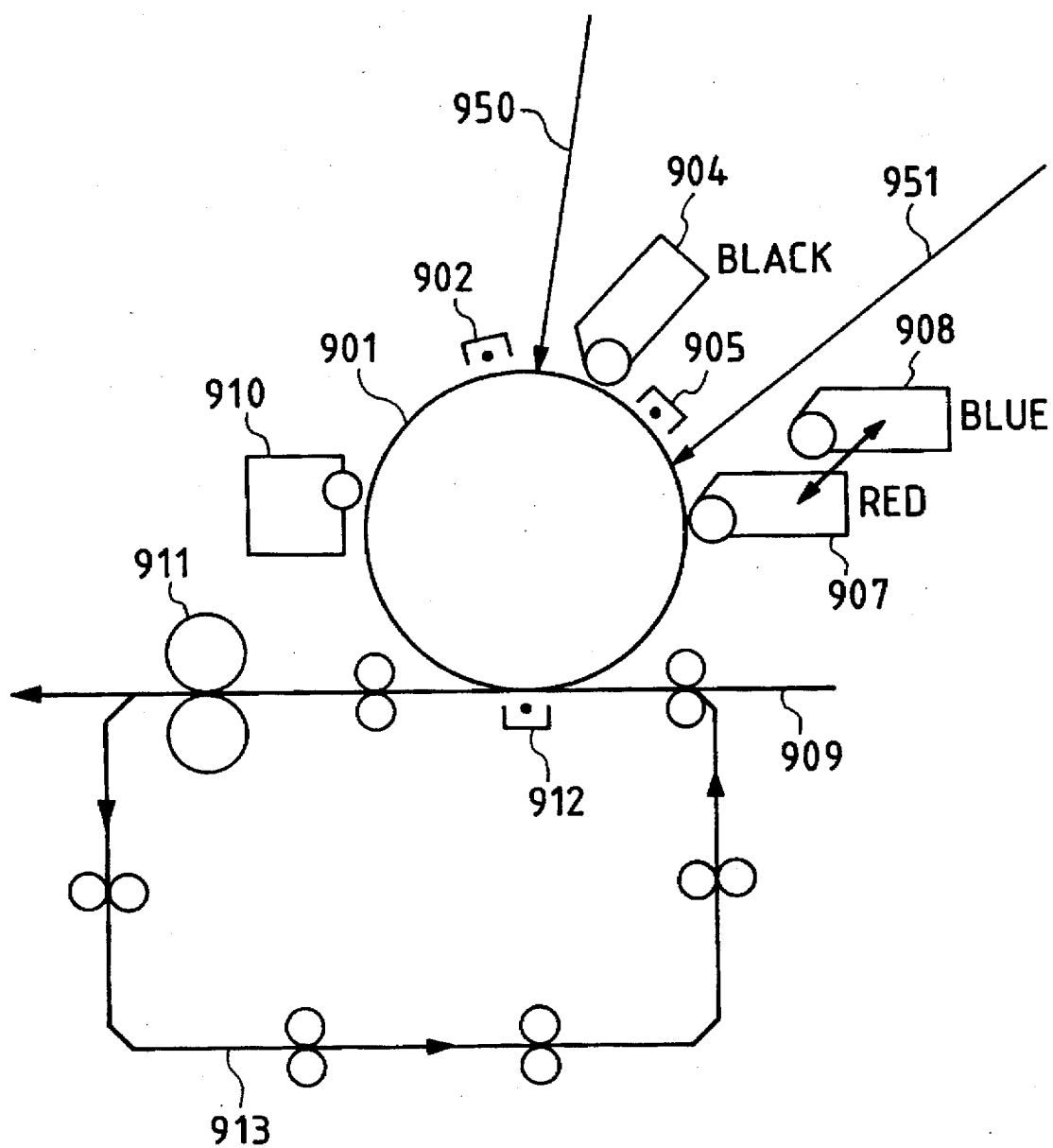
FIG. 19 is a configuration diagram showing an embodiment of the image processing apparatus according to the present invention.

FIG. 19 shows an example of the configuration of the main system of the image processing apparatus according to the present embodiment. 901 is a photoreceptor drum for developing the image. The photoreceptor drum 901 is uniformly charged by a primary charger 902 for a black image, and a first image is formed on the photoreceptor drum 901 by a laser beam 916 for developing the black image and developed by a black image developer 904. Similarly, for developing a red image, the photoreceptor drum 901 is uniformly charged by a primary charger 905 for a red image and the red image which is the second image is recorded by a laser beam 917 for developing the red image. When a user selects a black/red copy mode, the red image is formed by a red image developer 907 and, when the user selects a blue/black copy mode, a blue image which is the second image is formed by a blue image developer 908. After this, the image is transferred by a transfer charger 912 onto a paper sent to a paper path 909. Toner on the paper is melted and fixed by a heat fixing unit 911. Toner remaining on the photoreceptor drum is removed by a cleaner 910.

The image processing apparatus for use in the present embodiment is not limited to the above configuration and the image processing apparatus described in the first embodiment can be used.

[Color Separation Method]

The color separation method is described below. The density signals of C, M and Y converted by the log conversion circuit 1070 are calculated by using the formulae (11), (12) and (13) shown in the foregoing and the data denoting the density of the input pixel is detected.

Figure 24A:
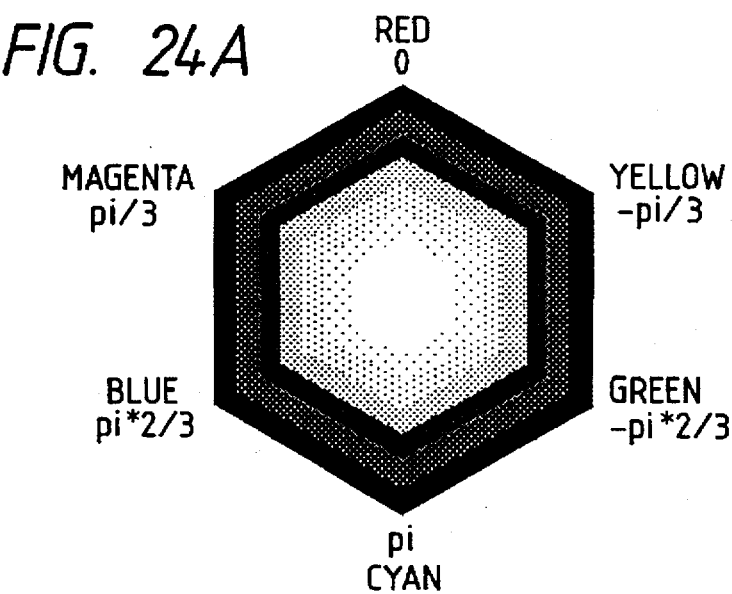
FIG. 24A is a diagram showing the maximum values (C', M', Y')
Figure 24B:
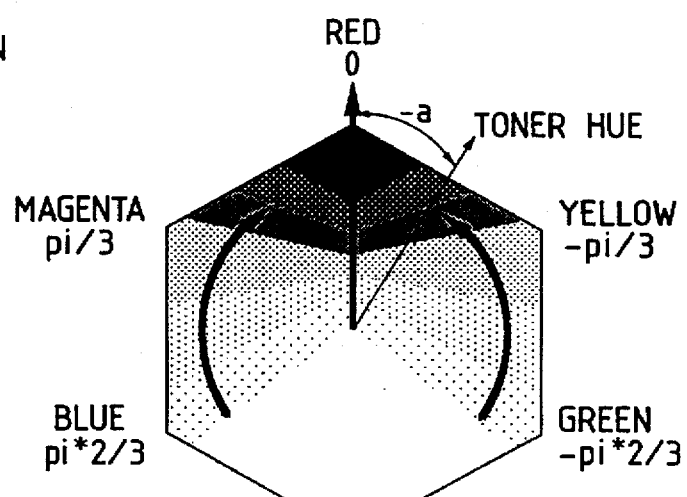
FIG. 24B is a diagram showing an example of the density gradient in which the hue of the axis for red density gradient is 0 degree.

The maximum values max (C', M' and Y') of two signals which are plotted are shown in FIG. 24A whereby it is shown that the density increases as the angle radially moves away from the center. The axis of the density gradient (2nd-color Max axis) for color separation is set to generate a color separation table for converting the density signals of C, M and Y converted from the density gradient to R/K data or B/K data. FIG. 24B is an example showing the density gradient of the red image which is cosine-calculated by a formula (8) as so that the density decreases as the angle moves away from the 2nd-color Max axis which is set at the R axis, that is, 0 deg.

$$R = \max(C',M',Y') \times \cos(2\theta/3) \quad (18)$$

A smooth density gradient can be obtained from this cosine calculation.

The color separation table for converting the density signals of C, M and Y to the desired image data according to the density gradient comprises three tables 702, 703 and 704 into which respective data of M–Y, Y–C and C–M are entered.

Figure 24C:
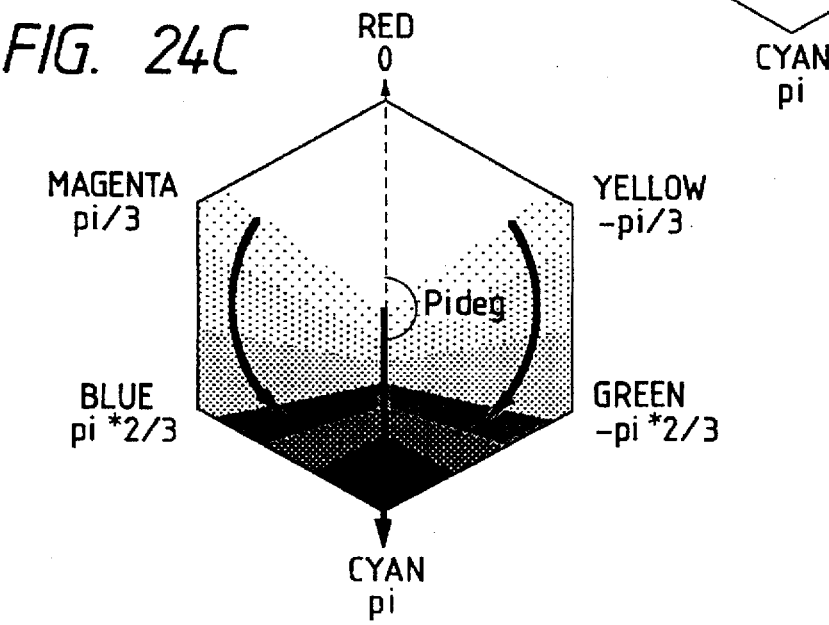
FIG. 24C is a diagram showing an example of the density gradient in which the hue of the axis for black density gradient is pi degrees.

FIG. 24C shows a black image density gradient given by the formula (19) for which the axis (Black Max axis) of the black image density gradient is set at the C axis symmetrical to the 2nd-color Max axis, that is, the pi deg.

$$K = \max(C',M',Y') \times \cos(pi - 2\theta/3) \quad (19)$$

As the color separation table described above, the black image density table based on the density gradient of black image comprises three tables 708, 709 and 710.

Figure 25A:
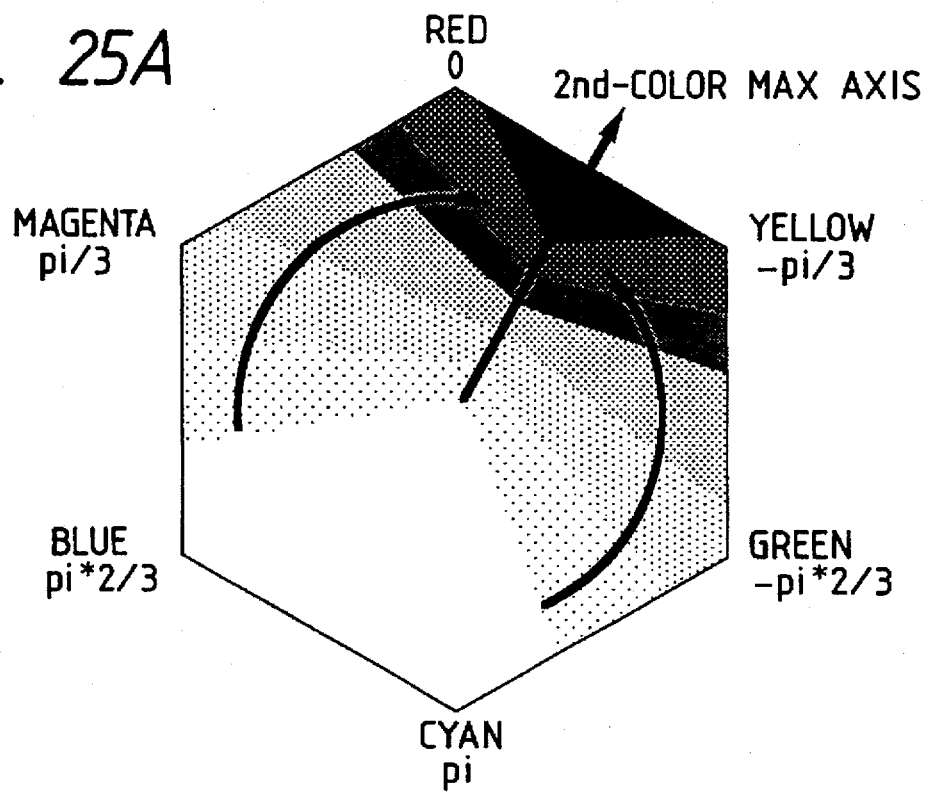
FIG. 25A is a diagram showing an embodiment of the red density gradient according to the present invention.

When the user selects the black/red copy mode, the 2nd-color Max axis is set at an angle of −a deg in a red image area shown in FIG. 24B and coincided with the hue of a desired toner for forming the red image, and a density gradient expressed by a formula (20) given below as shown in FIG. 25A is obtained.

$$R = \max(C',M',Y') \times \cos(-a + 2\theta/3) \quad (20)$$

Figure 25B:
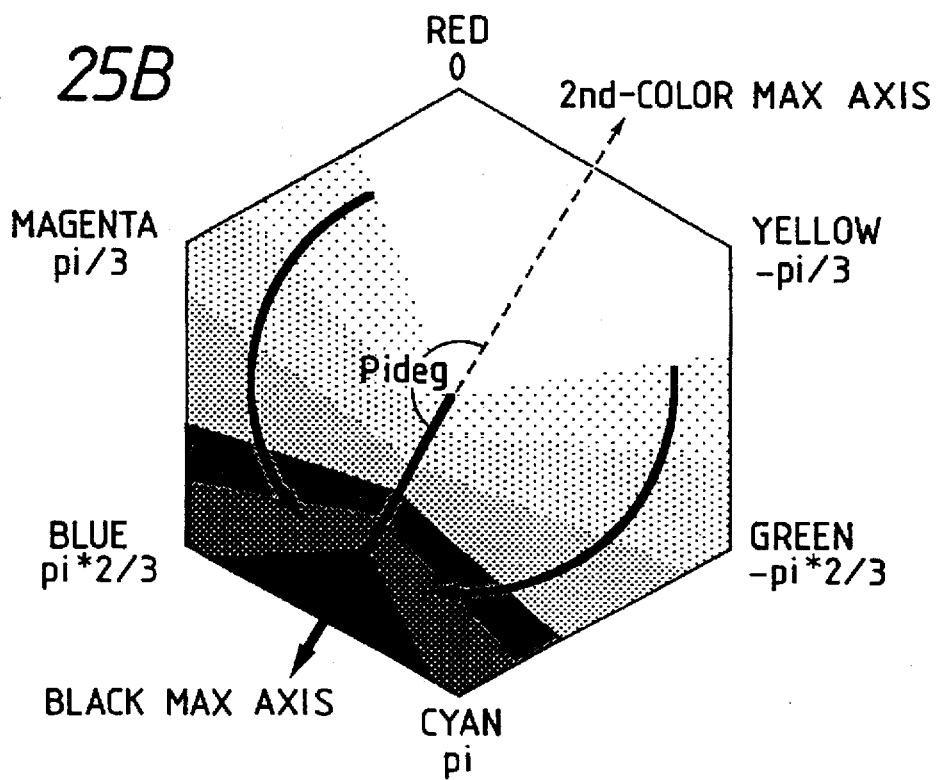
FIG. 25B is diagram showing an embodiment of the black density gradient according to the present invention.

In this case, the Black Max axis for determining the black image is set at an angle of (pi−a) deg symmetrical to the 2nd-color Max axis and a density gradient expressed by a formula (21) given below as shown in FIG. 25B is obtained.

$$K = \max(C',M',Y') \times \cos(pi - 2\theta/3) \quad (21)$$

Black image data is obtained by adding the minimum value min(CMY) to the values converted by the black image density table based on the density gradient of black image.

An image to be outputted by the image processing apparatus in the black/red copy mode is obtained by synthesizing a black image generated from the red image data converted according to the color separation table and the black image data obtained by adding the minimum value min(CMY) to a value converted by the black image density table.

Accordingly, a read axis is the same as the output axis, that is, the axis of toner hue and therefore the red image density of the recopy will not be thinned and a faithful image reproduction can be attained. A satisfactory gradation is obtained both in red and black images.

In the blue/black copy mode, the axis (2nd-color Max 2) for reading a blue image and the axis for reading a black image shown in FIG. 21 are arranged to be symmetrical and therefore the blue image will not be outputted as the black image and reproduced with a satisfactory gradation.

Figure 26:
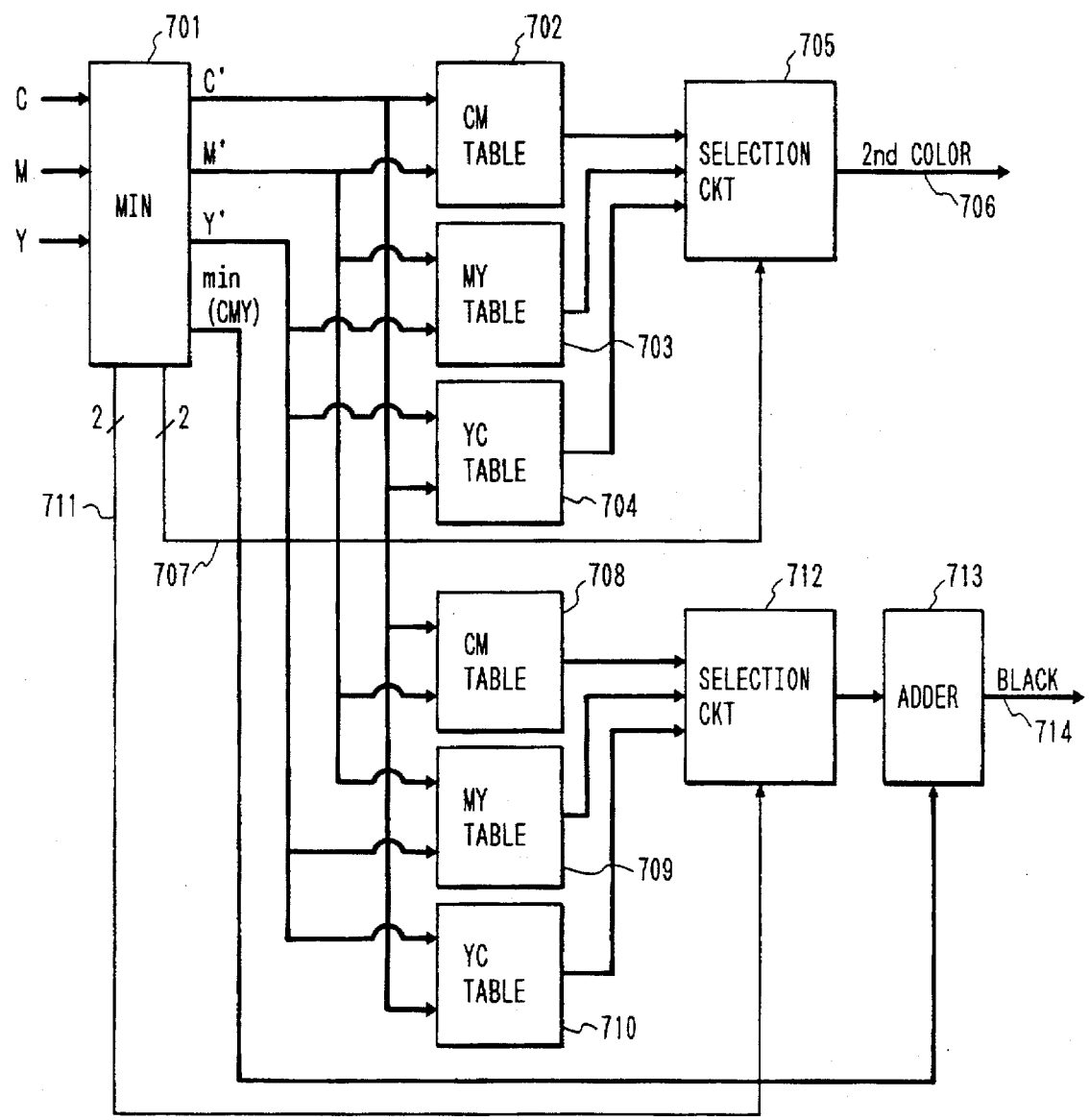
FIG. 26 is a diagram showing an example of a color separation circuit shown in the embodiment 3 of the present invention.

A hardware block diagram for this processing is shown in FIG. 26. Image data of C, M and Y is entered into a min data operation circuit 701, and data C, M and Y and value min(CMY) are calculated after respective operations. Simultaneously, a selection signal 707 for the second image data and a selection signal 711 for the black image data are generated as the selection signal for selecting the signals for desired two colors to obtain the data. 2nd-color data 706 is obtained through the tables 702, 703 and 704 for obtaining the density data from image data of C, M and Y indicating the color components by selecting the output of the CM table with a multiplexer 705 controlled by the selection signal 707 if there is data between C and M, and the output of the MY table 703 if there is data between M and Y and the output of the YC table if there is data between Y and C, respectively by the selection signal 707. Similarly, one of three data is selected by the multiplexer which has the tables 708, 709 and 710 for black image data and is controlled with a selection signal of the selection circuit 712 and black image data 714 is obtained by adding the value min(CMY) obtained from the min data calculation circuit 701 to the selected data in the addition circuit 713.

Accordingly, a read axis is the same as the output axis, that is, the axis of toner hue and therefore the red image density of the recopy will not be thinned and a faithful image reproduction can be attained. A satisfactory gradation is obtained both in red and black images.

When the user selects the blue/black copy mode, the 2nd-color Max 2 axis as shown in FIG. 21 is set at an angle of b deg and coincided with the hue of the blue toner to generate a blue image and the Black Max axis is set at an angle of (pi−b) deg symmetrical to the 2nd-color Max 2 axis.

Accordingly, the blue density of the recopy will not be thinned and the blue color will not be discriminated as a black image area and will not appear in black. Thus a faithful image can be reproduced.

[Comparative Example 1 of the Third Embodiment]

A comparative example of the third embodiment of the present invention is described in detail referring to the drawings.

An overall configuration of an image processing apparatus of the comparative example is the same as that shown in FIG. 18. As the third embodiment, the density signals of C, M and Y converted by the log conversion circuit 1070 are calculated using the formulae (11), (12) and (13) and the data indicating the densities of input pixels is detected.

Figure 27:
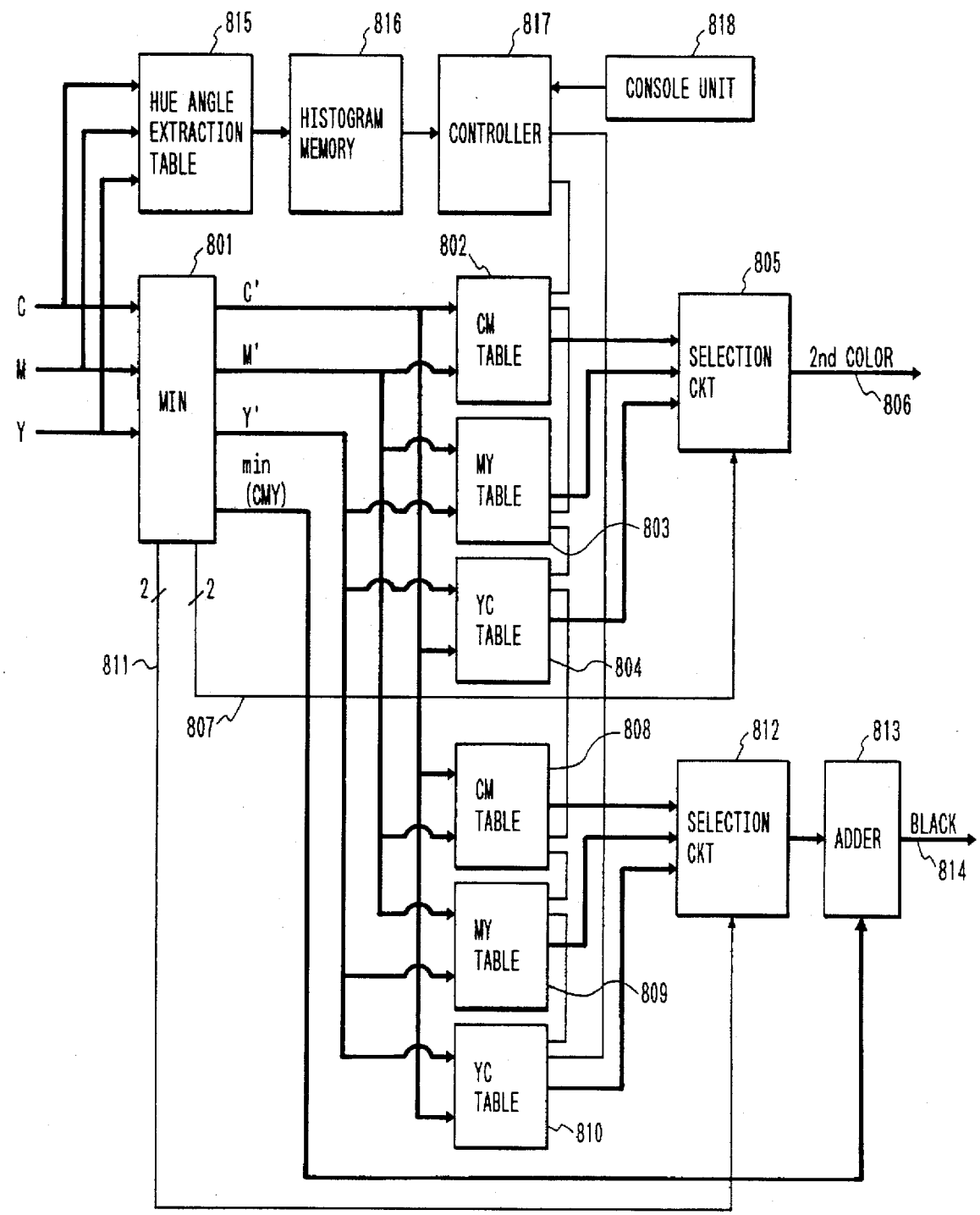
FIG. 27 is a diagram showing an example of a color separation circuit shown in a comparative example of the embodiment 3 of the present invention.
Figure 28:
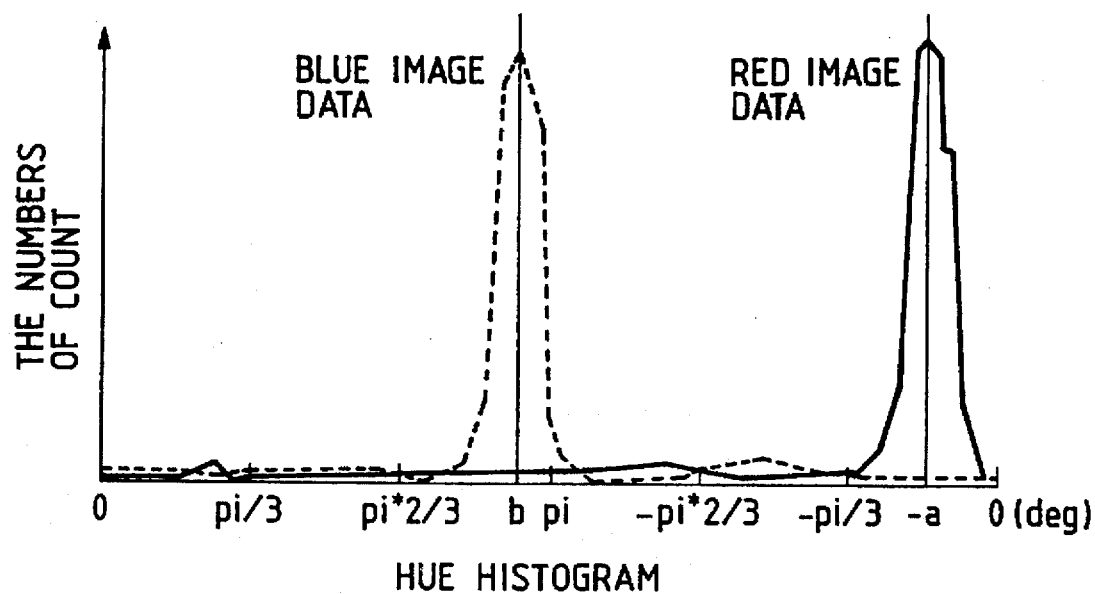
FIG. 28 is a diagram showing an example of a hue histogram shown in the embodiment 3 and a comparative example of the embodiment 3 of the present invention.
Figure 29:
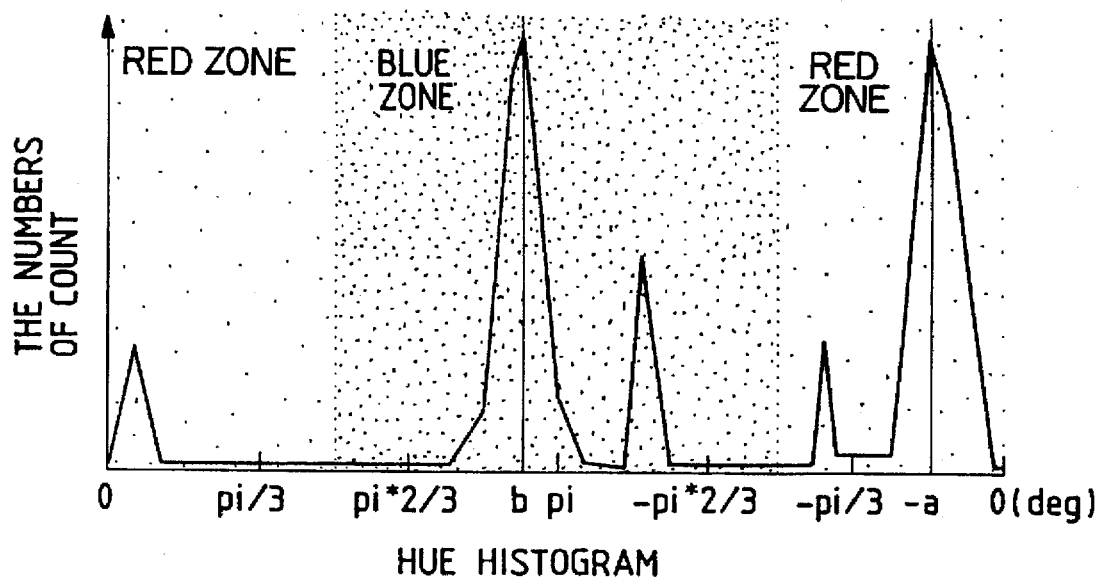
FIG. 29 is a diagram showing an example of a hue histogram shown in a comparative example of the embodiment 3 of the present invention.

In the prescan of the original, the vectors of these two components are calculated from a sample pixel in the original image and the angle of hue is obtained according to a hue angle extraction table 815 in FIG. 27. Then the data in a histogram memory 816 is counted up. A peak of this histogram is obtained and a color separation table based on a density gradient shown in FIG. 25A where the angle (−a deg in this case) is set so that the 2nd-color Max axis shown in FIG. 28 represents the maximum density, is generated from tables 802, 803 and 804 by the controller 817. The black image density gradient is formed as shown in FIG. 25B with an axis deviated as much as pi deg from the 2nd-color Max axis as the Black Max axis and the tables 808, 809 and 810 are generated based on this black image density gradient whereby a final black image density is obtained by adding up the black image density obtained from these tables and the value min(CMY).

Thus a black/red original is automatically reproduced as a black/red copy. In a recopy processing, the red color density of the original will not be thinned and a faithful image can be reproduced.

When a blue/black original is copied, a histogram is similarly obtained (FIG. 28) and the 2nd-color Max2 axis as shown in FIG. 21 is set at an angle of b deg from the angle of the peak of the histogram and coincided with the hue of the second color of the original. Therefore a blue/black original is reproduced as a black/red copy with a satisfactory gradation even though a developer for the second color which is set in the image processing apparatus is for red.

In this case, the information which serves as an emphasis of a blue image in the blue/black original apparently differing from the original is certainly transmitted as a red image for the black image.

Two methods, that is, a hue angle automatic setting method for color separation which carries out the prescan described in the present embodiment and a hue angle setting method for color separation which automatically sets the hue angle in the two-color mode designated by the user without the prescan described in the embodiment 3, can be selected at the operation unit 818 by the user.

[Comparative Example 2 of the Third Embodiment]

A comparative example 2 of the third embodiment is described below in detail, referring to the drawings.

A method for copying an original including a plurality of colors in optimal three colors is described in an example case of 3-color copying in red, black and blue.

In the prescan of the original, the vectors of two remaining components of C, M and Y are calculated from the sample pixel in the original image and a hue angle is obtained according to the hue angle extraction table 815 in FIG. 27. Data in the histogram memory 815 is counted up. The largest peak in the red image area and the blue image area of the histogram is obtained. In this case, the angle of the largest peak in the red image area is −a deg and the angle of the largest peak in the blue image area is b deg. The tables are rewritten by the controller 817 according to this peak. In case of the image processing apparatus as shown in FIG. 2, three colors cannot be developed at a time and therefore two colors, red and black, are formed on the paper in the first image formation. The color separation table based on FIG. 25A showing the density gradient at which the 2nd-color Max axis shown in FIG. 21 is set to obtain the maximum density is generated for the red image. On the other hand, the density of the black image is only min(CMY).

This image formation is carried out by using the black image laser 1160 and the red image laser 1170 shown in FIG. 19 and a two-color image is formed on the paper. This paper is heat-fixed once by the fixing unit 911 and passes through a multiple transfer path 913. For the blue image, a 2nd-color Max2 axis as shown in FIG. 22A is set to an angle of b deg from the angle obtained from the peak of the histogram and the color separation table based on FIG. 22B of the density gradient is generated. The red developer 907 is replaced by the blue developer 908 and a blue image is formed by a laser 1170. A three-color copy of red, blue and black is completed by fixing again this paper.

Since the density of the black image is set to min(CMY), the effect of the black image is reduced.

The axis of the density gradient is determined from the histogram and therefore both red and blue images are reproduced with satisfactory gradation.

[Comparative Example 3 of the Third Embodiment]

A comparative example of the third embodiment is described below in detail, referring to the drawings.

Figure 30:
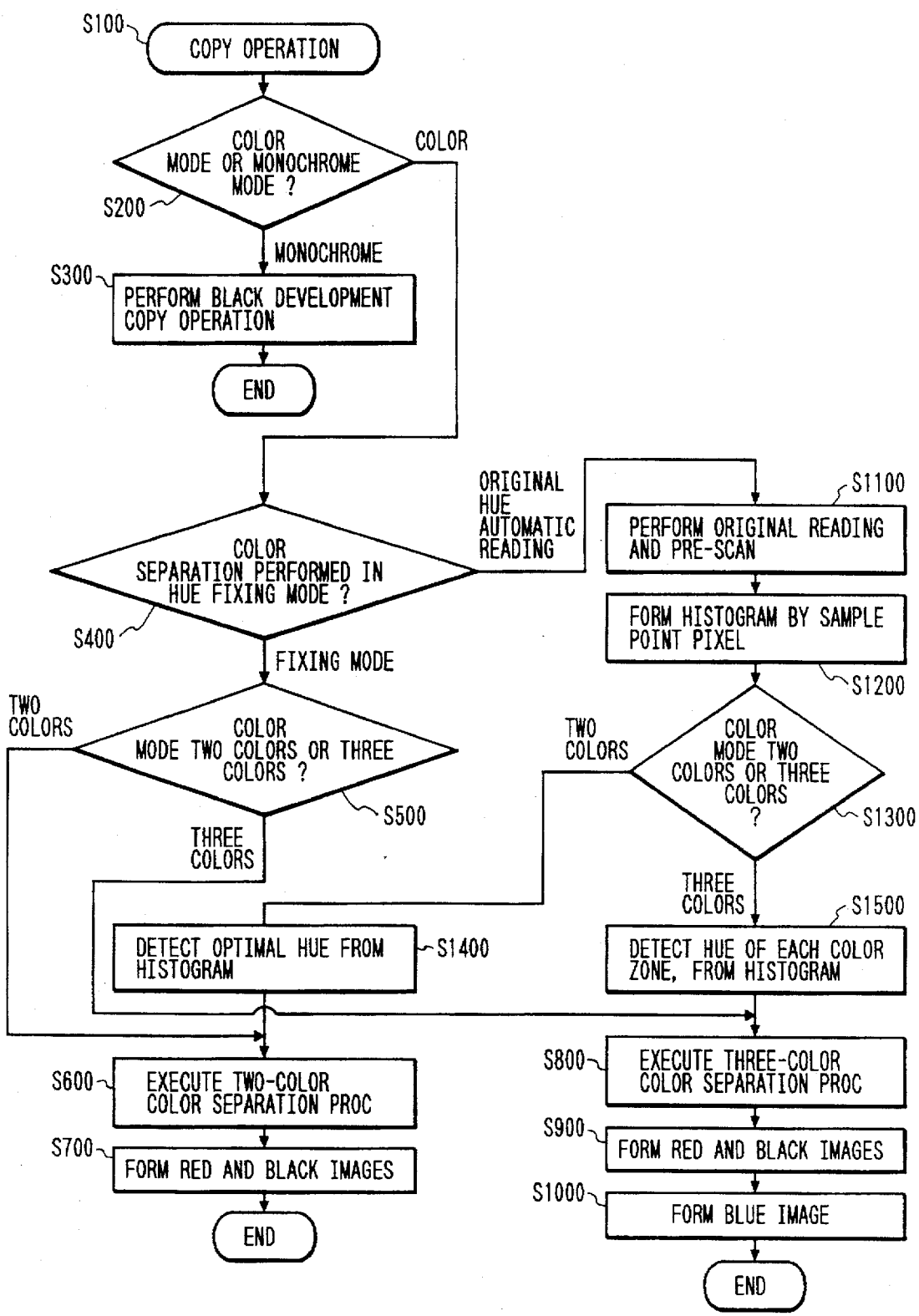
FIG. 30 is a flow chart showing an example of image processing according to the present invention.

The flow chart of the image processing apparatus of the present embodiment is shown in FIG. 30.

It is determined in step S100 whether a copying operation is designated. It is determined in step S200 whether the mode is the monochrome mode. If the monochrome mode is determined in step S200, common black image copying operation is carried out in step S300.

If the color mode is determined in step S200, it is determined in step S400 which should be selected a hue fixing mode (output image dependent mode) in which the hues to be used in color separation of the original image data is fixed in accordance with the hues of colorants, or an input image dependent mode which is coincided with the hues to be used in determination of the hue which best represents the characteristic of the original image by means of automatic reading of the hues of the original image data and in color separation is determined by the hue.

If the hue fixing mode is determined in step S400, it is determined in step S500 whether the color mode is for two colors or three colors.

If the color mode for two colors is determined in step S500, color separation processing of the original image data is carried out in accordance with the determined hue and the data is separated into red image data and black image data in step S600. In step S700, red and black images are formed based on the image data which is color-separated.

If the color mode for three colors is determined in step S500, color separation processing of the original image data is carried out in accordance with the determined hue and the data is separated into red image data and black image data in step S800. In step S900, red and black images are formed based on the red and black image data which is color-separated. In step S1000, a blue image is formed on the same paper on which red and black images have been formed, based on the blue image data which is color-separated.

If the input image dependent mode is determined in step S400, the prescan for reading the original is carried out in step S1100. In step S1200, a histogram is generated with sample point pixels. In step S1300, it is determined whether the color mode is for two colors or three colors.

If the color mode for two colors is determined in step S1300, those hues which best represent the characteristics of respective images other than the black image are detected in step S1400.

If the color mode for three colors is determined in step S1300, those hues which best represent the characteristics of respective images in the red and blue image areas are detected in step S1500.

Mode selection in the above steps S200, S400, S500 and S1300 is carried out in the operation unit 818.

Image processing in the above-described procedure enables to avoid thinning of the densities of colored portions of the image even in repeated recopying of the original image which has been copied once and reproduce satisfactory gradation.

Since the hues included in input image data can be automatically determined and changed to optimum hues for color separation, second colors, whether of a black/red original or a blue/black original, can be copied in two colors in the second developing colors which are currently set.

The above effect can be obtained in three-color copying.

The density gradient for color separation can be different from that in the present embodiment.

The image processing apparatus according to the present invention is not limited to a type in which the original image is self-supplied and the image data can be supplied from an external machine such as, for example, an IPU or the like. Moreover, in this case, the color space is not limited to the color space of R, G and B and can be a color space of C, M and Y or Y, I and Q.

Color separation processing can be carried out according to software based on the above color separation method.

The color space for the above color separation processing is not limited to the color space of C, M and Y and can be, for example, a color space of R, G and B or the like.

Three tables need not be used as shown in FIGS. 24A to 24C, 25A and 25B the processing can be carried out with only one table.

The image area for color separation is not limited to red, blue and black and an image area of green or the other color is available.

Image formation colors are not limited to red, blue and black and can be green or the other colors.

The hues for color separation of image data in the color separation means need not be completely coincided with the hues of colorants to be used in image formation and can be those hues in close positions.

As described above, the third embodiment has a color separation means for carrying out color separation of input image data to image data including a plurality of colors and enables to prevent the densities of the colored portions of the image from being thinned even in repeated copying using the image which has been copied once as the original and reproduce satisfactory gradation by coinciding the hues on the axis of the density gradient to be used in the color separation of the image data with the hues of colorants in the color separation means.

Also, the third embodiment has a discrimination means for discriminating the hues on the axis of the density gradient to be used for color separation from the input image data and a color separation means which functions based on the result of the above discrimination and enables to carry out two-color copying of the second color, whether of the black/red original or of the blue/black original, in the second developing color which is currently set since the hues included in the input image data can be automatically discriminated and changed to the most suitable hues for color separation in the color separation means by coinciding the hues on the axis of the density gradient of the image data with the hues of colorants to be used in image formation.

The third embodiment has an output image dependent mode and an input image dependent mode and enables to provide an image the user desires to obtain by a mode changeover means for changing over the above-described two modes.

[Fourth Embodiment]

An image processing apparatus described in the first to third embodiments includes a point to be improved that color information cannot be separated to meet the applications of users since parameters to be used in discrimination of color information are fixed or automatically set according to a characteristic point extracted by pre-scanning an input original.

The fourth embodiment made in view of the above point is intended to accurately color-separate color information in accordance with the characteristics of the image or an application of the user.

This embodiment is also intended to carry out optimal color separation for input image data by setting space areas and a ratio of density variation.

This embodiment is further intended to enable to set the color separation range in accordance with the application of the user.

The fourth embodiment is described below in detail referring to the drawings.

[Configuration of the Copying Machine]

Figure 31:
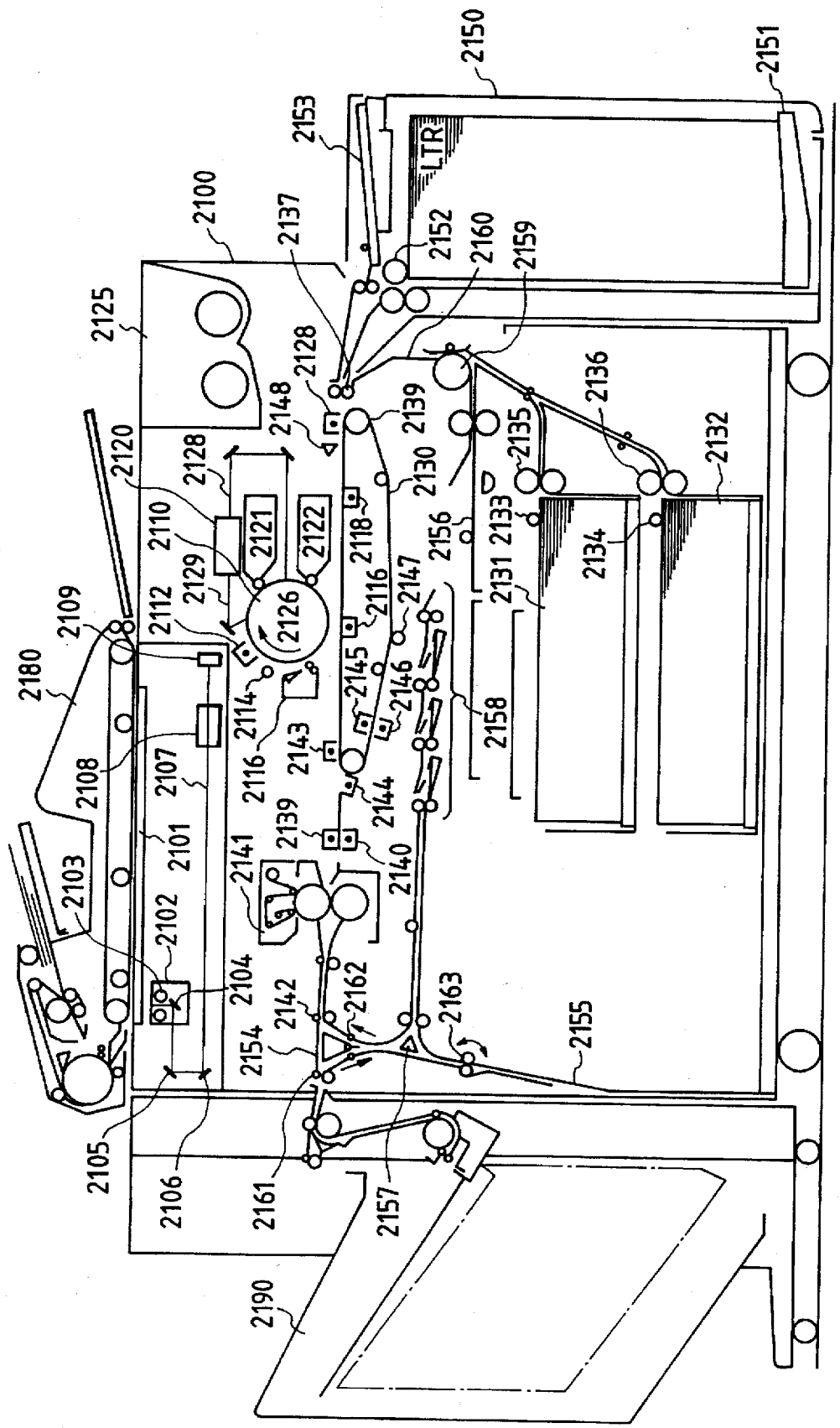
FIG. 31 is a sectional configuration view of an example of the image formation apparatus according to the present invention.

FIG. 31 shows a sectional configuration diagram illustrating an example of the image processing apparatus according to the present embodiment, wherein 2100 is a copying machine body, 2180 is a circulatory automatic original feeder (hereafter referred to as the "RDF") which automatically feeds the original and 2190 is a sorter. These RDF 2180 and the sorter 2190 are adapted to be combined with the copying machine as required.

The operation of the image processing apparatus is described below.

In FIG. 31, 2101 is an original placing glass plate serving as an original placing station and 2102 is a scanner comprising an original illuminating lamp 2103 and a scan mirror 2104. The scanner is driven by a motor, not shown, to scan the original on both ways in a specified direction and a reflecting light from the original passes through a lens 2108 via scan mirrors 2104 to 2106 and is focused on a CCD sensor 2109.

An exposure control unit 2107 comprises a laser and a polygon scanner to control laser beams 2128 and 2129, which are modulated according to the image signals converted to electric signals in the image sensor 2109 and subjected to a specified image processing described later, to be irradiated onto a photoreceptor drum 2110.

A primary charger 2112, a red color developer 2121, a black color developer 2122, a transfer charger 2118, a cleaner unit 2116 and a pre-exposure lamp 2114 are provided around the photoreceptor drum 2110. In the image formation unit 2126, the photoreceptor drum 2110 is driven by a motor, not shown, to be rotated in an arrow direction shown in the drawing, the laser beam 2129 from the exposure control unit 2120 is irradiated onto the photoreceptor 2110 after the photoreceptor 2110 has been charged to a required potential, and a static latent image of red data is formed on the photoreceptor 2110. The static latent image formed on the photoreceptor 2110 is developed by the red color developer 2121 and visualized as a toner image. Subsequently, the laser beam 2129 from the exposure control unit 2120 is irradiated onto the photoreceptor drum 2110 and a static latent image of black data is formed. The static latent image formed on the photoreceptor 2110 is developed by the black color developer 2122 and visualized as a toner image. On the other hand, a transfer paper supplied from an upper stage cassette 2131 or the lower stage cassette 2132 by pickup rollers 2133 and 2134 is sent by paper feed rollers 2135 and 2136 to the copying machine and fed by a resist roller 2137 to the transfer belt, and the visualized toner image is transferred onto the transfer paper by the transfer charger 2118. Remaining toner on the photoreceptor drum 2110 is cleaned off by the cleaner unit 2116 after the transfer operation, and remaining charge is erased by the pre-exposure lamp 2114.

The transfer paper after the transfer has been finished is separated from the transfer belt 2130 and the toner image is recharged by pre-fixing chargers 2139 and 2140, sent to the fixing unit 2141 and fixed by pressurizing and heating, and the transfer paper is ejected from the copying machine 2100 by the ejection roller 2142. A suction charger 2138 sucks a transfer paper sent from the resist roller onto the transfer belt 2130 and a transfer belt roller 2139 is used to rotate the transfer belt 2130 and simultaneously sucks the transfer paper onto the transfer belt 2130 in conjunction with the suction charger 2138.

A discharger/charger 2143 serves to facilitate separation of the transfer paper from the transfer belt 2130, an exfoliation charger 2144 prevents a disturbance of the image due to exfoliation discharging when the transfer paper is separated from the transfer belt 2130, pre-fixing chargers 2139 and 2140 supplement the attracting force of toner on the transfer paper after having been separated and prevent the disturbance of the image, transfer belt discharger/charger 2145 and 2146 discharge the transfer belt 2130 and electrostatically initialize the transfer belt 2130, and a belt cleaner 2147 removes stains of the transfer belt 2130.

A paper sensor 2148 detects an end of a transfer member fed onto the transfer belt 2130 and the signal from this sensor is used as a sync. signal in the paper feed direction (sub scan direction).

The copying machine 2100 is provided with a deck 2150 capable of accommodating, for example, 4,000 sheets of transfer papers. The lifter 2151 of the deck 2150 moves up in accordance with the number of transfer papers so that the transfer paper is kept in contact with the paper feed roller 2152. A multi-manual magazine 2153 capable of accommodating 100 sheets of transfer papers is provided.

Furthermore, in FIG. 31, a paper ejection flapper 2154 changes over the path of the both-side recording side or the multiple recording side and the ejection side (sorter). The transfer paper fed out from the ejection roller 2142 is changed over to the both-side recording side or the multiple recording side by the paper ejection flapper 2154. A lower transfer path 2158 turns over the transfer paper fed out from the ejection roller 2142 through a turnover path 2155 and guides the transfer paper to a paper re-feed tray 2156. A multiple flapper 2157 changes over the path for both-side recording and multiple recording and, when this flapper is turned down to the left, the transfer paper is directly guided to the lower transfer path 2158 without passing through the turnover path 2155. A paper feed roller 2159 feeds the transfer paper to the photoreceptor drum 2126 through a path 2160. An ejection roller 2161 is arranged nearby the paper ejection flapper 2154 and ejects the transfer paper changed over to the ejection side by the paper ejection flapper 2154 from the copying machine. In both-side recording (both-side copying) and multiple recording (multiple copying), the paper ejection flapper 2154 is lifted up and accommodates a copied transfer paper as is turned over in the re-feed tray 2156 through the transfer paths 2155 and 2158. In this case, the multiple flapper 2157 is turned down to the right for both-side recording and to the left for multiple recording. In subsequent rear-side recording and multiple recording, transfer papers accommodated in the re-feed tray 2156 are guided by the paper feed roller 2159 one by one from the lowest position to the resist roller 2137 of the copying machine through the path 2160.

When ejecting the transfer paper as being turned over from the copying machine, the paper ejection flapper 2154 is lifted up, the flapper 2157 is turned down to the right, and the copied transfer paper is transferred to the transfer path 2155 and further to the second feed roller by the turnover roller 2163 after the rear end of the transfer paper has passed through the first feed roller 2162, and ejected as being turned over from the copying machine by the ejection roller 2161.

[Outline of Processing]

Figure 32:
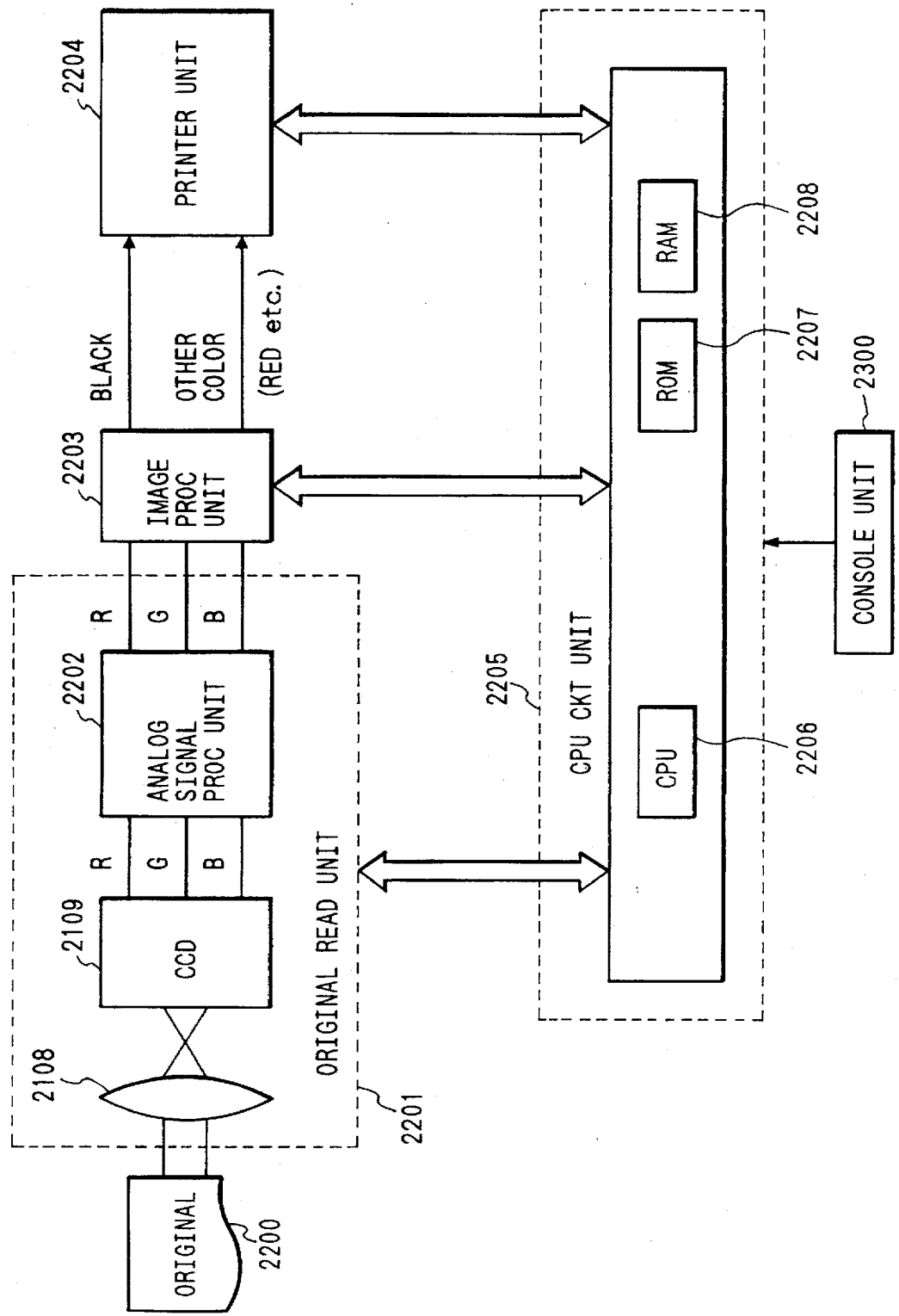
FIG. 32 is a block diagram showing an example of the image formation apparatus related to the present invention.

FIG. 32 is a block diagram showing an example of an image processing apparatus according to the present embodiment.

An image read unit 2201 comprises a CCD sensor 2109 and an analog signal processing unit 2202 and an original image focused onto the CCD sensor 2109 through a lens 2108 is converted to analog electric signals of R (red), G (green) and B (blue) by the CCD sensor 2109. The converted image information is entered into the analog signal processing unit and converted from analog signals to digital signals (A/D conversion) after corrections with respect to sample & hold and dark level for R, G and B colors, and digitized full-color signals are entered into the image processing unit 2203.

In the image processing unit 2203, correction processing required for the reading system such as shading correction, color correction and Y correction, smoothing, edge emphasis, color separation and other processing and operation are carried out for R, G and B signals, and other color data such as black data and red data are outputted to the printer unit 2204.

The printer unit 2204 comprises an exposure control unit 2120 which comprises a laser, an image formation unit 2216 a transfer control unit for transfer papers which are described in the sectional configuration diagram shown in FIG. 31, and the image is recorded on the transfer paper according to the image signal entered.

The CPU circuit unit 2205 comprises a CPU 2206, a ROM 2207 and a RAM 2208 to control the image read unit 2201, the image processing unit 2203 and the printer unit 2204 and totally control the sequence of the apparatus of the present invention.

Particularly, the CPU circuit unit 2205 controls image processing such as color separation processing in the image processing unit 2203 according to the parameters set by the operation unit 2300.

[Image Processing Unit]

Figure 33:
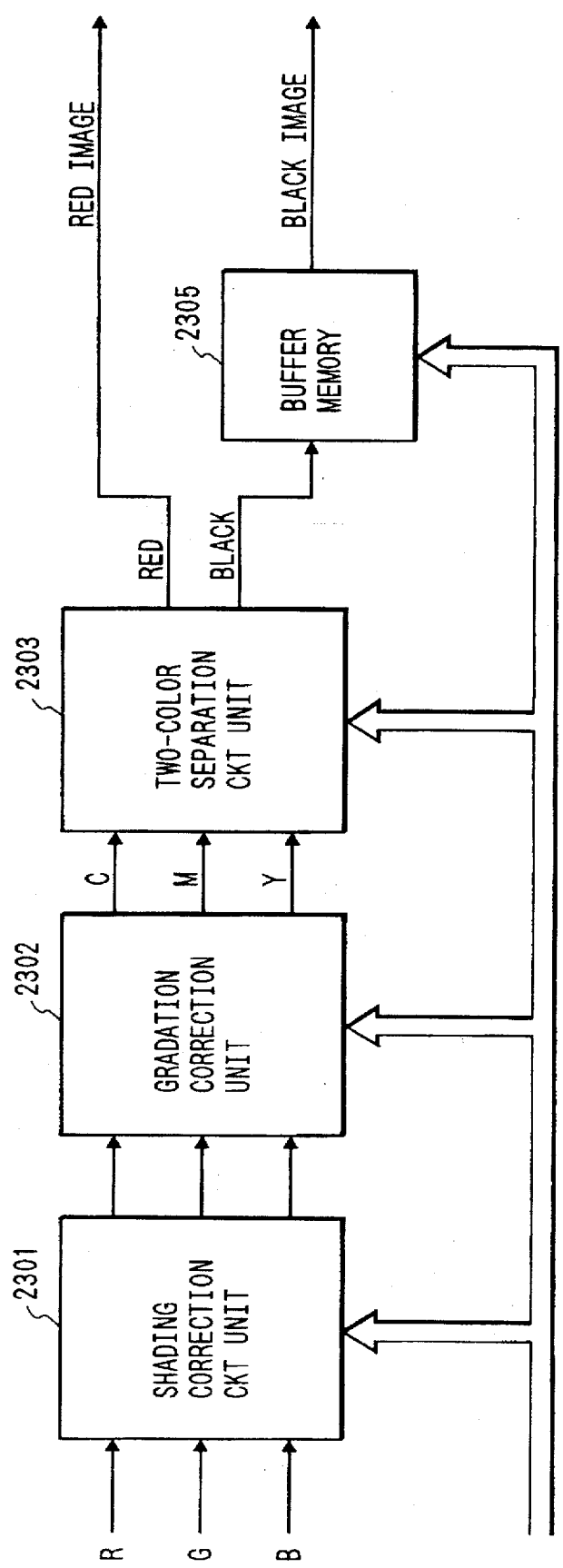
FIG. 33 is a block diagram showing an example of the image processing unit related to the present invention.

Though the outline of the image processing unit is the same as the above embodiment, the description is given below for caution's sake. FIG. 33 is a block diagram showing a configuration of the image processing unit 2203.

Figure 34:
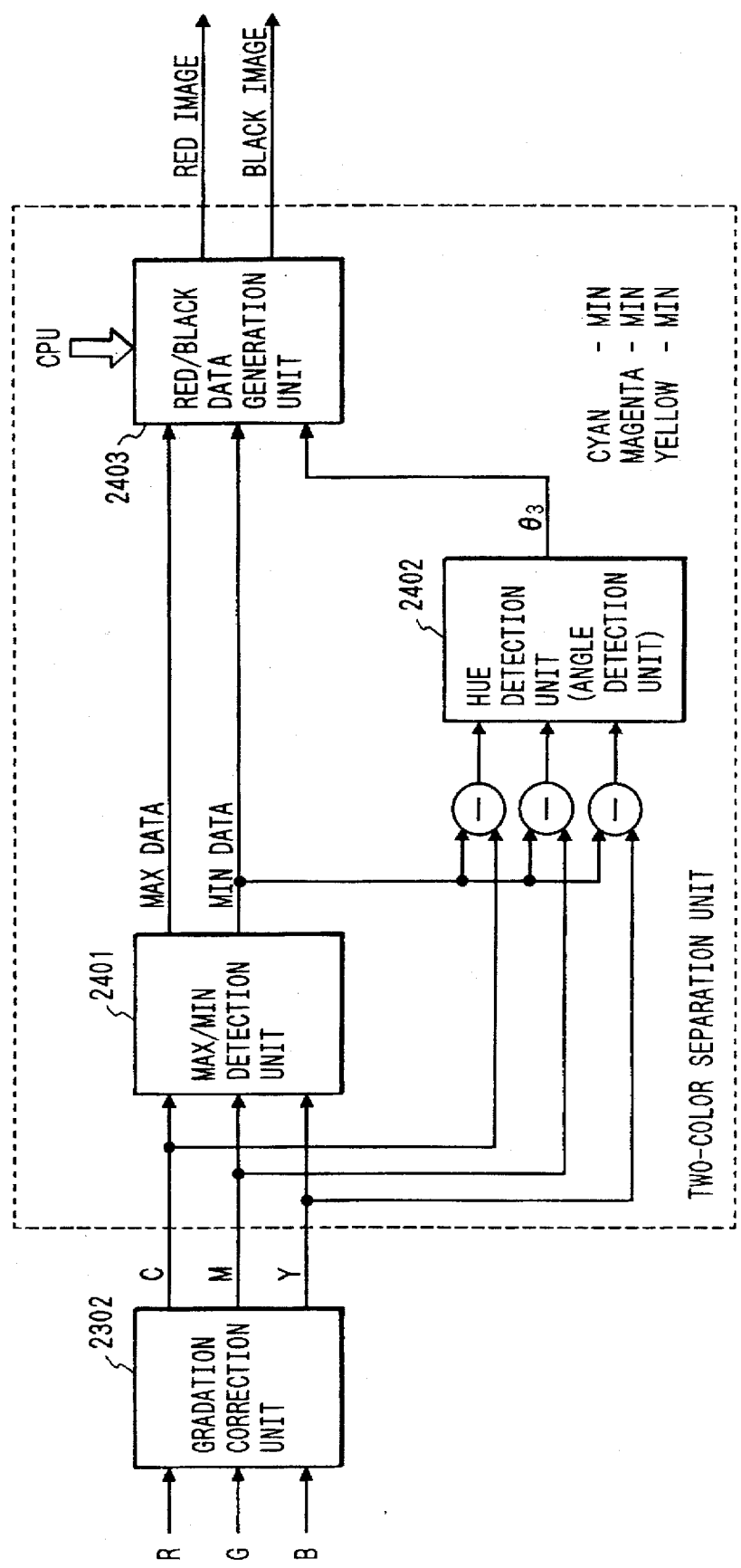
FIG. 34 is a block diagram showing an example of the two-color separation unit related to the present invention.

A digital image signal outputted from the analog signal processing unit 2202 shown in FIG. 2 is entered into the shading correction unit 2301. The shading correction unit 2301 corrects variations of the sensors which read the original and the light distribution of the original illuminating lamp. The image signal which is calculated for correction is entered into the gradation correction unit 2302 to be converted from a luminance signal to density data and generate the density image data represented by C (cyan), M (magenta) and Y (yellow). The image signal converted to the density data is entered into the two-color separation unit 2303 and converted to red and black image data which are the colors of the toner for use in the printer unit. An example of the two-color separation unit 2303 which is a characteristic component unit of the present embodiment is described in detail below, referring to FIG. 34.

[Two-color Separation Unit]

Density signals of C, M and Y outputted from the gradation correction unit 2302 are entered into a max/min detection unit 2401 to obtain the values of the maximum density color and the minimum density color. This max/min detection unit is adapted to discriminate the sizes of all groups of (C, M), (M, Y) and (Y, C) by the component units 2601, 2602, 2603 and 2701, 2702, 2703 as shown in FIGS. 6 and 7, compare the results of discrimination in 2604 and 2704, and output the maximum value or the minimum value by using selectors 2605 and 2705.

Figure 38:
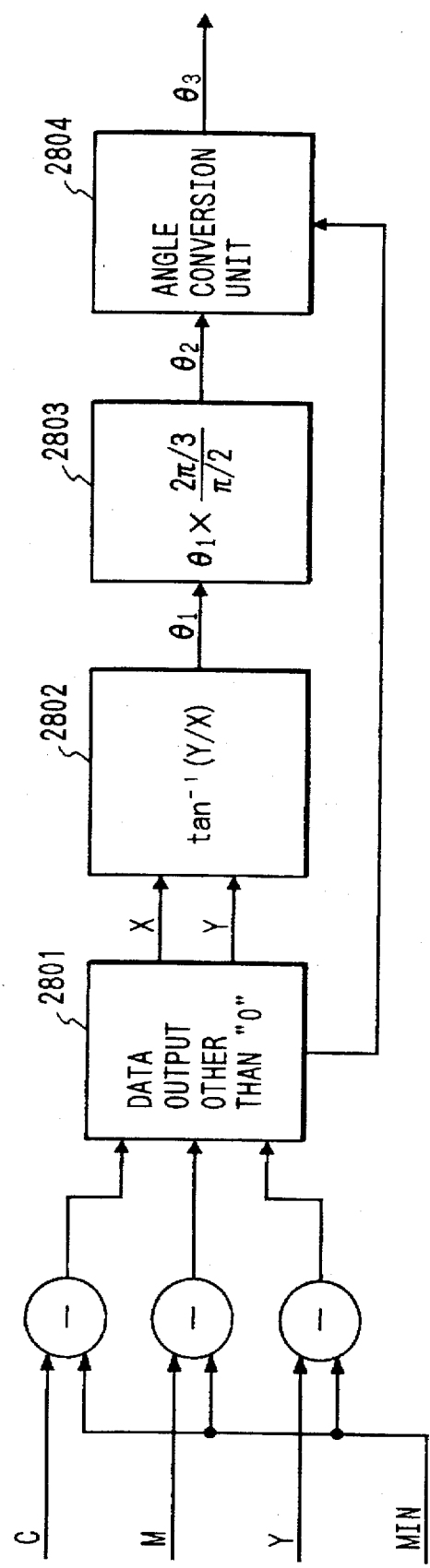
FIG. 38 is a block diagram showing an example of the hue (angle) related to the present invention.

On the other hand, the Min data outputted from the max/min detection unit 2401 are respectively subtracted from outputs C, M and Y of the gradation correction unit 2302, only the saturation components are entered into the hue detection unit 2402, and an angle indicating the hue is detected. The hue detection unit 2402 basically comprises a ROM, and an example of another adaptation is shown in FIG. 38.

Figure 37:
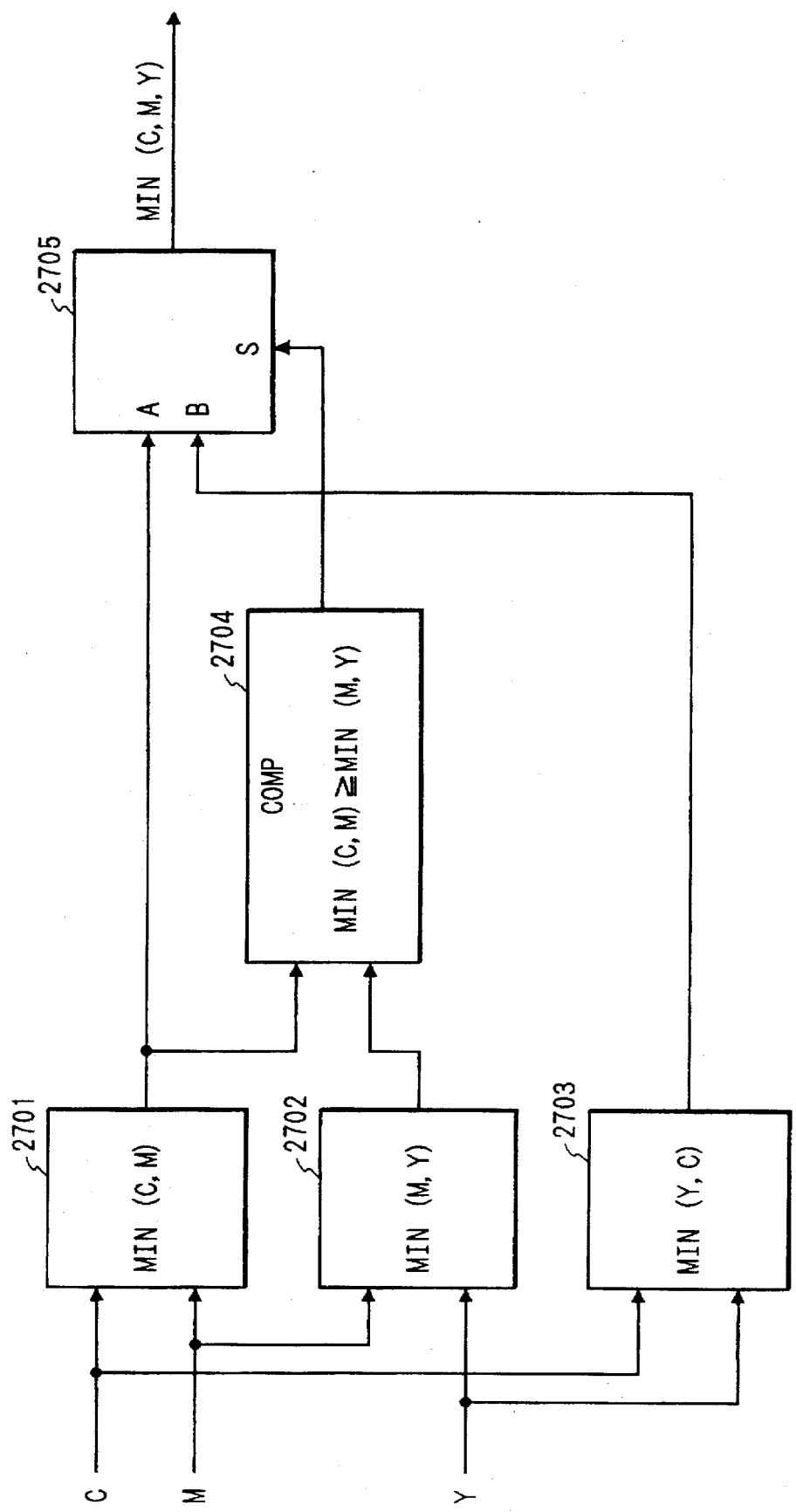
FIG. 37 is a block diagram showing an example of the min. detection unit related to the present invention.

The value Min (C, M and Y) detected by the Min detection unit shown in FIG. 37 is subtracted from the density data of C, M and Y and a resultant value is entered into 2801. 2801 outputs the data other than 0 of the data entered as X and Y data. Three-dimensional density data entered in the above processing can be converted to two-dimensional data expressed by X and Y data and color separation processing can be simply carried out as shown below.

A control signal which indicates one color space area, where the input data exists, of the MC, CY and YM color space areas which are equally divided according to C, M and Y in 2801 is outputted to the angle conversion unit 2804.

2802 carries out calculation given by the formula 1 according to X and Y data. 2803 carries out the conversion for normalizing the angle outputted by 2802 in the range of 0 to 90 degrees to an angle of 0 to 120 degrees by using the equation 2 to project the angle obtained onto the color space area used in this case.

$$\theta_1 = \tan^{-1}(Y/X) \qquad (31)$$

$$\theta_2 = \theta_1 \times \left( \frac{2\pi/3}{\pi/2} \right) \qquad (32)$$

In addition, angle $\theta_2$ outputted from 2803 is set to 0 deg for the RED axis according to the control signal indicating the color space area outputted from 2801 and the color space is converted to a value $\theta_3$ on the color space given in 360 deg.

The hue of the saturation portion of density data of C, M and Y entered by a series of processing of the color hue detection unit 2402 can be denoted as $\theta_3$.

Outputs from the color detection unit 2402 and the max/min detection unit 2401 are entered into the black/red data generation unit 2403 and two-color components free from the same color representation at the hue level are generated.

Figure 35:
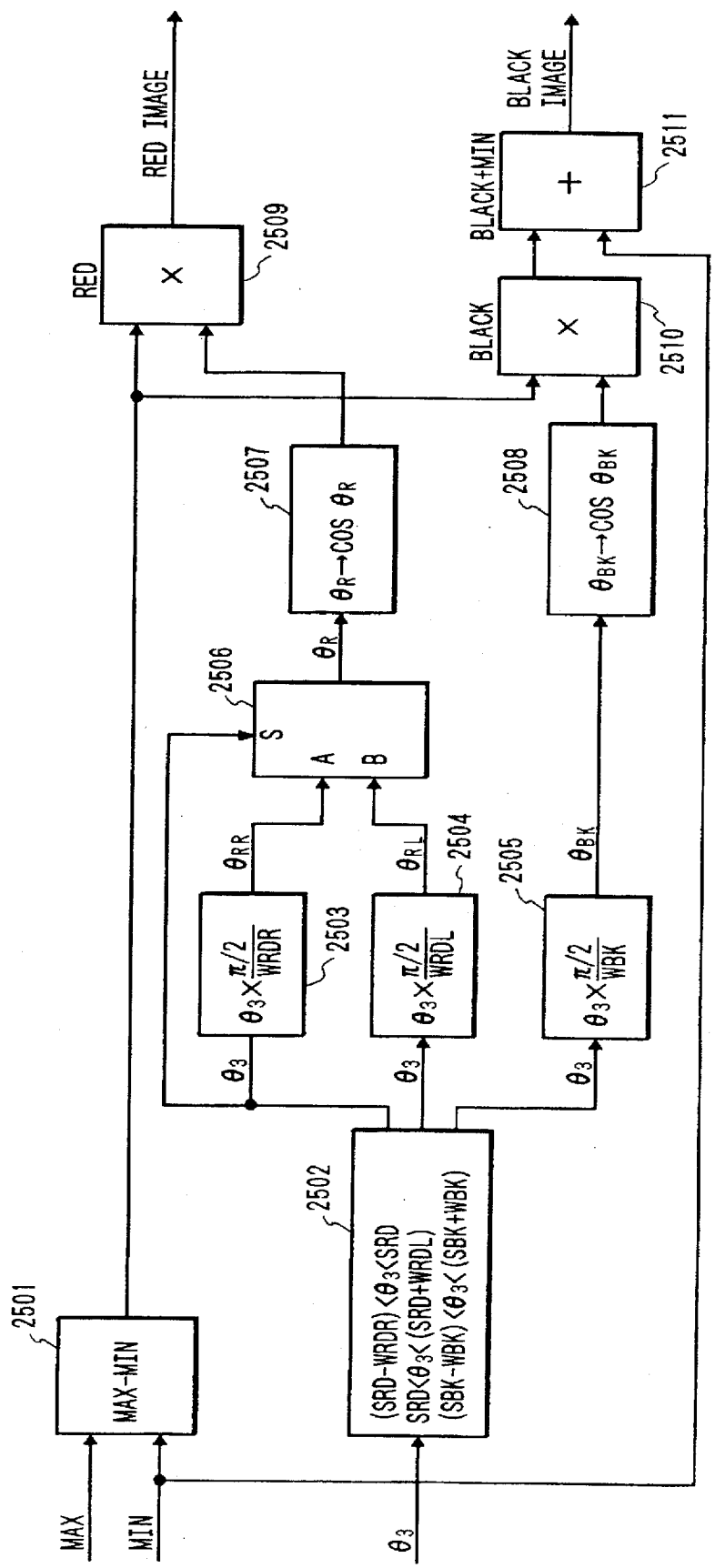
FIG. 35 is a block diagram showing an example of the black/red generation unit related to the present invention.
Figure 36:
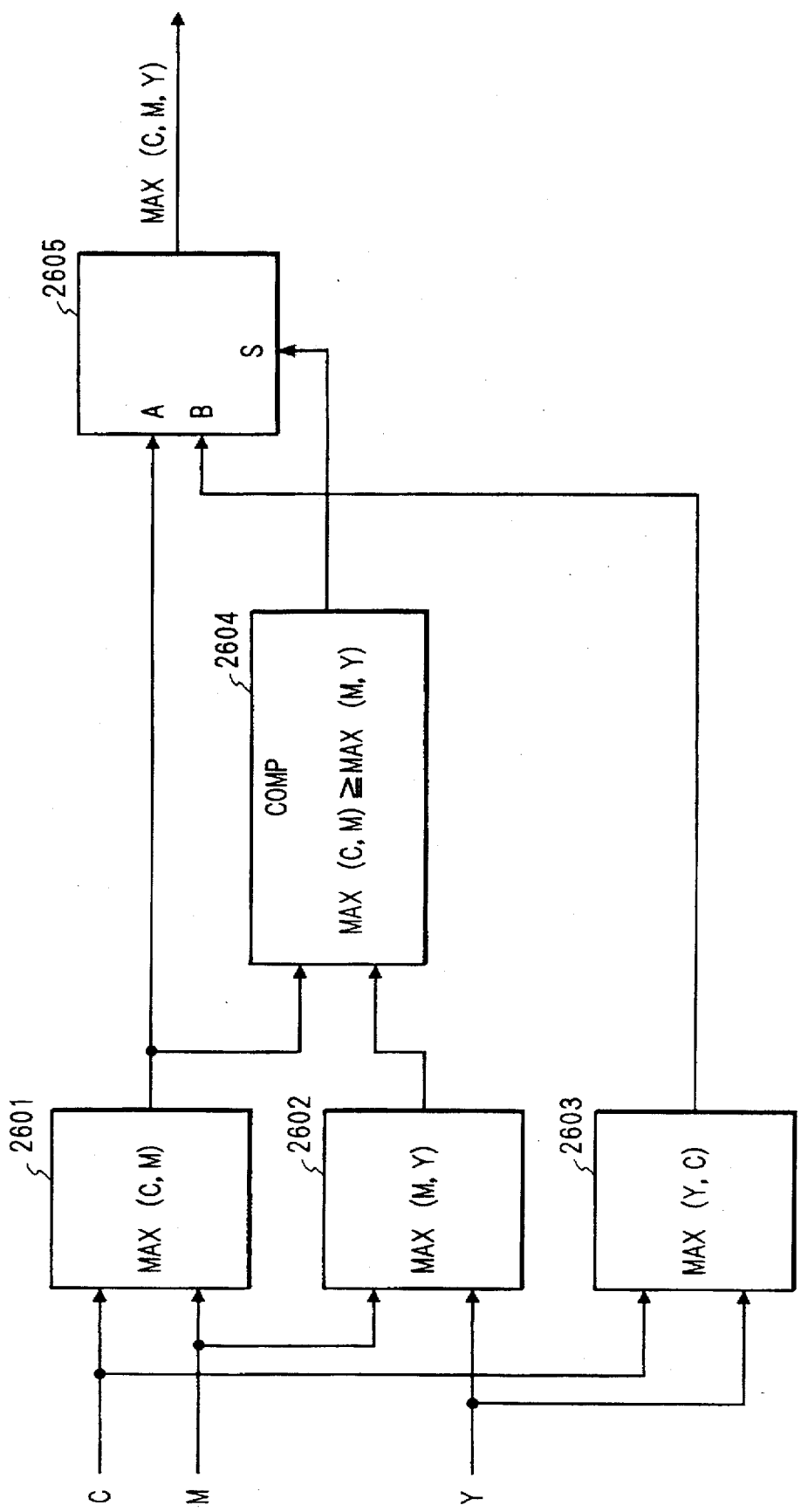
FIG. 36 is a block diagram showing an example of the max detection unit related to the present invention.
Figure 39:
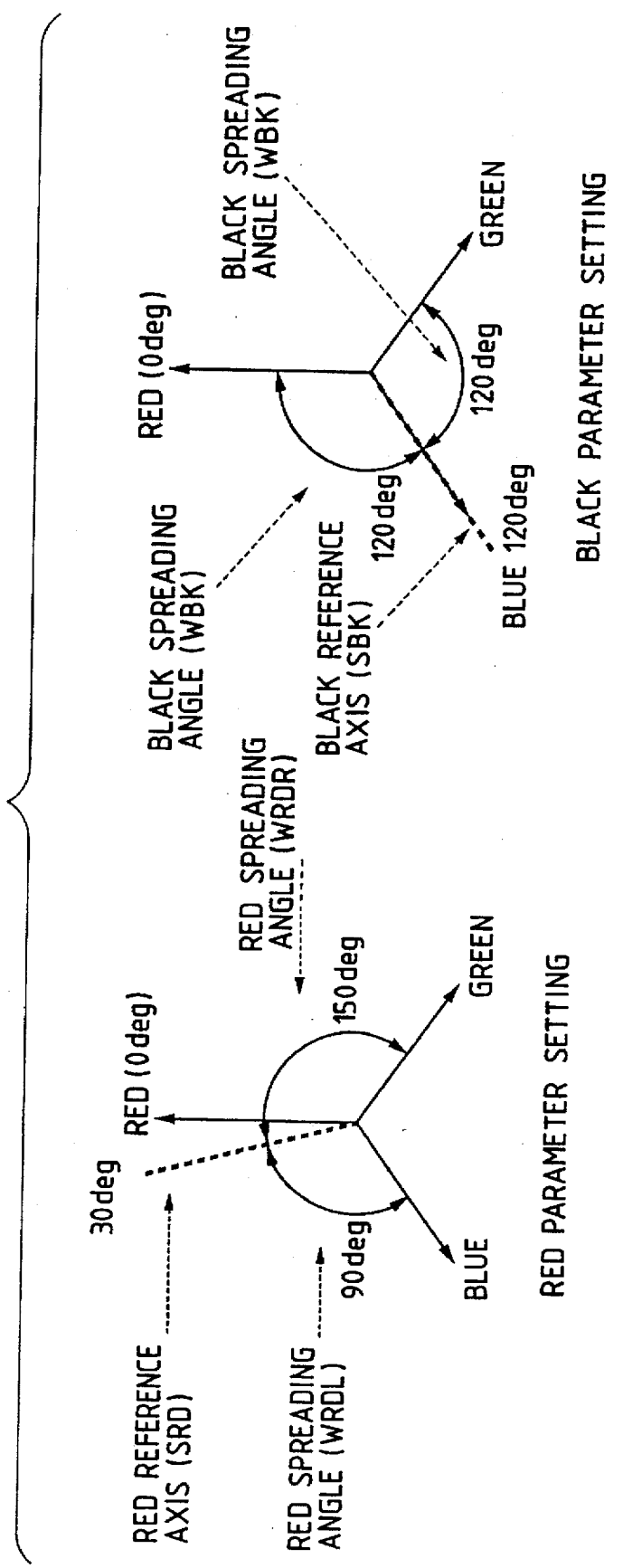
FIG. 39 is a diagram showing an example of the black/red parameters related to the present invention.

The black/red data generation unit is described, referring to FIGS. 35 and 39.

FIG. 35 is a block diagram showing an example of the black/red data generation unit and FIG. 39 shows an example of parameters in the color space used in this embodiment.

The black/red data generation unit shown in FIG. 35 generates two-color data by using Max and Min outputted from the max/min detection unit 2401 and the data of $\theta_3$ outputted from the hue detection unit 2402.

A parameter of a selector 2502 is described using the red parameter shown in FIG. 39. The RED reference axis (SRD) is set at a position where the red color density is the largest, for example, 30 deg. The range where the density is gradually thinned from the reference axis is a spreading angle of red color (WRDL/WRDR), which affects the density conversion ratio. For example, the spreading angle is assumed as 90 deg/150 deg. The density is 0 at this largest spreading angle. The user can set SDR and WRDL or WRDR in accordance with the application and his preference at the operation unit. In other words, the user can set a portion where the red color density is largest the variation ratios of the density from the reference axis to be independent or asymmetrical in the right and left sides of the reference axis.

Color separation which meets the user's request can be carried out and an output image which meets the user's request can be obtained.

Black parameters are set as the red parameters. Specifically, the BLACK reference axis (SBK) is a portion where the black color density is maximum, for example, 120 deg. A range where the density is gradually more thinned from the reference axis is the black spreading angle (WBK), for example, 120 deg.

By setting the parameters as described above, a range where two colors, red and black, are mixed appears in a range from red around magenta to blue, a portion where two colors become the same color at the hue level is eliminated and an image approximate to the original colors can be represented in two colors. Since the density from the RED reference axis can be asymmetrical at the right and left sides of the reference axis, an output representation based on the human visual characteristics can be made by, for example, lowering the density variation ratio at the yellow side.

The portion where the red color density is maximum and the variation ratio of the density from the reference axis can be independently or asymmetrically set.

Therefore color separation which meets the user's request can be carried out and an output image which meets the user's request can be obtained.

Black parameters are set as the red parameters. Specifically, the BLACK reference axis (SBK) is a portion where the black color density is maximum, for example, 120 deg. A range where the density is gradually more thinned from the reference axis is the black spreading angle (WBK), for example, 120 deg.

By setting the parameters as described above, a range where two colors, red and black, are mixed appears in a range from red around magenta to blue, a portion where two colors become the same color at the hue level is eliminated and an image approximate to the original colors can be represented in two colors. Specifically, two-color output representation free from the same color representation which meets the characteristics of the image and the user's application can be made without prescan by setting optimum two-color separation parameters, which ensure two-color output free from same color representation, for respective areas. Two-color output representation is possible without lowering the productivity.

Since the density from the RED reference axis can be asymmetrical at the right and left sides of the reference axis, an output representation based on the human visual characteristics can be made by, for example, lowering the density variation ratio at the yellow side.

The description is continued referring again to FIG. 35.

The SRD-WRDR area, the SRD-WRDL area or the WBK area of spaces shown in FIG. 39 which corresponding to the angle $\theta_3$ entered into the selector 2502 is classified by the selector 2502, weighted parameters in response to the areas 2503, 2504 and 2505 are calculated, the angle $\theta_3$ is converted in accordance with the parameters calculated based on the setting by the user, that is, the variation ratio, and $\theta_{RR}$, $\theta_{RL}$ and $\theta_{BK}$ are outputted. The selector 2506 selects the input signal $\theta_{RR}$ or $\theta_{RL}$ according to classification by the selector 2502 and outputs the input signal as $\theta_R$ to 2507. On the other hand, an output of 2505 is outputted as $\theta_{BK}$ to 2508.

2507 and 2508 cosine-convert $\theta_R$ and $\theta_{BK}$ and output them to 2510. 2509 outputs a value obtained by multiplying a weighted parameter value based on the hue of input data from 2507 by an output based a saturation amount, that is, the saturation of input data from 2501. On the other hand, 2510 outputs a value obtained by multiplying a weighted parameter value based on the hue of input data from 2508 by an output based on an amount of saturation, that is, the saturation of input data from 2501 and adding a value of min (r,g,b), that is, a non-saturation amount of input data. This min (r,g,b) to be added is for outputting the non-saturation component. The result of the above processing is outputted as a red image and a black image from 2403.

Accordingly, the red image to be outputted from 2509 is the image data which includes the gradation of input data based on the density variation ratio set according to the hue of the saturated portion, the saturation and parameters of the input data.

The black image to be outputted from 2511 is the image data which includes the gradation of input data based on the hue, saturation and non-saturation amount of the input data.

From the above, the gradation and the color tone of the original image can be represented with black and red.

One of red and black image data is delayed as long as specified by the buffer memory 2304. This delay is intended to correct a physical position deviation of the photoreceptors to which the red color image and the black color image are exposed. The delayed data is outputted to the printer unit 2204 after having been delayed for a specified time by this buffer memory.

[Comparative Example of Fourth Embodiment]

The color spaces used in the above-described embodiments are as shown in FIG. 39 and are not uniform color spaces. However, the present invention is not limited to these color spaces and enables to carry out similar processing even on other uniform color spaces such as L*a*b* and L*v*v*.

In the above embodiment, the black image is shown as being symmetrical to the reference axis. However, the present invention is not limited to the above and the black can be asymmetrical as the red image. Thus more free output representation is enabled.

A data generation method in the black/red data generation unit (two-color data generation unit) does not limit a coefficient of the density variation ratio shown in the embodiments to cosine functions and enables similar processing even when other functions such as a $\cos^2$ function, a $\cos^3$ function or an $e^x$ function.

Though red and black data are used for output in the above embodiments, the present invention is not limited to these colors and permits other combinations of colors such as blue and black, red and blue and others.

Though red and black data are used for output in the above embodiments, the present invention is not limited to these colors and permits to use specific three different colors such as, for example, red, blue and black for output.

Three colors can be used.

As described above, accurate color separation of color information can be carried out in compliance with the characteristics of the image or the application of the user.

Optimal color separation can be carried out for input image data by setting a space area and a density variation ratio.

In addition, a color separation range can be set in compliance with the application of the user.

[Fifth Embodiment]

Figure 40:
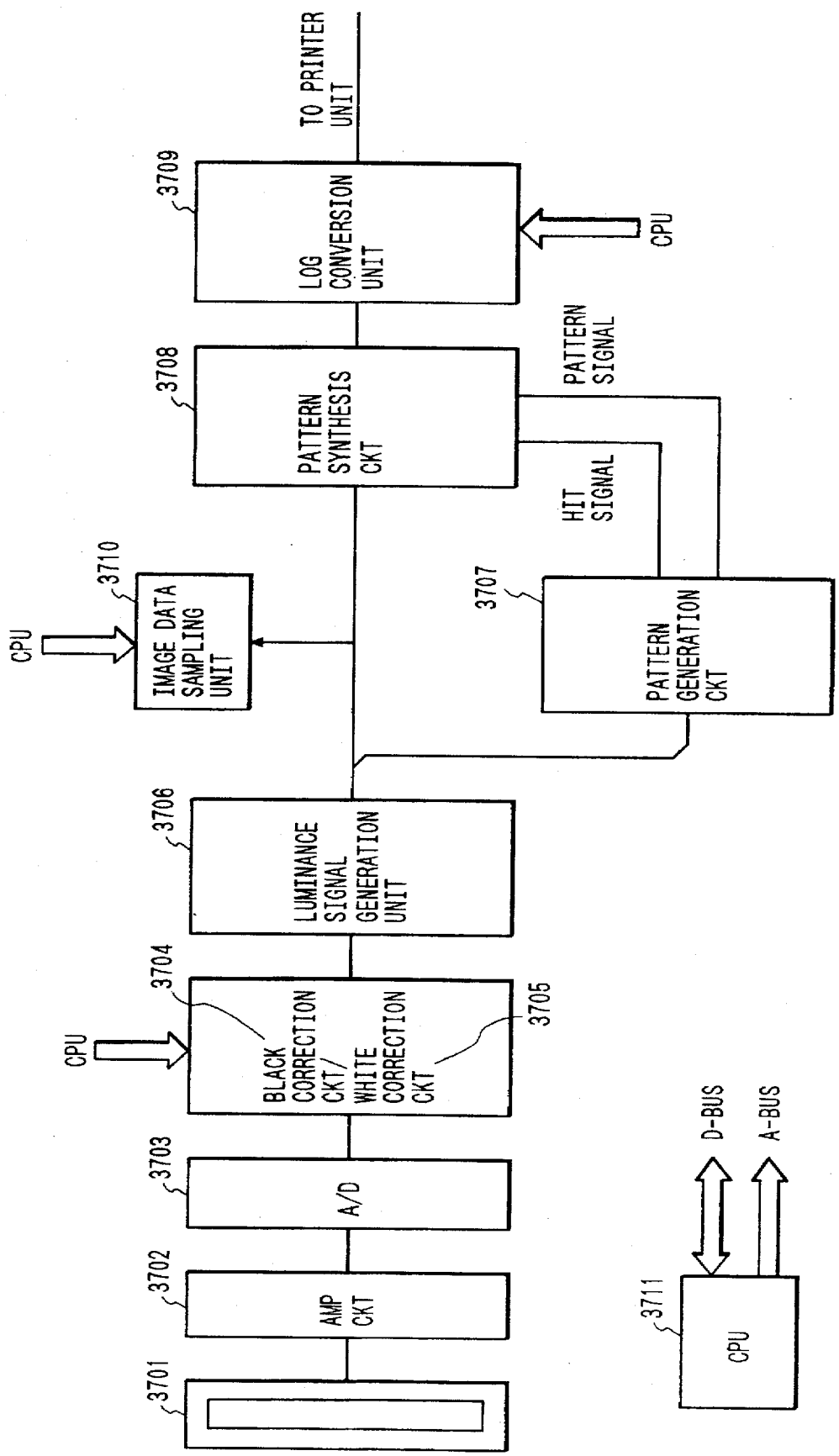
FIG. 40 is a schematic block diagram showing the overall configuration of the image processing apparatus (copying machine) related to the second embodiment of the present invention.

FIG. 40 is a schematic block diagram showing the overall configuration of an image processing apparatus (copying machine) according to a fifth embodiment of the present invention.

This image processing apparatus comprises an amplification circuit 3702, an A/D converter 3703, a black correction circuit 3704, a white correction circuit 3705, a luminance signal generation unit 3706, a pattern generation circuit 3707, a pattern synthesization circuit 3708, a LOG conversion unit 3709, an image data sampling unit 3710, and a CPU 3711 as well as the CCD image sensor 3701.

Analog image signals are outputted from the CCD image sensor 3701, amplified by the amplification circuit 3702 and converted to 8-bit digital signals. The black correction circuit 3704 and the white correction circuit 3705 carry out black level correction and white level correction (shading correction) for image signals.

The LOG conversion unit 3709 converts the output signal (luminance signal) of the pattern synthesization circuit 3708 to a density signal and outputs it to the printer unit. In this case, conversion to the density signal is carried out to correct the t characteristic (non-linearity of the sensitivity to exposure).

Figure 41:
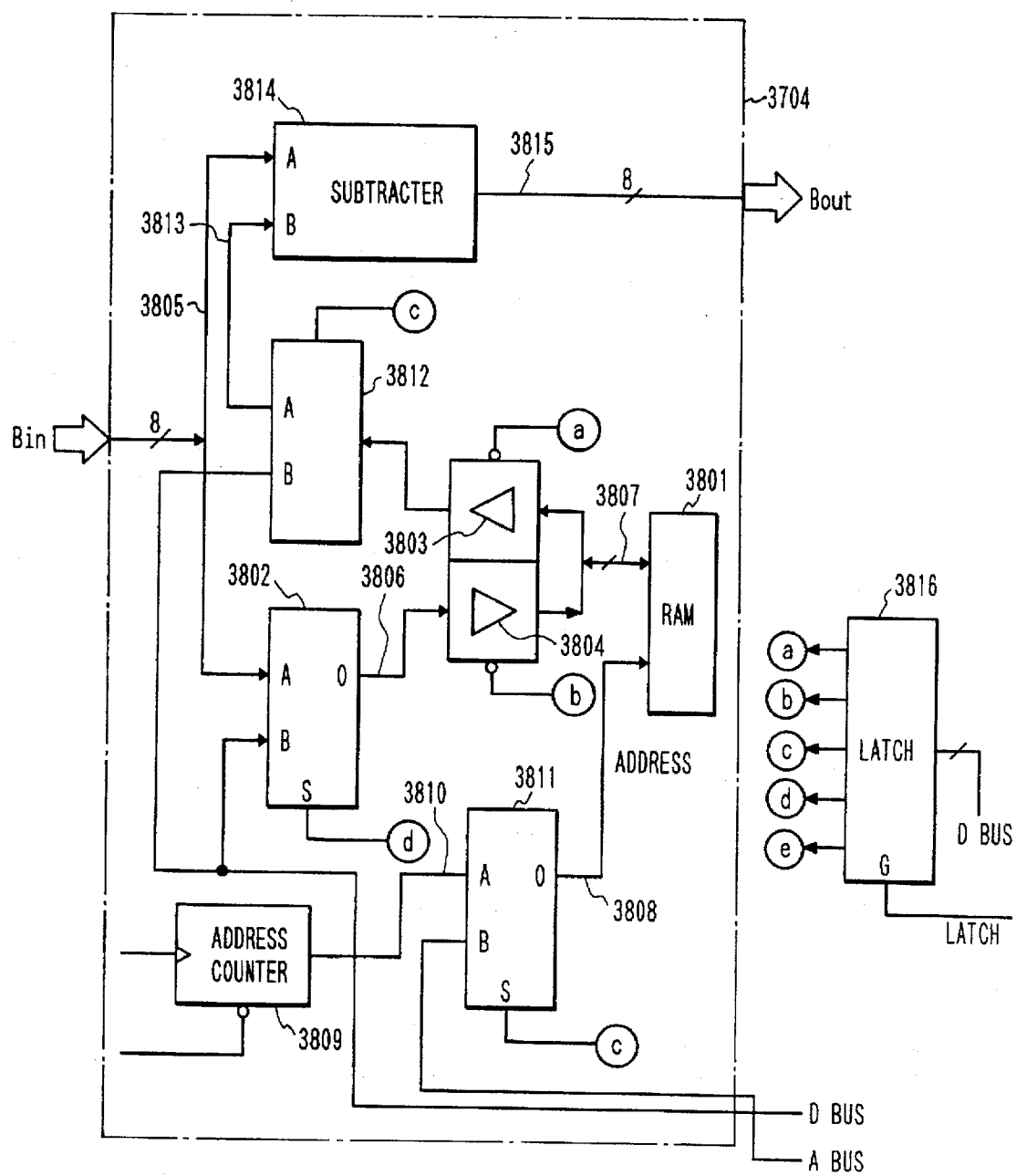
FIG. 41 is a block diagram of a black correction circuit 704.

FIG. 41 is a block diagram of the black correction circuit 3704.

A/D converted digital image signals from the CCD image sensor 3701 show large variations between pixels as shown in FIG. 41 when a light quantity entered into the CCD image sensor 3701 is extremely small. If such digital image signals are directly outputted as an image, a streak or unevenness appear in the data portions of the image. Therefore the variations between pixels are corrected by the black correction circuit shown in FIG. 40.

Specifically, prior to the read operation of the original, the scanner comprising the original illuminating lamp 3103 and the scan mirror 3104 is moved to the position of a black plate of uniform density arranged in the non-image area at the end of the original placing glass plate 3101, the original illuminating lamp 3103 is lit, and the black level image signals reflected from the black plate is entered into the black correction circuit.

To store the black level image signals as much as one line in the black level RAM 3801, A is selected by the selector 3802 (control line d), the gate 3803 is closed (control line a), the gate 3804 is opened (control line b) and data lines 3805, 3806 and 3807 are connected.

On the other hand, A is selected by the selector 3811 so that an output 3810 of the address counter 3809 which is initialized with a line sync. signal HSYNC and counts the image clock signals VCLK is entered into the address input 3808 of the black level RAM 3801.

Thus black level image signals as much as one line which are reflected by the black plate are given an address for one pixel and stored as black reference data in the black level RAM 3801.

For reading actual image data of the original, the black level RAM 3801 comes in the data read mode. Specifically, black reference value data in the black level RAM 3801 is entered into the B input terminal of the subtracter 3814 through the paths of data lines 3807 and 3813 by closing the gate 3804 (control line b), opening the gate 3803 (control line a) and setting the selector 3812 to the A output.

In this case, the actual image data of the original is entered into the A input of the subtracter 3814, and the black reference value data as much as one line in the black level RAM 3801 is repeatedly entered into the B input of the subtracter 3814. The above two data as much as is entered as synchronized into the subtracter 3814.

The subtracter 3814 subtracts the black reference value data from the actual image data of the original to carry out black correction and outputs the black correction data from the data line 3815. For example, if the actual image data of the original is assumed as Bin (i) and the black reference value data as DK (i) for the ith pixel, the black correction data Bout (i) is as given below.

$$Bout(i)=Bin(i)-DK(i)$$

Control lines a, b and c of selector gates for black correction are controlled by the CPU 711 using the latch 3816 assigned as the I/O of the CPU 3711. The CPU 3711 is enabled to access to the black level RAM 3801 by setting the selectors 3802, 3811 and 3812 to B selection.

Figure 42:
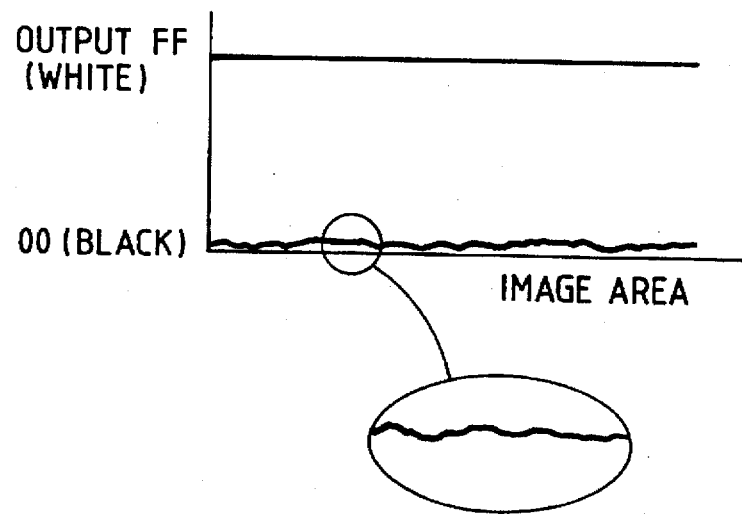
FIG. 42 is a diagram for describing the black level.

FIG. 42 is a block diagram of the white correction circuit 3705, wherein white level correction (shading correction) is carried out. For reading actual image data of the original, the CPU 3711 enters the shading correction coefficient FFHWI in the correction coefficient RAM 3856 into the B input terminal of the multiplier 3857 through the paths of data lines 3854 and 3855 by closing the gate 3851 (control line b), opening the gate 3852 (control line a) and setting the selector 3853 to the A output.

In this case, the actual image data of the original is entered into the A input terminal of the multiplier 3857. The multiplier 3857 carries out white correction by multiplying the image data (Di) of the original and the shading correction coefficient FFH/WI and outputs the white correction data from the data line 3858.

Thus it is adapted to correct variations of the black level and the white level resulting from the black level sensitivity of the image input system, dark current variations of the CCD image sensor 3701, sensitivity variations of the CCD 3701, light quantity variations of the optical system and white level sensitivity variations and obtain image data which are uniformly corrected for white and black in the main scan direction. Image data Bout, Gout and Rout which are corrected for black and white levels are outputted to the luminance signal generation unit 3706.

Graphic pattern signals (luminance signals) outputted from the pattern synthesization circuit 3708 are converted to the density signals by the LOG conversion unit 3709. This luminance/density conversion is carried out according to the lookup table (log table) formed in the RAM in the log conversion unit 3709, and the image data (graphic pattern signals) converted to the density signals are outputted to the printer unit. The information of the log table is written by the CPU 3711 shown in FIG. 39.

An actual image processing method in this embodiment is described below.

Figure 43:
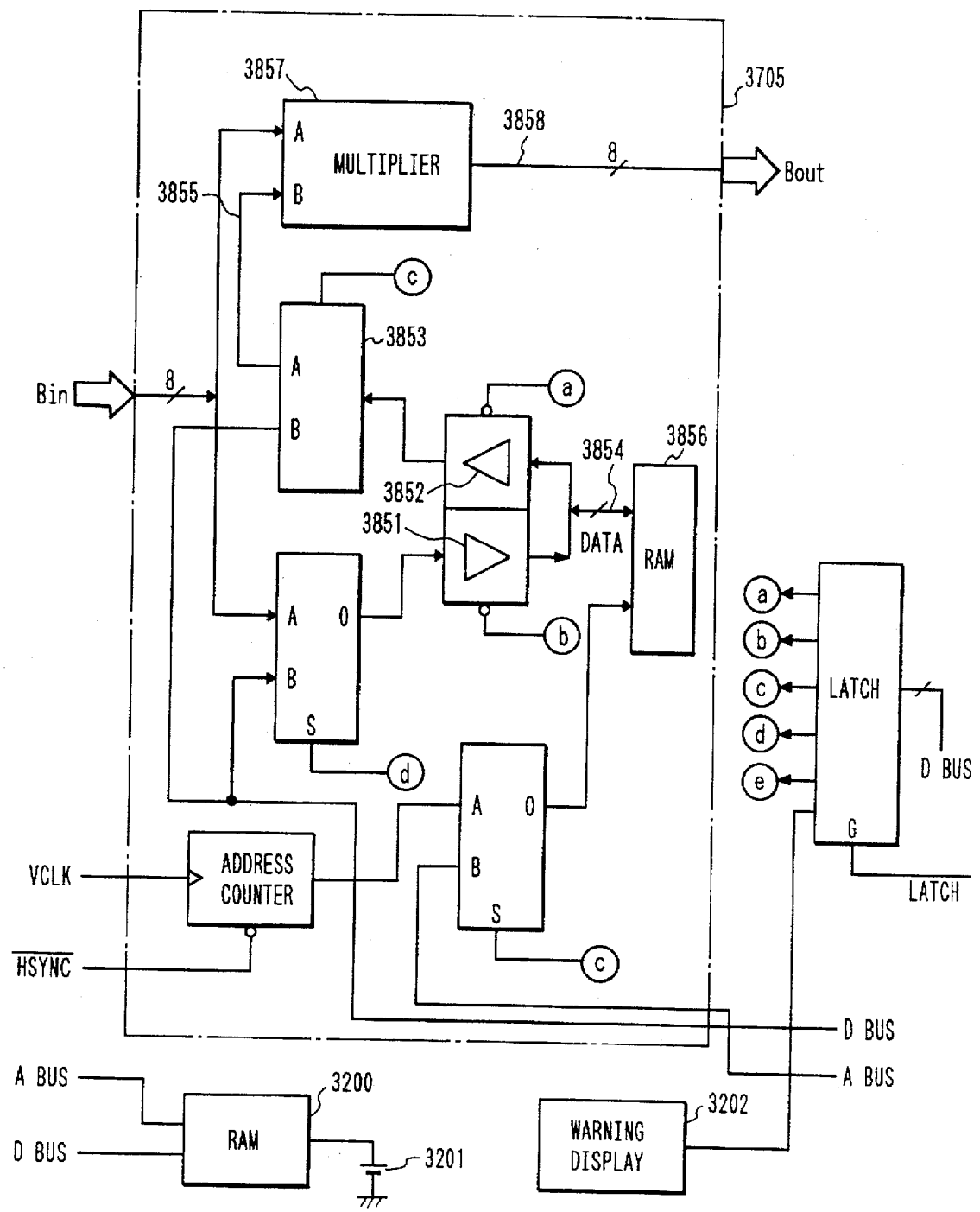
FIG. 43 is a block diagram of a white correction circuit 705.

In this case, 8-bit luminance signals 00H to FFH are divided for every 10H and assigned to parameters of the 3-dimensional table (FIG. 43). The parameters of the 3-dimensional table include X for a pattern interval (density), Y for a pattern density and Z for a pattern area. If the output unit cannot provide the gradation effect as a binary printer or a facsimile machine, the 3-dimensional table can be converted to a 2-dimensional table for X and Z with Y as "0".

Figure 45:
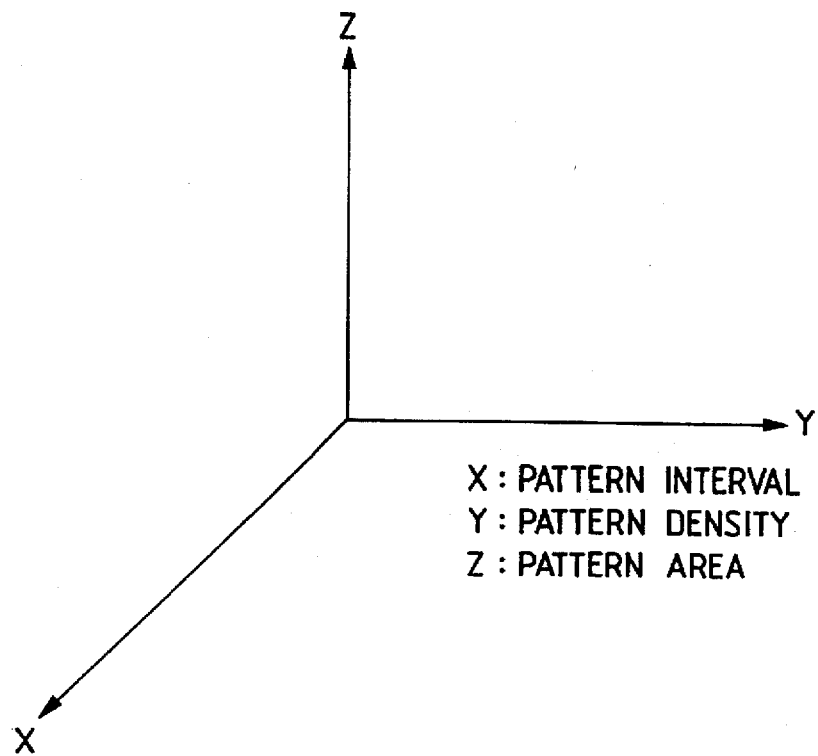
FIG. 45 is a diagram showing a three-dimensional table of the input brightness level.

FIG. 45 shows a condition of the image when the pattern is changed with 3-dimensional parameters.

In this embodiment, the pattern is hatched. However, the pattern can be any type of pattern, for example, a dot pattern or a checkered pattern. Conversion parameters of the 3-dimensional table can be set by more finely dividing the luminance signal levels. In addition, the numerical values of the parameters can be changed and set according to the characteristics of the printer.

A comparative example of the fifth embodiment is described below.

This comparative example is embodied in the same configuration as the above fifth embodiment (as shown in FIG. 39).

In the fourth embodiment, the luminance signal level is converted to the 3-dimensional table based on the pattern interval (density), density and area to be outputted. However, in this embodiment, the type of pattern which is changed is used instead of the density.

In this embodiment, four types of patterns as shown in FIG. 46 are available but any type of pattern is available if it is previously generated. These types of patterns are generated in the pattern generation circuit 3707 and can be selected for synthesis in the pattern synthesization circuit 3708 to meet the luminance signal level.

Other comparative examples are described below.

These other comparative examples are embodied in the same configuration as the above embodiments (as shown in FIG. 39).

Though a pattern to be outputted in accordance with the degree of the luminance signal level is selectively determined in the above embodiments, the edge of the image is extracted from a density variation of the original image, the area is divided at the edge as a border and the pattern is changed for each area in these comparative examples.

FIG. 47A shows the luminance signal level for one line, and a difference for each pixel is obtained at the image data sampling unit 3710 in FIG. 39 to obtain a variation ratio of this signal. In other words, the variation ratio is obtained by differentiating the luminance signal of FIG. 47A. The primary differential waveform of the luminance signal shown in FIG. 47A is shown in FIG. 47B.

In addition, if the difference of the primary differential waveform (FIG. 47B) for each pixel is calculated to extract the edge of the original image luminance signal level (FIG. 47A), a secondary differential waveform in FIG. 47C is obtained. In FIG. 47C, a portion which protrudes to the plus side is the edge of the original image luminance signal level.

Division of the sections according to the edge obtained from the secondary differential waveform (FIG. 47C) is as shown in FIG. 47D. A pattern in the area is determined by using sections $\phi 1$ to $\phi 5$ shown in FIG. 47D and the degrees of the original image luminance signal levels (LVL1 to LVL15). The pattern used in the second and third embodiments can be used as a pattern in an area determined in FIG. 47D.

If a plurality of colors can be developed, the pattern is determined independently in accordance with the color. If monochrome photoelectric conversion devices are used, exposure is repeated several times by varying the light quantity of the exposure means, a change of signals from the photoelectric conversion devices due to repeated exposures is detected and the pattern image to be outputted can be determined in compliance with a difference of changes.

Since an input level dividing means for dividing the voltage level of analog electric signals converted by the photoelectric conversion devices with a desired threshold value in a plurality of steps and a pattern setting means capable of setting, as required, different pattern images in a monochrome color or a plurality of colors for respective input levels divided by the input level dividing means in image formation are provided, the colored portions of the original can be clearly represented without using the sensors for discriminating colors.

The present embodiment enables to more clearly represent the image with the gradation represented by using the conventional dither method, clearly output a portion of the image of which representation of the gradation effect has been difficult as a pattern image, and obtain clearer image outputs in use of a facsimile machine and a binary printer.

In the above first to fourth embodiments, an electronic photography system by which an image is formed on a photoreceptor drum is used. However, the present invention is not limited to the above system and may employ, for example, a type of print head which discharges liquid drips produced from film boiling by heat energy and a recording method using this print head.

The present invention may apply to a system comprising a plurality of equipment or machines and an apparatus comprising only one unit of machine.

The present invention may apply to an application which can be attained by supplying a program or programs to a system or an apparatus.

The present invention is not limited to the above-described embodiments and enables various modifications within the range of the claims thereof.

What is claimed is:

1. An image processing method for inputting color image data comprised of a plurality of color components and for carrying out color separation on the color image data so as to produce color image data having two color components, said method comprising the steps of:

detecting a minimum value from among the plurality of color components;

mapping the color image data into a two-dimensional plane on the basis of the minimum value detected in the detecting step; and generating the two color components on the basis of a hue defined by a point in the two-dimensional plane mapped in the mapping step.

2. An image processing method comprising the steps of:

detecting a color distribution of a color image comprised of color image data;

setting a reference axis to be used for carrying out color separation on the basis of the color distribution detected in said detecting step; and converting the color image data of the color image into color image data having two color components on the basis of the reference axis set in said setting step.

3. A method according to claim 2, wherein the detecting step detects a density distribution of each hue for each color in the color image data, and obtains a characteristic point of the color image on the basis of a result of the detection of the density distribution.

4. A method according to claim 3, wherein said step of obtaining the characteristic point detects peaks from the density distribution detected in the detecting step, and sets as the characteristic point a hue in which detected peaks are not symmetric.

5. A method according to claim 2, wherein the detecting step detects a luminance distribution of each hue for each color in the color image data, and obtains a characteristic point of the color image on the basis of a result of the detection of the luminance distribution.

6. A method according to claim 2, wherein said detecting step detects the color distribution of the color image on the basis of color image data obtained by a prescan.

7. An image processing method comprising the steps of:
converting color image data comprised of a plurality of color components into color image data having two color components on the basis of a reference axis; and
outputting the two color components to an image forming unit which forms an image by using recording agents for two colors;
wherein the reference axis substantially matches a hue of one of the recording agents used by the image formation unit.

8. An image processing method comprising the steps of:
inputting color image data;
a first setting step for setting a space area including hue and saturation components;
a second setting step for setting a density changing rate which corresponds to the space area set by the first setting step; and
separating the color image data into color image data having two color components on the basis of the space area set in said first setting step and the density changing rate set in the second setting step.

9. A method according to claim 8, wherein said first setting step sets a color separation gamut which corresponds to a reference axis and a predetermined color which are used in the separating step.

10. A method according to claim 8, wherein the first setting step sets the space area manually and the second setting step sets the density changing rate manually.

11. An image processing apparatus for inputting color image data comprised of a plurality of color components and for carrying out color separation on the color image data so as to produce color image data having two color components, said apparatus comprising:
detecting means for detecting a minimum value from among the plurality of color components;
mapping means for mapping the color image data into a two-dimensional plane on the basis of the minimum value detected by the detecting means; and
generation means for generating the two color components on the basis of a hue defined by a point in the two-dimensional plane mapped by the mapping means.

12. An image processing apparatus according to claim 11, further comprising image formation means for forming an image comprised of the two color components.

13. An image processing apparatus according to claim 12, wherein said image formation means comprises a photoreceptor drum onto which an image is formed of the two color components.

14. An image processing apparatus according to claim 12, wherein said image formation means transfers the image comprised of the two color components onto a recording medium.

15. An image processing apparatus according to claim 12, wherein said image formation means forms the image by using a printer head which causes film to boil using heat energy and which discharges liquid drops comprised of boiled film.

16. An image processing apparatus comprising:
detecting means for detecting a color distribution of a color image comprised of color image data;
setting means for setting a reference axis to be used for carrying out color separation on the basis of the color distribution detected by said detecting means; and
converting means for converting the color image data of the color image into color image data having two color components on the basis of the reference axis set by said setting means.

17. An image processing apparatus according to claim 16, further comprising image formation means for forming an image comprised of the two color components.

18. An image processing apparatus according to claim 17, wherein said image formation means comprises a photoreceptor drum onto which the image is formed.

19. An image processing apparatus according to claim 17, wherein said image formation means transfers the image onto a recording medium after the image has been formed on the photoreceptor drum.

20. An image processing apparatus according to claim 17, wherein said image formation means forms the image by using a printer head which causes film to boil using heat energy and which discharges liquid drops comprised of boiled film.

21. An image processing apparatus comprising:
converting means for converting color image data comprised of a plurality of color components into color image data having two color components on the basis of a reference axis; and
outputting means for outputting the two color components to an image forming unit which forms an image by using recording agents for two colors;
wherein the reference axis substantially matches a hue of one of the recording agents used by the image formation unit.

22. An image processing apparatus comprising:
inputting means for inputting color image data;
first setting means for setting a space area including hue and saturation components;
second setting means for setting a density changing rate which corresponds to the space area set by the first setting means; and
separating means for separating the color image data into color image data having two color components on the basis of the space area set by the first setting means and the density changing rate set by the second setting means.

23. An apparatus according to claim 22, wherein said first setting means sets a color separation gamut which corresponds to a reference axis and a predetermined color which are used in color separation performed by said separating means.

24. An apparatus according to claim 22, wherein the space area and the density changing rate are set manually.

25. An image processing apparatus comprising:
input means for entering color image data;
area setting means for setting a space area including a desired hue and saturation;
density variation ratio setting means for setting a density variation ratio corresponding to said space area, the density variation ratio defining densities of color components in the space area; and
color separation means for separating input image data into color image data having two-color components according to said space area and the density variation ratio;
wherein said area setting means and said density variation ratio setting means permit manual setting of the space area and the density variation ratio, respectively.

* * * * *